United States Patent
Ma et al.

(10) Patent No.: US 11,888,191 B2
(45) Date of Patent: *Jan. 30, 2024

(54) ELECTROLYZER AND METHOD OF USE

(71) Applicant: Twelve Benefit Corporation, Berkeley, CA (US)

(72) Inventors: Sichao Ma, Dublin, CA (US); Sara Hunegnaw, Oakland, CA (US); Ziyang Huo, Moraga, CA (US); Kendra P. Kuhl, Oakland, CA (US); Etosha R. Cave, Berkeley, CA (US); Ashley D. Mishra, Danville, CA (US); Edward Izett, Berkeley, CA (US); Alvin Leung, San Francisco, CA (US); Timothy A. Bekkedahl, Fremont, CA (US)

(73) Assignee: Twelve Benefit Corporation, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,225

(22) Filed: May 5, 2022

(65) Prior Publication Data
US 2022/0393203 A1 Dec. 8, 2022

Related U.S. Application Data

(63) Continuation of application No. 16/719,359, filed on Dec. 18, 2019, now Pat. No. 11,417,901.
(Continued)

(51) Int. Cl.
*H01M 4/02* (2006.01)
*H01M 8/04537* (2016.01)
*C25B 9/23* (2021.01)

(52) U.S. Cl.
CPC .......... *H01M 8/04574* (2013.01); *C25B 9/23* (2021.01)

(58) Field of Classification Search
CPC ....................................................... H01M 4/02
See application file for complete search history.

(56) References Cited

U.S. PATENT DOCUMENTS 10,865,490 B2 12/2020 Ono et al.
10,961,632 B2 3/2021 Ono et al.
(Continued)

FOREIGN PATENT DOCUMENTS

DE 102016211155 A1 12/2017
DE 102016211151 A1 1/2018
(Continued)

OTHER PUBLICATIONS

"Electrolytic CO2 Reduction in a Flow Cell" Acc. Chem. Res. 2018, 51, 910-918.*
(Continued)

*Primary Examiner* — Daniel S Gatewood
(74) *Attorney, Agent, or Firm* — Weaver Austin Villeneuve & Sampson LLP

(57) ABSTRACT

Provided herein are methods for operating carbon oxide ($CO_x$) reduction reactors (CRR) and related apparatus. In some embodiments, the methods involve shutting off, reducing, or otherwise controlling current during various operation stages including hydration, break-in, normal operation, planned shut-offs, and extended shutoff or storage periods.

52 Claims, 24 Drawing Sheets

Related U.S. Application Data

(60) Provisional application No. 62/781,431, filed on Dec. 18, 2018.

(56) References Cited

U.S. PATENT DOCUMENTS

| | | | |
|---|---|---|---|
| 10,975,480 | B2 | 4/2021 | Masel |
| 10,975,481 | B2 | 4/2021 | Guo et al. |
| 11,417,901 | B2 | 8/2022 | Ma et al. |
| 11,578,415 | B2 | 2/2023 | Cave et al. |
| 2006/0016685 | A1 | 1/2006 | Hawkins et al. |
| 2008/0318093 | A1 | 12/2008 | Lee et al. |
| 2009/0155102 | A1 | 6/2009 | Park et al. |
| 2012/0328942 | A1 | 12/2012 | Thomas-Alyea et al. |
| 2013/0105304 | A1 | 5/2013 | Kaczur et al. |
| 2016/0161869 | A1 | 6/2016 | Avneri et al. |
| 2017/0259206 | A1 | 9/2017 | Masel et al. |
| 2017/0321334 | A1 | 11/2017 | Kuhl et al. |
| 2018/0111083 | A1 | 4/2018 | Masel |
| 2018/0274109 | A1 | 9/2018 | Kudo et al. |
| 2019/0062931 | A1 | 2/2019 | Stark et al. |
| 2019/0085477 | A1 | 3/2019 | Ono et al. |
| 2019/0127865 | A1 | 5/2019 | Li et al. |
| 2019/0226103 | A1 | 7/2019 | Kuhl et al. |
| 2020/0087233 | A1 | 3/2020 | Ono et al. |
| 2020/0087805 | A1 | 3/2020 | Ono et al. |
| 2020/0220185 | A1 | 7/2020 | Ma et al. |
| 2020/0240023 | A1 | 7/2020 | Cave et al. |
| 2020/0308718 | A1 | 10/2020 | Patru et al. |
| 2020/0376479 | A1 | 12/2020 | Masel |
| 2021/0002775 | A1 | 1/2021 | Matsumoto et al. |
| 2022/0267916 | A1 | 8/2022 | Zhao et al. |

FOREIGN PATENT DOCUMENTS

| | | |
|---|---|---|
| EP | 1038993 A1 | 9/2000 |
| EP | 1193329 A1 | 4/2002 |
| EP | 3378968 A1 | 9/2018 |
| JP | H08296077 A | 11/1996 |
| JP | 2003213472 A | 7/2003 |
| JP | 2012050531 A | 3/2012 |
| JP | 2014532119 A | 12/2014 |
| JP | 2015533944 A | 11/2015 |
| JP | 2018154898 A | 10/2018 |
| JP | 2018154899 A | 10/2018 |
| JP | 2018184655 A | 11/2018 |
| KR | 100962903 B1 | 6/2010 |
| WO | WO-2008124538 A1 | 10/2008 |
| WO | WO-2016039999 A1 | 3/2016 |
| WO | WO-2017144395 A1 | 8/2017 |
| WO | WO-2017169682 A1 | 10/2017 |
| WO | WO-2017190234 A1 | 11/2017 |
| WO | WO-2017192787 A1 | 11/2017 |
| WO | WO-2020143970 A1 | 7/2020 |
| WO | WO-2021007508 A1 | 1/2021 |

OTHER PUBLICATIONS

Weekes et al. ("Electrolytic CO2 Reduction in a Flow Cell"Acc. Chem. Res. 2018, 51, 910-918).*

U.S. Notice of Allowance dated Jul. 7, 2022 in U.S. Appl. No. 16/719,359.

Badami, M. "Leakage effects on the performance characteristics of a regenerative blower for the hydrogen recirculation of a PEM fuel cell," Energy Conversion and Management, vol. 55, Mar. 2012, pp. 20-25.

Badami, M., "Theoretical model with experimental validation of a regenerative blower for hydrogen recirculation in a PEM fuel cell system," Energy Conversion and Management, vol. 51, Issue 3, Mar. 2010, pp. 553-560.

Blaszczyk, J., "In-Situ Anode Recirculation Rate Measurement Method (Draft)," Ogura Industrial Corporation, Ballard Power Systems, Full Cell Seminar & Exposition 2011, Oct. 31-Nov. 3, 2011, 22 pages.

Casebolt, R., et al., "Effect of Electrolyte Composition and Concentration on Pulsed Potential Electrochemical CO2 Reduction," ChemElectroChem, Chemistry Europe, Accepted Manuscript, 25 pp.

Choo et al. Modulated Ionomer Distribution in the Catalyst Layer of Polymer Electrolyte Membrane Fuel Cells for High Temperature Operation, Chemsuschem, vol. 7, Issue 8, Aug. 2014, pp. 2335-2341.

Endrodi, B., "Multilayer Electrolyzer Stack Converts Carbon Dioxide to Gas Products at High Pressure with Multilayer Electrolyzer Stack Converts Carbon," acs Energy Lett. 2019, 4, 1770-1777.

Hori, Y., "Chapter 48: Co2-reduction, catalyzed by metal electrodes," Handbook of Fuel Cells—Fundamentals, Technology and Applications, vol. 2, Electrocatalysis, 2003. pp. 720-733.

International Search Report and Written Opinion dated Apr. 8, 2020, in PCT Application No. PCT/US2019/067169.

International Search Report and Written Opinion dated Mar. 19, 2020, in PCT Application No. PCT/US2019/063471.

James, B.D., et al. 2017 DOE Hydrogen and Fuel Cells Program Review, Fuel Cell Systems Analysis, Strategic Analysis, Project IDI FC163, Jun. 8, 2017, 34 pages.

Kaczur, J., et al., "A Review of the Use of Immobilized Ionic Liquids in the Electrochemical conversion of CO2," Journal of Carbon Research, ,2020 6, 33, 12 pages.

Kim, C., et al., "Impact of Pulsed Electrochemical Reduction of CO2 on the formation of C2+ Products over Cu," ACS Catal., 2020, 10, 12403-12413.

Kimura, K.W., et al., "Selective Electrochemical CO2 Reduction During Pulsed Potential Stems From Dynamic Interface," ACS Catalysis, ACS Paragon Plus Environment, University of Illinois at Urbana-Champaign, Downloaded from pubs.acs.org on Jun. 30, 2020, 31 pages.

Kutz, R. et al., Sustainion Imidazolium-Functionalized Polymers for Carbon Dioxide Electrolysis, Energy Technology, 2017, 5, pp. 929-936.

Li, et al., "Electrolysis of Co2 to Syngas in Bipolar Membrane-Based Electrochemical Cells," ACS Publications, ACS Energy Letters, 2016, 1, pp. 1149-1153.

Li, et al., "Electrolytic Conversion of Bicarbonate into CO in a Flow Cell," Cell Press, Joule 3, Jun. 19, 2019, pp. 1487-1497.

Ren, D., et al., "Selective Electrochemical Reduction of Carbon Dioxide to Ethylene and Ethanol on Copper(I) Oxide Catalysts," ACS Catal., 2015, 5, pp. 2814-2821.

Ren, D., et al., "The effects of currents and potentials on the selectivities of copper toward carbon dioxide electroreduction," Nature Communication, 2018, 9:925, pp. 1-8.

Salvatore, D., et al. "Electrolysis of Gaseous Co2 to CO in a Flow Cell with a Bipolar Memberane," ACS Energy Letters, 2018, 3, pp. 149-154.

Sharma, et al., "Electrocatalytic conversion of carbon dioxide to fuels: a review on the interaction between CO2 and the liquid electrolyte," WIREs Energy Environ 2017, 6:e239. doi: 10.1002/wene.239, pp. 1-21.

U.S. Corrected Notice of Allowability dated Dec. 30, 2021, in U.S. Appl. No. 16/719,359.

U.S. Non Final Office Action dated Feb. 23, 2022 in U.S. Appl. No. 16/697,066.

U.S Notice of Allowance dated Dec. 21, 2021, in U.S. Appl. No. 16/719,359.

U.S. Notice of Allowance dated Mar. 25, 2022 in U.S. Appl. No. 16/719,359.

U.S. Appl. No. 17/652,255, Inventors Zhao et al., filed Feb. 23, 2022.

U.S. Restriction Requirement dated Oct. 29, 2021, in U.S. Appl. No. 16/697,066.

Verma, et al., "The effect of electrolyte composition on the electroreduction of CO2 to CO on Ag based gas diffusion electrodes," Phys. Chem. Chem. Phys., 2016, 18, pp. 7075--7084.

Weekes D.M., et al., "Electrolytic CO2 Reduction in a Flow Cell", Accounts of Chemical Research, 2018, vol. 51 (4), pp. 910-918.

(56) References Cited

OTHER PUBLICATIONS

Xia, Chuan, et al., "Continuous production of pure liquid fuel solutions via electrocatalytic CO2 reduction using solid electrolyte devices," Nature Energy, http://www.nature.com/natureenergy; http://www.nature.com/natureenergy.
Xu, Y., et al., "Self-Cleaning CO2 Reduction Systems: Unsteady Electrochemical Forcing Enables Stability," ACS Energy Letters, 2021, 6, pp. 809-815.
IN Office Action dated Jan. 31, 2023 in Application No. IN202117028812.
U.S. Corrected Notice of Allowance dated Jan. 9, 2023 in U.S. Appl. No. 16/697,066.
U.S. Notice of Allowance dated Sep. 29, 2022 in U.S. Appl. No. 16/697,066.
U.S. Appl. No. 18/145,702 inventors Cave et al., filed Dec. 22, 2022.
BR Office Action dated Jul. 7, 2023, in Application No. BR112021011768-7 with English Translation.
IN Examination Report dated Dec. 5, 2022, in Application No. 202117030935 with English Translation.
International Preliminary Report on Patentability dated Jun. 10, 2021 in Application No. PCT/US2019/063471.
International Search Report and Written Opinion dated Jun. 29, 2022, in PCT Application No. PCT/US2022/070797.
SA Examination Report dated Aug. 8, 2023, in Application No. 521422124 with English Translation.
SA Examination Report dated Jun. 22, 2023, in Application No. 521422291 with English Translation.
Sharretts Plating Company. "What is Electrocleaning?" .. Https://www.sharrettsplating.com/blog/what-is-electrocleaning/ . Jul. 12, 2017, 3 pages.
BR Office Action dated Aug. 15, 2023, in Application No. BR1120210103686 with English translation.
International Preliminary Report on Patentability dated Sep. 7, 2023, in PCT Application No. PCT/US2022/070797.
JP Office Action dated Sep. 5, 2023, in Application No. JP2021-534155 with English translation.

* cited by examiner

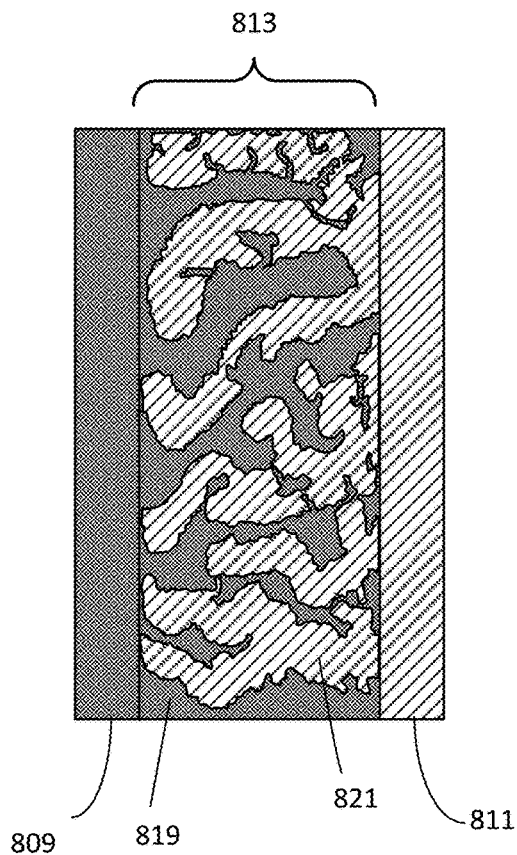
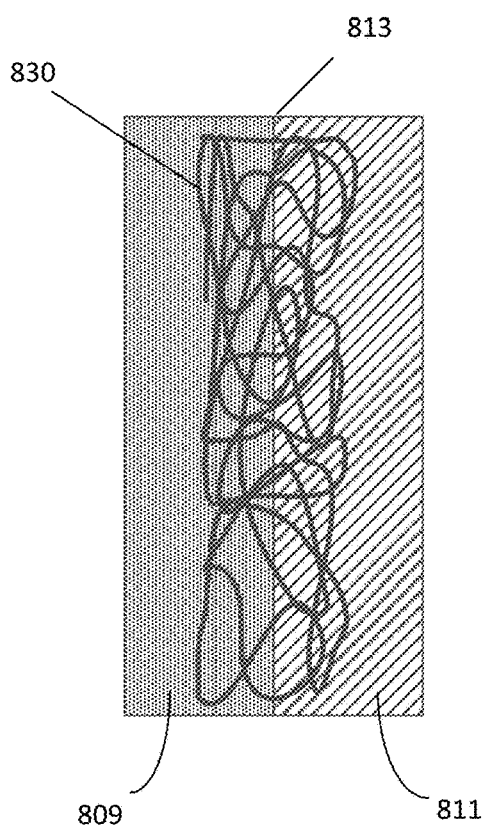
*Figure 8A*   *Figure 8B*
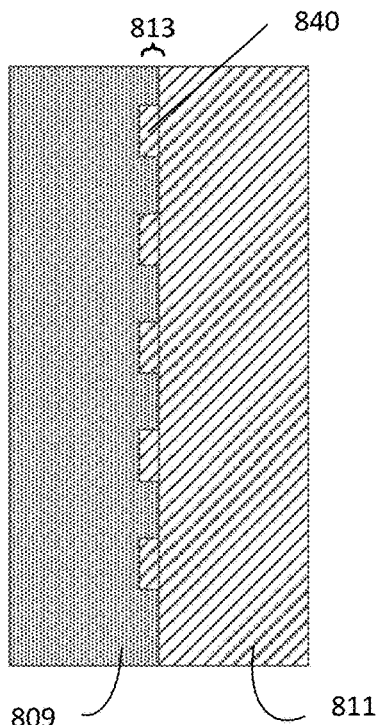
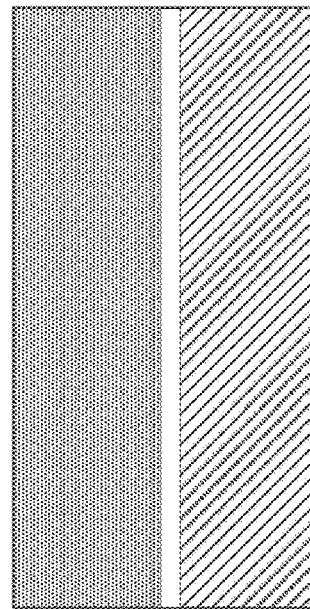
*Figure 8C*   *Figure 8D*

903   905

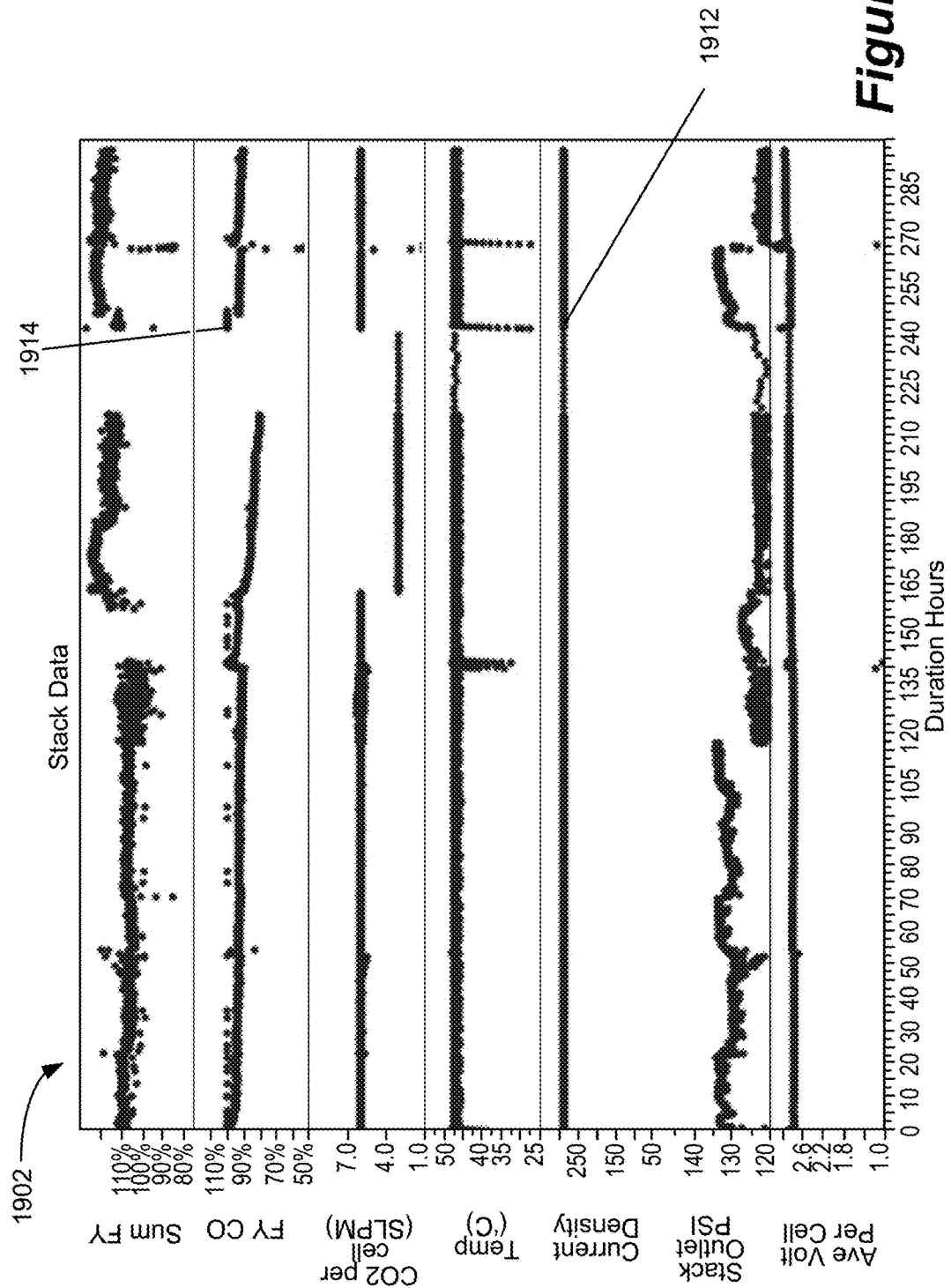
Figure 19, cont.

ELECTROLYZER AND METHOD OF USE

STATEMENT OF GOVERNMENT SUPPORT

This invention was made with government support under Award Number DE-AR00000819 awarded by the Advanced Research Projects Agency—Energy, Award Number DE-FE0031712 awarded by the National Energy Technology Laboratory, and Award Number NNX17CJ02C awarded by the National Aeronautics and Space Administration. The government has certain rights in the invention.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This disclosure relates generally to the electrolytic carbon oxide reduction field, and more specifically to systems and methods for electrolytic carbon oxide reactor operation.

BACKGROUND

Electrolytic carbon dioxide reactors must balance various operating conditions such as reactant composition at the anode and cathode, electrical energy delivered to the anode and cathode, and the physical chemical environment of the electrolyte, anode, and cathode. Balancing these conditions can have a strong impact on the electrolytic reactor's operating voltage, Faradaic yield, and mix of products generated at the cathode, including carbon monoxide (CO) and/or other carbon-containing products (CCPs) and hydrogen.

Background and contextual descriptions contained herein are provided solely for the purpose of generally presenting the context of the disclosure. Much of this disclosure presents work of the inventors, and simply because such work is described in the background section or presented as context elsewhere herein does not mean that such work is admitted prior art.

SUMMARY

One aspect of the disclosure relates to a method of operating a membrane electrode assembly (MEA) for $CO_x$ reduction. The method includes inletting a gas including $CO_x$ to the cathode of the MEA and applying a current to the MEA at a first current density, to thereby reduce $CO_x$ and produce a $CO_x$ reduction product; and during normal operation, automatically pausing applied current according to a current pause schedule.

In some embodiments, the current pause schedule includes current-on periods at the first current density separated by current pause periods, and the applied current during at least a portion of a current pause period is zero or at a second current density lower than the first current density.

In some embodiments, the duration of a current-on period is between 10 hours and 1000 hours. In some such embodiments, the duration of a current pause period is between 5 minutes and 10 hours.

In some embodiments, the duration of a current-on period between 1 hour and 10 hours. In some such embodiments, the duration of a current pause period is between 500 microseconds and 20 minutes.

In some embodiments, the duration of a current-on period between 3 minutes and 1 hour. In some such embodiments, the duration of a current pause period is between 500 microsecond and 10 minutes.

In some embodiments, the total current-on period duration is at least three times, at least five times, or at least ten times longer than the total current pause period duration. According to various embodiments, the current pause period durations and/or the current-on period durations may be constant or vary.

In some embodiments, automatically pausing the applied current includes a single step from the first current density. In some embodiments, automatically pausing the applied current includes multiple steps from the first current density. In some embodiments, automatically pausing the applied current includes a continuous ramp from the first current density.

In some embodiments, automatically pausing the applied current includes returning to the first current density using a single step. In some embodiments, automatically pausing the applied current includes returning to the first current density using multiple steps. In some embodiments, automatically pausing the applied current includes returning to the first current density using a continuous ramp.

In some embodiments, automatically pausing applied current includes reducing the applied current to zero. In some such embodiments, reducing the applied current to zero includes shorting the MEA. In some such embodiments, the MEA has an open circuit potential when the applied current is zero.

In some embodiments, the method further includes stopping flow of the gas while pausing current. In some embodiments, the method further includes maintaining but reducing a flow of the gas while pausing current. In some embodiments, the method further includes maintaining the flow of the gas at the same flow rate while pausing current.

In some embodiments, the method further includes inletting anode feed material to the anode of the MEA. In some embodiments, the method further includes stopping flow of the anode feed material while pausing current. In some embodiments, the method further includes including maintaining but reducing a flow of the anode feed material while pausing current. In some embodiments, the method further includes maintaining the flow of the anode feed material at the same flow rate while pausing current.

In some embodiments, the method further includes, prior to normal operation, performing a break-in procedure including applying current in a multi-step or continuous ramp to the first current density. In some such embodiments, the method further includes, prior to the break-in procedure, performing a hydration operation in which no current is applied and a cathode gas and an anode feed material are inlet to the cathode and anode, respectively, of the MEA. In some such embodiments, the method further includes ramping the temperature to operating temperature during the hydration period.

Another aspect of the disclosure involves a system including a $CO_x$ reduction reactor including one or more membrane electrode assemblies (MEAs) arranged in a stack, each MEA including a (i) cathode including a $CO_x$ reduction catalyst that promotes reduction of a carbon oxide, (ii) an anode including a catalyst that promotes oxidation, and (iii) a polymer electrolyte membrane (PEM) layer disposed between the cathode and the anode; and a power source controller configured to control current applied to $CO_x$ reduction reactor, and the controller is configured to, during normal operation of the $CO_x$ reduction reactor, automatically pause applied current according to a current pause schedule.

In some embodiments, the current pause schedule includes current-on periods at the first current density separated by current pause periods, and the applied current during at least a portion of a current pause period is zero or at a second current density lower than the first current density.

In some embodiments, the duration of a current-on period is between 10 hours and 1000 hours. In some such embodiments, the duration of a current pause period is between 5 minutes and 10 hours.

In some embodiments, the duration of a current-on period between 1 hour and 10 hours. In some such embodiments, the duration of a current pause period is between 500 microseconds and 20 minutes.

In some embodiments, the duration of a current-on period between 3 minutes and 1 hour. In some such embodiments, the duration of a current pause period is between 500 microsecond and 10 minutes.

In some embodiments, the total current-on period duration is at least three times, at least five times, or at least ten times longer than the total current pause period duration. According to various embodiments, the current pause period durations and/or the current-on period durations may be constant or vary. In some embodiments, automatically pausing the applied current includes a single step from the first current density. In some embodiments, automatically pausing the applied current includes multiple steps from the first current density. In some embodiments, automatically pausing the applied current includes a continuous ramp from the first current density. In some embodiments, automatically pausing the applied current includes returning to the first current density using a single step. In some embodiments, automatically pausing the applied current includes returning to the first current density using multiple steps. In some embodiments, automatically pausing the applied current includes returning to the first current density using a continuous ramp. In some embodiments, automatically pausing applied current includes reducing the applied current to zero. In some such embodiments, reducing the applied current to zero includes shorting the MEA. In some such embodiments, the MEA has an open circuit potential when the applied current is zero.

In some embodiments, the system is configured, prior to normal operation, to perform a break-in procedure including applying current in a multi-step or continuous ramp to the first current density.

In some embodiments, the system further includes a cathode subsystem configured to interact with a cathode of the $CO_x$ reduction reactor and including a carbon oxide flow controller configured to control flow of a carbon oxide feed stream to a cathode of the $CO_x$ reactor. In some such embodiments, the carbon oxide flow controller is configured to stop the flow of carbon oxide during a current pause. In some such embodiments, the carbon oxide flow controller is configured to maintain a flow of carbon oxide during a current pause, at the same or different flow rate. In some embodiments, the cathode subsystem is configured to controllably recycle unreacted carbon oxide from an outlet stream back to the cathode of a MEA.

In some embodiments, the system further includes an anode subsystem configured to interact with an anode of $CO_x$ reactor and including an anode water flow controller configured to control flow an anode feed stream to an anode of the $CO_x$ reactor. In some such embodiments, the anode water flow controller is configured to stop the flow of the anode feed stream during a current pause. In some such embodiments, the anode water flow controller is configured to maintain a flow of the anode feed stream during a current pause, at the same or different flow rate.

In some embodiments, the system further includes a controller configured to adjust the composition of the anode feed stream during a current pause. In some embodiments, the system further includes a backpressure controller configured to maintain pressure at the cathode side of a MEA. In some embodiments, the system further includes an anode water recirculation loop.

These and other features of the disclosure will be presented in more detail below with reference to the associated drawings.

BRIEF DESCRIPTION OF THE FIGURES

FIGS. 8A-8D present various MEA designs that contain features that resist delamination and optionally provide a pathway for the reaction products to leave the interface area.

DETAILED DESCRIPTION

Figure 1A:
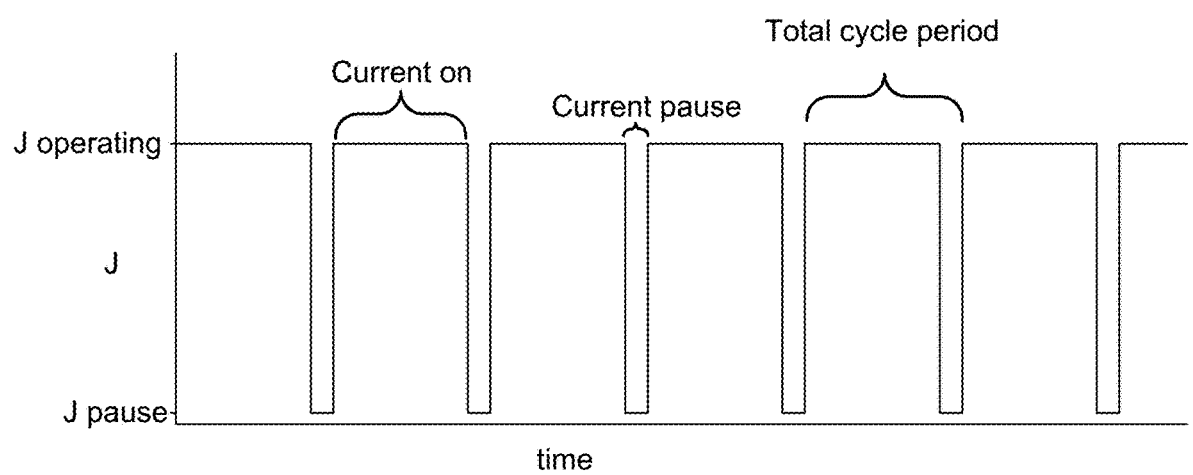
FIG. 1A is an illustration of an example of a current pause schedule or profile that may be implemented during operation of a carbon oxide reduction reactor (CRR) according to various embodiments of the disclosure.

Provided herein are methods for operating carbon oxide ($CO_x$) reduction reactors (CRR) and related apparatus. In some embodiments, the methods involve shutting off, reducing, or otherwise controlling current during various operation stages including hydration, break-in, normal operation, planned shut-offs, and extended shutoff or storage periods. As described further below and in the Examples, pausing current during normal operation has advantages including improving selectivity. Further, the system may be shut off for other purposes such as maintenance, storage and the like.

The CRRs described herein include one or more membrane electrode assemblies (MEAs), with multiple MEAs arranged in a stack. Examples of MEAs are described below with reference to FIGS. 2-9.

There are challenges in lowering current density or shutting off a system, certain of which are unique to CCRs and not found with MEA assemblies for other applications such as fuel cells or water electrolyzers. For example, anion-exchange polymer-electrolytes (either part of bipolar or AEM only membranes and cathode catalyst layers) will contain bicarbonate anions during $CO_2$ conversion. Bipolar and AEM-only MEAs including anion-exchange polymer electrolytes are described further below with reference to FIGS. 2-9. If the system is stopped and $CO_2$ is replaced by another gas in the system then the bicarbonate in the polymer-electrolyte may decompose to hydroxide and $CO_2$ over time, leaving the polymer-electrolyte in the hydroxide form. This can affect chemical stability of the polymer-electrolyte, swelling, water uptake, and other aspects of the MEA that can affect durability. In some embodiments, the MEA containing anion-exchange polymer-electrolytes is kept in contact with $CO_2$ during periods of shut down. If that is not possible or not performed, then before the system is started again, it may be beneficial to expose the MEA to $CO_2$ for a period of time to ensure it is in the bicarbonate form.

If bipolar MEAs are used for $CO_2$ conversion, water can build up in the cathode side of the device blocking access of $CO_x$ to the catalyst layer. The rate of water building at the cathode is proportional to the current density. Shutting off the system or lowering the current density decreases the rate of water building at the cathode. If the flow of $CO_2$ under typical operating conditions is not sufficient to remove water at a rate equal to or greater than the rate that it builds up, then shutting off or lowering the current can be used to reduce the rate of water while maintaining water removal by $CO_2$ gas flow to clear excess water out of the cathode and return to the desired operating conditions that give high current density and low voltage.

When a single cell or multiple cell stack is shut off, continued $CO_x$ flow through the cathode will remove $CO_x$ reduction products (e.g., CO, $CH_4$, and $CH_2CH_2$) and $H_2$ leaving only trace amounts of these compounds that may be absorbed in the polymer-electrolyte and slowly diffuse out with pure $CO_x$. At the anode, water is recirculated over a period of time and may become saturated with $O_2$ and contain traces of $CO_x$ reduction products and $H_2$ that cross through the membrane from the cathode. Continued circulation of water through the anode when the system is shut off will remove bubbles of gas phase $O_2$ from the anode compartment, but the anode will still be exposed to $O_2$ and other compounds from the cathode that are dissolved in the anode water. These compounds may diffuse to the cathode during shutdown, exposing the cathode to $O_2$ and other molecules after the current is stopped. If flow of $CO_x$ or water does not continue when the current is shut off, then the cathode contains a larger concentration of $H_2$ and other $CO_x$ and the anode will contain oxygen bubbles. This could lead to larger crossover of anode $O_2$ to the cathode and cathode $CO_x$ and products to the anode.

Starting the stack or operating the stack at room temperature leads to higher voltage and faster voltage decay than operating the stack at a higher temperature (e.g., 40° C.). Low temperature operation can be avoided by various techniques such as heating and circulating water through the anode of the stack before starting the flow of current. In some embodiments (for example if it is not possible to increase to desired temperature before flow of current) then going from 0 current directly to desired current or higher than desired current for a short period of time may be used to bring the stack up to temperature quickly and minimize operation of the stack at low temperature. The operating parameters described below address these challenges.

In some embodiments, current is applied to the MEA according to a particular current profile. The current profile can differ according to the operating mode, as described further below. Operating modes include hydration (pre-break-in), break-in, normal operation, planned shut off, and extended shut off or storage. Other cell operation parameters that may be adjusted during these operating modes, often as the current is adjusted according to a particular current profile, include (a) cathode gas composition, flow rate, and pressure, (b) anode water composition and flow rate, and (c) temperature. In some embodiments, voltage is controlled.

Applied current may be paused during operation of the cell. Current pausing may also be referred to as off/on cycling, with the current turned off and then on one or more times. Typically, the applied current is reduced to zero (i.e., turned off) during a current pause, although in some embodiments, it may be reduced to a non-zero level.

The tables below describe current profile, cathode gas composition and flow rate, anode water composition and flow rate, temperature, and voltage profile during particular operating modes. The current efficiency and example cell configurations are also included.

Hydration (Pre-Break-In)

In some embodiments, before applying any current to the cell, the MEA goes through a hydration step. This involves starting the reactant flows and heating the cell (or stack) so that steady state can be reached before applying current. Prior to stack or cell assembly, the MEAs are soaked in water to begin hydrating the MEA. After assembly, the anode water and cathode $CO_2$ flows and pressures are set. Flowing dry or humidified $CO_2$ may be beneficial in this step, even if dry $CO_2$ is used as an input during longer term operation. The anode outlet is observed to confirm that there are no bubbles exiting the outlet. If there are, it indicates significant $CO_2$ crossover (from a pinhole in the membrane) or a leak in the hardware. If the desired operating temperature is higher than ambient, then the cell is heated to the desired temperature after starting the anode water flow. During this step, the MEA continues to hydrate at the desired temperature.

TABLE 1

Example operating parameters during hydration

| | |
|---|---|
| Current profile | No current applied for the duration of the hydration period, e.g., 30 mins |
| Cathode gas composition, flow rate, and pressure | $CO_2$<br>Flow rate and pressure depend on size and particular system.<br>Examples:<br>(1) 50-1500 sccm $CO_2$, 90-110 psi for a 25 $cm^2$ Au system<br>(2) 220-9000 sccm $CO_2$, 90-110 psi for a 100 $cm^2$ Au system<br>(3) 50-1500 sccm $CO_2$, 90-110 psi for a 25 $cm^2$ Cu system<br>(4) 200-9000 sccm $CO_2$, 90-110 psi for a 100 $cm^2$ Cu system |
| Anode water composition and flow rate | Salt solution with dissolved $O_2$, $N_2$, $CO_2$ (diffused from cathode)<br>Flow rate depends on size and particular system.<br>Examples:<br>(1) 30-60 mL/min for 25 $cm^2$ Au system<br>(2) 120-4000 mL/min for 100 $cm^2$ Au system<br>(3) 30-60 mL/min for 25 $cm^2$ Cu system<br>(4) 120-4000 mL/min for 100 $cm^2$ Cu system |
| Temperature | Ramp from room temperature to operating temperature (e.g., 40-50° C. for Au system) for about first half of hydration period (e.g., 15 mins). Hold at operating temperature for remainder (e.g., 15 mins). |
| Voltage profile (per cell, cell voltages add together for stack voltage) | OCV for duration (e.g., 0-1.4 V) |
| Current efficiency | N/A - no current applied |
| Cell configuration examples | 1. 25 $cm^2$ bipolar MEA single cell system with Au/C catalyst<br>2. 100 $cm^2$ bipolar MEA single cell system with Au/C catalyst |

TABLE 1-continued

Example operating parameters during hydration

| | |
|---|---|
| | 3. 86 $cm^2$ bipolar MEA stack with >1 cell system with Au/C catalyst<br>4. 25 $cm^2$ bipolar MEA single cell system with Cu/C catalyst<br>5. 100 $cm^2$ bipolar MEA single cell system with Cu/C catalyst<br>6. 86 $cm^2$ bipolar MEA stack with >1 cell system with Cu/C catalyst<br>7. 25 or 100 $cm^2$ AEM only MEA single cell system with Cu/C catalyst<br>8. 86 $cm^2$ AEM only MEA with >1 cell system with Cu/C catalyst |

Break-In

The break-in period refers to procedures applied to a MEA or stack for the first time until the operating conditions and performance match the desired, long-term setup. In some embodiments, the first time an MEA is used, a procedure that differs from typical operation may be useful to get better performance. An MEA that has not been operated before may not be fully hydrated or changes in the structure may occur due to the temperature increase during operation. In some embodiments, the current is ramped up from a lower value to a higher value in a series of steps instead of jumping straight to the desired operational value. A gradual, linear ramp-up may also be used. Examples of current profiles are shown in FIG. 1A.

Figure 20:
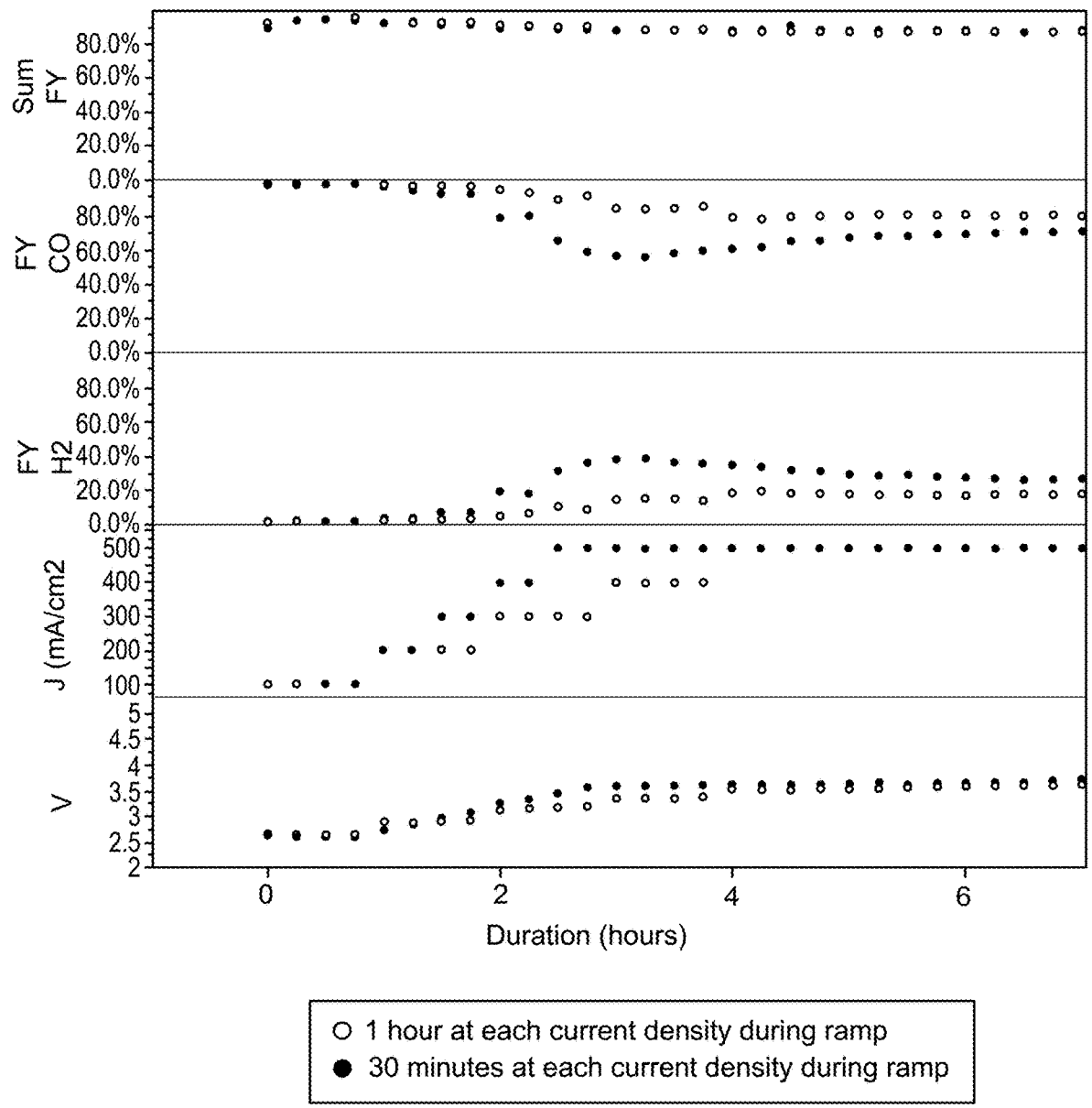
FIG. 20 shows results of two identical MEAs for producing CO tested using different ramp programs to reach the operating current density of 500 mA/cm$^2$.

The number of intermediate steps in a multi-step ramp up may be 1, 2, 3, 4, 5, or 6, for example. The duration at each step may be the same or differ. Example durations range from 30 minutes to 5 hours, e.g., 1 hour or 2 hours. FIG. 20 in the examples shows that a slower ramp can result in higher selectivity, which may be due to better hydration. In some embodiments, a duration of at least 1 hour at each intermediate step is used.

In embodiments in which the operating temperature is reached pre-break-in (e.g., during a hydration period), the temperature may be held constant at this temperature. In other embodiments, the temperature may be ramped up during the break-in procedure.

TABLE 2

Example operating parameters during break-in

| | |
|---|---|
| Current profile | Examples:<br>(1) 100, 200, 250 mA/$cm^2$, each for 2 hours, then ramp up to 300 mA/$cm^2$;<br>(2) 100, 300 mA/$cm^2$ for 2 hours, then ramp up to 600 mA/$cm^2$; |
| Cathode gas composition, flow rate, and pressure | $CO_2$, ($CO_2$ or CO for Cu catalyst), carbon containing products (CO, formic acid, methane, ethylene, ethanol, etc.), $H_2$, $H_2O$, small amount of $O_2$ and $N_2$ diffused from anode<br>Flow rate and pressure depend on size and particular system.<br>Examples:<br>(1) 50-1500 sccm $CO_2$, 90-110 psi for a 25 $cm^2$ Au system<br>(2) 200-9000 sccm $CO_2$, 90-110 psi for a 100 $cm^2$ Au system<br>(3) 50-1500 sccm $CO_2$, 90-110 psi for a 25 $cm^2$ Cu system<br>(4) 200-9000 sccm $CO_2$, 90-110 psi for a 100 $cm^2$ Cu system |

TABLE 2-continued

Example operating parameters during break-in

| | |
|---|---|
| Anode water composition and flow rate | Salt solution with dissolved $O_2$, $N_2$, $CO_2$ (diffused from cathode) Flow rate depends on size and particular system. Examples: (1) 30-60 mL/min for 25 $cm^2$ Au system (2) 120-4000 mL/min for 100 $cm^2$ Au system (3) 30-60 mL/min for 25 $cm^2$ Cu system (4) 120-4000 mL/min for 100 $cm^2$ Cu system |
| Temperature | Constant operating temperature |
| Voltage profile (per cell, cell voltages add together for stack voltage) | Voltage increases when current increases. |
| Current efficiency | Usually remains stable |
| Cell configuration examples | 1. 25 $cm^2$ bipolar MEA single cell system with Au/C catalyst 2. 100 $cm^2$ bipolar MEA single cell system with Au/C catalyst 3. 86 $cm^2$ bipolar MEA stack with >1 cell system with Au/C catalyst 4. 25 $cm^2$ bipolar MEA single cell system with Cu/C catalyst 5. 100 $cm^2$ bipolar MEA single cell system with Cu/C catalyst 6. 86 $cm^2$ bipolar MEA stack with >1 cell system with Cu/C catalyst 7. 25 or 100 $cm^2$ AEM only MEA single cell system with Cu/C catalyst 8. 86 $cm^2$ AEM only MEA with >1 cell system with Cu/C catalyst |

Normal Operation

Cycling the stack off and on during normal operation may be useful to maintain performance over extended periods of time. Stopping the current for as little as 5 microseconds, 500 microseconds, 5 seconds, or 30 seconds can improve the current efficiency and/or decrease the voltage. This is referred to as a current pause. As indicated below, in some embodiments, a current pause reduces to current to a non-zero level. For example, if typical operating current density is 300 $mA/cm^2$, then a current pause may involve reducing the current density to 50 $mA/cm^2$. In some embodiments, the voltage is controlled to achieve a similar cycling affect.

Low or no current leads to less water coming from the anode to the cathode of the cell (e.g., a bipolar MEA) and can be used to remove water if too much accumulates at the cathode of the cell. Low or no current also increases the voltage at the cathode, to a point where detrimental species that may accumulate on the catalyst surface may be are oxidized. Examples of possible impurities are carbon-containing intermediates formed during $CO_x$ reduction, metal impurities such as iron, or impurities introduced in the $CO_2$ stream such as $H_2S$. The same effect may be achieved by directly controlling the stack or cell voltage to the desired values.

According to various embodiments, the current may be paused at relatively frequent intervals (less than 10 hours, e.g., less than 2 hours), or at relatively infrequent intervals (tens of hours or more). Example operating conditions for frequent current pauses and relatively infrequent pauses are provided below in Tables 3 and 4, respectively.

In reducing current from the operating current to zero, or a second lower current density, various current profiles may be used. In some embodiments, a single step is used to go immediately to the lower level. In alternate embodiments, multiple steps are used or a continuous and gradual linear ramp may be used. Similarly, in returning to the operating current density, a single step may be used or the current may be ramped using multiple steps or a continuous, gradual ramp program.

In general, a current profile or current pause schedule is such that, the current-on period is significantly greater than the pauses periods. FIG. 1A shows a schematic example of a current pause schedule, which may also be referred to as a current profile. Current density is shown on the y-axis and time on the x-axis. As can be seen in FIG. 1A, current-on periods are separated at regular intervals by current pause periods. The intervals are the duration of the current on periods. The current density is reduced during the current pause periods from an operating current density (J operating) to a pause current density (J pause), which may be zero or non-zero as indicated above. The current pause period durations are significantly less than the current-on periods for high throughput. For example, the current-on periods may be at least 3 times, 5 times, 10 times, 20 times, 50 times, 100 times, or 500 times greater than the current pause periods. The improvement in selectivity is a function of both the current pause duration and the previous selectivity at the current on duration. Thus, longer current pause durations may be used with longer current on durations. Example on/off durations are given below:

| Example current on duration | Example current pause duration |
|---|---|
| 10-1000 hours | 5 minutes-10 hours |
| 10-500 hours | 5 minutes-10 hours |
| 10-100 hours | 1 second-1 hour |
| 1-10 hours | 500 microseconds-20 minutes |
| 3-60 minutes | 500 microseconds-10 minutes |
| 3-30 minutes | 500 microseconds-5 minutes |

In the example of FIG. 1A, the current pause schedule is constant for the duration of normal operation. In other embodiments, the intervals and/or pause durations may change over the course of operation. For example, current pauses may be programmed to be more frequent at an advanced operation stage. The current pause schedule is typically implemented automatically using a controller as described herein. The controller is programmed or otherwise configured to implement the schedule. In some embodiments, a user may set a schedule to be automatically implemented during operation.

Figure 1B:
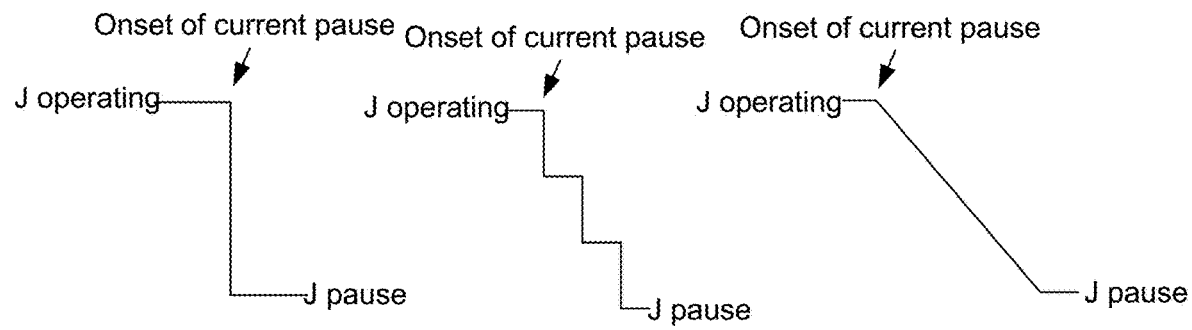
FIG. 1B shows schematic examples of current profiles in reducing current from an operating current density to the pause current density at the onset of a current pause period according to various embodiments of the disclosure.
Figure 1C:
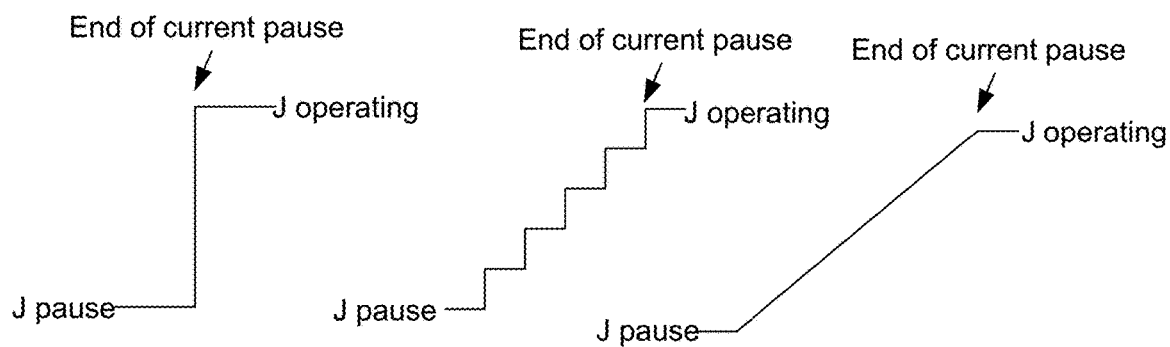
FIG. 1C shows schematic examples of current profiles returning to the operating current density at the end of a current pause period according to various embodiments of the disclosure.

Also in the example of FIG. 1A, single steps are used to reduce the current density at the onset of the pause period and to return to the operating density at the end of the pause period. As with increasing or reducing current in other operational modes described herein, the current may be ramped in multiple steps or continuously at the onset and/or end of a current pause period. FIG. 1B shows schematic examples of reducing current from the operating current density to the pause current density at the onset of a current pause period. Similarly, FIG. 1C shows schematic examples of returning to the operating current density at the end of a current pause period. The current profile at the onset may be chosen independently of that at the end of a pause period. For example, the current may be reduced in a single step and increased in multiple steps.

During current pauses, the cell voltage may be held at any of various values. In some cases, during a current pause, the anode and cathode are shorted (e.g., through the power supply or by connecting the electrodes with metal or other conductor) in which case the cell voltage is at or near 0 volts. In some cases, during a current pause, the anode and cathode are allowed to float and the cell's voltage is its open circuit voltage under the prevailing conditions, e.g., between 0.8V-1.4V, 0.8V-1.2V, or 0.9V-1.1V. Open circuit voltage represents the potential difference between the cell's electrodes when no external current is applied to or drawn from the cell. The open circuit voltage is a manifestation of the half reaction potentials at the anode and cathode. In some cases, during a current pause, the cell voltage is neither 0 volts (shorted) nor the open circuit voltage. Rather, the cell voltage is set to a different voltage by applying a controlled voltage and/or a controlled current between the anode and cathode. In certain embodiments, during a current pause, the cell's voltage is held between about 0 and 1.4 volts, or between 0.9 and 1.1 volts.

According to various embodiments, the flow to the cathode and/or anode may be stopped or allowed to continue during a current pause.

TABLE 3

Example operating parameters during normal operation - frequent current pauses

| | |
|---|---|
| Current profile | Examples:<br>(1) Hold at operating current for 55 minutes, drop immediately to 0 mA/cm² for 5 minutes. Repeat for the duration of normal operation period.<br>(2) Hold at operating current for 45 minutes, drop immediately to 0 mA/cm² for 15 minutes |
| Cathode gas composition, flow rate, and pressure | $CO_2$, ($CO_2$ or CO for Cu catalyst), carbon containing products (CO, formic acid, methane, ethylene, ethanol, etc.), $H_2$, $H_2O$, small amount of $O_2$ and $N_2$ diffused from anode<br>Cathode gas can flow at the same flow rate and pressure during pause as before/after |
| Anode water composition and flow rate | Salt solution with dissolved $O_2$, $N_2$, $CO_2$ (diffused from cathode)<br>Anode water can flow at same flow rate during pause as before/after |
| Temperature | Constant operating temperature |
| Voltage profile (per cell, cell voltages add together for stack voltage) | (1) When the cell is shorted, voltage is held at 0 V during current pause. The voltage at operating current doesn't change much after the pause vs. before the pause.<br>(2) Cell is left at OCV during current pause during the shut off (e.g., 0.8 V-1.4 V, 0.8 V-1.2 V, or 0.9 V-1.1 V) The voltage at operating current does not change much after the pause vs. before the pause. |
| Current efficiency | Given the high frequency of cycling current, the current efficiency remains stable when comparing before and after the current pause. |
| Cell configuration examples | 1. 25 cm² bipolar MEA single cell system with Au/C catalyst<br>2. 100 cm² bipolar MEA single cell system with Au/C catalyst<br>3. 86 cm² bipolar MEA stack with >1 cell system with Au/C catalyst<br>4. 25 cm² or 100 cm2 bipolar MEA single cell system with Cu/C catalyst with $CO_2$ as feed<br>5. 86 cm² bipolar MEA stack with >1 cell system with Cu/C catalyst with $CO_2$ as feed<br>6. 25 or 100 cm² AEM only MEA single cell system with Cu/C catalyst with $CO_2$ as feed<br>7. 86 cm² AEM only MEA with >1 cell system with Cu/C catalyst with $CO_2$ as feed<br>8. Similar setup as examples 4 to 7 above with Cu/C catalyst but with CO as feed instead of $CO_2$ |

TABLE 4

Example operating parameters during normal operation - less frequent current pauses

| | |
|---|---|
| Current profile | Examples:<br>(1) Set the current to 0 immediately and hold at 0 for 0-60 mins, then restart at the same current<br>(2) slowly ramp current down from the operating current to 0 within 0-60 mins and hold at 0 for 0-60 mins, then restart at the same current. |

TABLE 4-continued

Example operating parameters during normal operation - less frequent current pauses

| | |
|---|---|
| | (3) Set the current to 0 immediately and hold at 0 for 0-60 mins, then restart to the same current using a ramp-up program within 0-60 mins.<br>(4) use a program to slowly ramp current down from the operating current to 0 within 0-60 mins and hold at 0 for 0-60 mins, then restart to the same current using a ramp-up program within 0-60 mins |
| Cathode gas composition, flow rate, and pressure | $CO_2$, ($CO_2$ or CO for Cu catalyst), carbon containing products (CO, formic acid, methane, ethylene, ethanol, etc.), $H_2$, $H_2O$, small amount of $O_2$ and $N_2$ diffused from anode<br>Cathode gas can flow at the same flow rate and pressure during pause as before/after |
| Anode water composition and flow rate | Salt solution with dissolved $O_2$, $N_2$, $CO_2$ (diffused from cathode)<br>Anode water can flow at same flow rate during pause as before/after |
| Temperature | Constant operating temperature or completely turn off temperature control to have the cell return to room temperature (15-27 C.) |
| Voltage profile (per cell, cell voltages add together for stack voltage) | (1) When the cell is shorted, voltage is held at 0 V during current pause. The voltage at operating current doesn't change much after the pause vs. before the pause.<br>(2) Cell is left at OCV during current pause during the shut off (e.g., 0.8 V-1.4 V, 0.8 V-1.2 V, or 0.9 V-1.1 V) The voltage at operating current does not change much after the pause vs. before the pause. |
| Current efficiency | After the pause, current efficiency may increase (e.g., 0-25% increase compared to the current efficiency before the shut-off). The extent of the improvement depends on the level of current efficiency before the pause and the length of the pause. |
| Cell configuration examples | 1. 25 cm2 bipolar MEA single cell system with Au/C catalyst<br>2. 100 cm2 bipolar MEA single cell system with Au/C catalyst<br>3. 86 cm2 bipolar MEA stack with >1 cell system with Au/C catalyst<br>4. 25 cm² or 100 cm2 bipolar MEA single cell system with Cu/C catalyst with $CO_2$ as feed<br>5. 86 cm² bipolar MEA stack with >1 cell system with Cu/C catalyst with $CO_2$ as feed<br>6. 25 or 100 cm² AEM only MEA single cell system with Cu/C catalyst with $CO_2$ as feed<br>7. 86 cm² AEM only MEA with >1 cell system with Cu/C catalyst with $CO_2$ as feed<br>8. Similar setup as examples 4 to 7 above with Cu/C catalyst but with CO as feed instead of $CO_2$ |

Planned Shutoff

From time to time, depending on the use of the $CO_x$ electrolysis system, planned shutoffs may be performed in which the system is shut off for a brief period and then turned back on. Examples of reasons for planned shutoffs include maintenance of some part of the system (e.g., changing filters on anode water recycle loop, replacing a flow controller, or testing a temperature sensor), a planned power outage, and a pause in a downstream process using products of $CO_x$ reduction. Planned shutoffs have relatively short shutoff periods lasting from a few minutes to a few days.

The applied current is zero during a planned shutoff. According to various embodiments, it may be dropped to zero immediately (i.e., a single step) or ramped down either in multiple steps or a continuous ramp.

TABLE 5

Example operating parameters for planned shutoff

| | |
|---|---|
| Current profile | (1) Drop to 0 immediately; (2) use a program to slowly ramp current down from the operating current. |
| Cathode gas composition, flow rate, and pressure | $CO_2$, ($CO_2$ or CO for Cu catalyst), carbon containing products (CO, formic acid, methane, ethylene, ethanol, etc.), $H_2$, $H_2O$, small amount of $O_2$ and $N_2$ diffused from anode<br>Cathode gas flows at the same flow rate as before shutting off, or completely stop cathode. Example flows and gas pressures are as in Table 1. |
| Anode water composition and flow rate | During shutoff: salt solution with dissolved $O_2$, $N_2$, $CO_2$ (diffused from cathode), small amount of $H_2$ and CO<br>Anode water can flow at same flow rate during shutoff as before, or it can be turned off |
| Temperature | Constant operating temperature or completely turn off temperature control to have the cell return to room temperature (15-27 C.) |
| Voltage profile (per cell, cell voltages add together for stack voltage) | (1) When the cell is shorted, voltage is held at 0 V during current pause. The voltage at operating current doesn't change much after the pause vs. before the pause.<br>(2) Cell is left at OCV during current pause during the shut off (e.g., 0.8 V-1.4 V, 0.8 V-1.2 V, or 0.9 V-1.1 V) The voltage at operating current does not change much after the pause vs. before the pause. |
| Current efficiency | After the pause, current efficiency may increase (e.g., 0-25% increase compared to the current efficiency before the shut-off). The extent of the improvement depends on the level of current efficiency before the pause and the length of the pause. |
| Cell configuration examples | 1. 25 cm² bipolar MEA single cell system with Au/C catalyst<br>2. 100 cm² bipolar MEA single cell system with Au/C catalyst<br>3. 86 cm2 bipolar MEA stack with >1 cell system with Au/C catalyst<br>4. 25 cm² or 100 cm2 bipolar MEA single cell system with Cu/C catalyst with $CO_2$ as feed<br>5. 86 cm² bipolar MEA stack with >1 cell system with Cu/C catalyst with $CO_2$ as feed<br>6. 25 or 100 cm² AEM only MEA single cell system with Cu/C catalyst with $CO_2$ as feed<br>7. 86 cm² AEM only MEA with >1 cell system with Cu/C catalyst with $CO_2$ as feed<br>8. Similar setup as examples 4 to 7 above with Cu/C catalyst but with CO as feed instead of $CO_2$ |

Extended Shut Off and Storage

At times it may be desirable for the system or stack to be shut off for an extended period. For example, a holiday shut down of the facility, movement of the system to a new facility, or interruption in $CO_x$ supply. During this time it is expected that the system could be completely disconnected from external inputs. Gases or aqueous solutions different than those used during normal operation could be sealed into the anode or cathode in this case. The start-up procedure after the extended shutoff or storage period can be the same as the break-in procedure described above.

TABLE 6

Example operating parameters for extended shutoff

| | |
|---|---|
| Current profile | (1) Drop to 0 immediately; (2) use a program to slowly ramp current down from the operating current. |
| Cathode gas composition, flow rate, and pressure | In some embodiments, the cathode gas chamber is filled with $CO_2$ to make sure that the polymer electrolyte is in the $HCO_3^-$ anion form. In other embodiments, the gas space is filled with air. The pressure may ambient pressure for both cases or held at elevated pressure. |
| Anode water composition and flow rate | During shutoff: salt solution with dissolved $O_2$, $N_2$, $CO_2$ (diffused from cathode), small amount of $H_2$ and CO<br>During shutoff, anode water flows slower or shutoff completely before flowing at the same rate as before shutting off to making sure that the anode chamber is filled with the electrolyte to hydrate the membrane |
| Temperature | The temperature control is turned off and the cell is returned to room temperature (15-27 C.) |
| Voltage profile (per cell, cell voltages add together for stack voltage) | (1) When the cell is shorted, voltage is held at 0 V during current pause. The voltage at operating current doesn't change much after the pause vs. before the pause.<br>(2) Cell is left at OCV during storage. In approximately the first 10 hours of storage, the voltage is in the range of 0.8-1.4 V. The voltage then slowly decreases to 0.0 V over the course of several days. The voltage at operating current doesn't change much after storage vs before storage. |
| Current efficiency | After the pause, current efficiency may increase (e.g., 0-25% increase compared to the current efficiency before the shut-off). The extent of the improvement depends on the level of current efficiency before the pause and the length of the shutoff. |
| Cell configuration examples | 1. 25 cm² bipolar MEA single cell system with Au/C catalyst<br>2. 100 cm² bipolar MEA single cell system with Au/C catalyst<br>3. 86 cm² bipolar MEA stack with >1 cell system with Au/C catalyst<br>4. 25 cm² or 100 cm2 bipolar MEA single cell system with Cu/C catalyst with $CO_2$ as feed<br>5. 86 cm² bipolar MEA stack with >1 cell system with Cu/C catalyst with $CO_2$ as feed<br>6. 25 or 100 cm² AEM only MEA single cell system with Cu/C catalyst with $CO_2$ as feed<br>7. 86 cm² AEM only MEA with >1 cell system with Cu/C catalyst with $CO_2$ as feed<br>8. Similar setup as examples 4 to 7 above with Cu/C catalyst but with CO as feed instead of $CO_2$ |

System

Figure 1D:
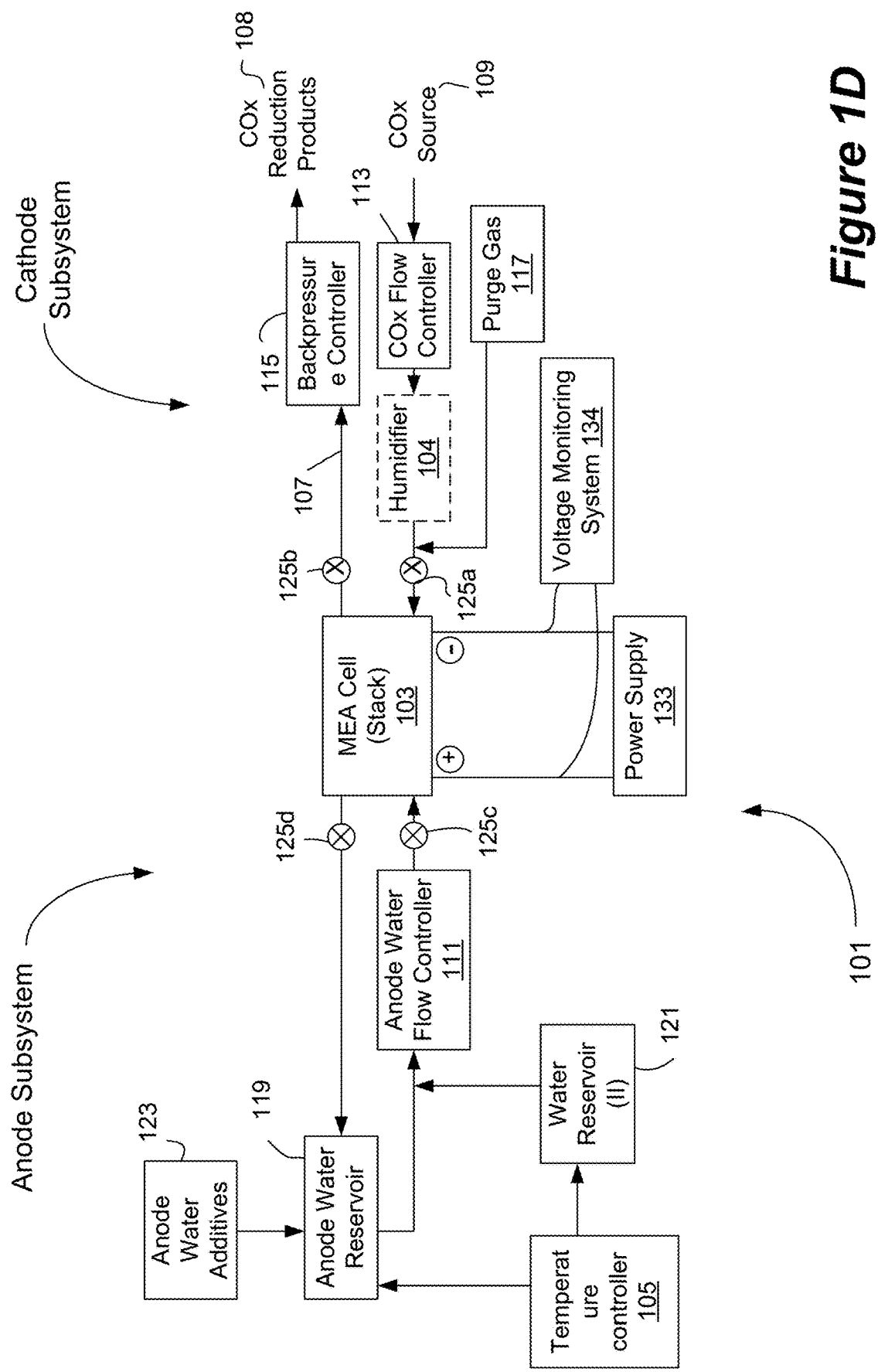
FIG. 1D is an illustration of an example of an electrolytic carbon oxide reduction system according to various embodiments of the disclosure.

FIG. 1D depicts a system 101 for controlling the operation of a carbon oxide reduction reactor 103 that may include a cell comprising a MEA such as any one or more of those described herein. The reactor may contain multiple cells or MEAs arranged in a stack. System 101 includes an anode subsystem that interfaces with an anode of reduction reactor 103 and a cathode subsystem that interfaces with a cathode of reduction reactor 103.

As depicted, the cathode subsystem includes a carbon oxide source 109 configured to provide a feed stream of carbon oxide to the cathode of reduction reactor 103, which, during operation, may generate an output stream that includes product(s) of a reduction reaction at the cathode. The product stream may also include unreacted carbon oxide and/or hydrogen. See 108.

The carbon oxide source 109 is coupled to a carbon oxide flow controller 113 configured to control the volumetric or mass flow rate of carbon oxide to reduction reactor 103. One or more other components may be disposed on a flow path from flow carbon oxide source 109 to the cathode of reduction reactor 103. For example, an optional humidifier 104 may be provided on the path and configured to humidify the carbon oxide feed stream. Humidified carbon oxide may moisten one or more polymer layers of an MEA and thereby avoid drying such layers. Another component that may be disposed on the flow path is a purge gas inlet coupled to a purge gas source 117. In certain embodiments, purge gas source 117 is configured to provide purge gas during periods when current is paused to the cell(s) of reduction reactor 103. In some implementations, flowing a purge gas over an MEA cathode facilitates recovery of catalyst activity and/or selectivity. This may be due, at least in part, to flushing certain reaction intermediates off catalyst active sites and/or remove water from the cathode. Examples of purge gases include carbon dioxide, carbon monoxide, hydrogen, nitrogen, argon, helium, oxygen, and mixtures of any two or more of these.

During operation, the output stream from the cathode flows via a conduit 107 that connects to a backpressure controller 115 configured to maintain pressure at the cathode side of the cell within a defined range (e.g., about 50 to 800 psig, depending on the system configuration). The output stream may provide the reaction products 108 to one or more components (not shown) for separation and/or concentration.

In certain embodiments, the cathode subsystem is configured to controllably recycle unreacted carbon oxide from the outlet stream back to the cathode of reduction reactor 103. In some implementations, the output stream is processed to remove reduction product(s) and/or hydrogen before recycling the carbon oxide. Depending upon the MEA configuration and operating parameters, the reduction product(s) may be carbon monoxide, hydrogen, hydrocarbons such as methane and/or ethylene, oxygen-containing organic compounds such as formic acid, acetic acid, and any combinations thereof In certain embodiments, one or more components, not shown, for removing water from the product stream are disposed downstream form the cathode outlet. Examples of such components include a phase separator configured to remove liquid water from the product gas stream and/or a condenser configured to cool the product stream gas and thereby provide a dry gas to, e.g., a downstream process when needed. In some implementations, recycled carbon oxide may mix with fresh carbon oxide from source 109 upstream of the cathode.

As depicted in FIG. 1, an anode subsystem is configured to provide an anode feed stream to an anode side of the carbon oxide reduction reactor 103. In certain embodiments, the anode subsystem includes an anode water source, not shown, configured to provide fresh anode water to a recirculation loop that includes an anode water reservoir 119 and an anode water flow controller 111. The anode water flow controller 111 is configured to control the flow rate of anode water to or from the anode of reduction reactor 103. In the depicted embodiment, the anode water recirculation loop is coupled to components for adjusting the composition of the anode water. These may include a water reservoir 121 and/or an anode water additives source 123. Water reservoir 121 is configured to supply water having a composition that is different from that in anode water reservoir 119 (and circulating in the anode water recirculation loop). In one example, the water in water reservoir 121 is pure water that can dilute solutes or other components in the circulating anode water. Pure water may be conventional deionized water even ultrapure water having a resistivity of, e.g., at least about 15 MOhm-cm or over 18.0 MOhm-cm. Anode water additives source 123 is configured to supply solutes such as salts and/or other components to the circulating anode water.

During operation, the anode subsystem may provide water or other reactant to the anode of reactor 103, where it at least partially reacts to produce an oxidation product such as oxygen. The product along with unreacted anode feed material is provided in a reduction reactor outlet stream. Not shown in FIG. 1D is an optional separation component that may be provided on the path of the anode outlet stream and configured to concentrate or separate the oxidation product from the anode product stream.

Other control features may be included in system 101. For example, a temperature controller may be configured to heat and/or cool the carbon oxide reduction reactor 103 at appropriate points during its operation. In the depicted embodiment, a temperature controller 105 is configured to heat and/or cool anode water provided to the anode water recirculation loop. For example, the temperature controller 105 may include or be coupled to a heater and/or cooler that may heat or cool water in anode water reservoir 119 and/or water in reservoir 121. In some embodiments, system 101 includes a temperature controller configured to directly heat and/or cool a component other than an anode water component. Examples of such other components in the cell or stack and the carbon oxide flowing to the cathode.

Depending upon the phase of the electrochemical operation, including whether current is paused to carbon oxide reduction reactor 103, certain components of system 101 may operate to control non-electrical operations. For example, system 101 may be configured to adjust the flow rate of carbon oxide to the cathode and/or the flow rate of anode feed material to the anode of reactor 103. Components that may be controlled for this purpose may include carbon oxide flow controller 113 and anode water controller 111.

In addition, depending upon the phase of the electrochemical operation including whether current is paused, certain components of system 101 may operate to control the composition of the carbon oxide feed stream and/or the anode feed stream. For example, water reservoir 121 and/or anode water additives source 123 may be controlled to adjust the composition of the anode feed stream. In some cases, additives source 123 may be configured to adjust the concentration of one or more solutes such as one or more salts in an aqueous anode feed stream.

In some cases, a temperature controller such controller 105 is configured to adjust the temperature of one or more components of system 101 based on a phase of operation. For example, the temperature of cell 103 may be increased or decreased during break-in, a current pause in normal operation, and/or storage.

In some embodiments, a carbon oxide electrolytic reduction system is configured to facilitate removal of a reduction cell from other system components. This may be useful with the cell needs to be removed for storage, maintenance, refurbishment, etc. In the depicted embodiments, isolation valves 125a and 125b are configured to block fluidic communication of cell 103 to a source of carbon oxide to the cathode and backpressure controller 115, respectively. Additionally, isolation valves 125c and 125d are configured to block fluidic communication of cell 103 to anode water inlet and outlet, respectively.

The carbon oxide reduction reactor 103 may also operate under the control of one or more electrical power sources and associated controllers. See, block 133. Electrical power source and controller 133 may be programmed or otherwise configured to control current supplied to and/or to control voltage applied to the electrodes in reduction reactor 103. The current and/or voltage may be controlled to execute the current schedules and/or current profiles described elsewhere herein. For example, electrical power source and controller 133 may be configured to periodically pause current applied to the anode and/or cathode of reduction reactor 103. Any of the current profiles described herein may be programmed into power source and controller 133.

In certain embodiments, electric power source and controller 133 performs some but not all the operations necessary to implement desired current schedules and/or profiles in the carbon oxide reduction reactor 103. A system operator or other responsible individual may act in conjunction with electrical power source and controller 133 to fully define the schedules and/or profiles of current applied to reduction reactor 103. For example, an operator may institute one or more current pauses outside the set of current pauses programmed into power source and controller 133.

In certain embodiments, the electrical power source and controller acts in concert with one or more other controllers or control mechanisms associated with other components of system 101. For example, electrical power source and controller 133 may act in concert with controllers for controlling the delivery of carbon oxide to the cathode, the delivery of anode water to the anode, the addition of pure water or additives to the anode water, and any combination of these features. In some implementations, one or more controllers are configured to control or operate in concert to control any combination of the following functions: applying current and/or voltage to reduction cell 103, controlling backpressure (e.g., via backpressure controller 115), supplying purge gas (e.g., using purge gas component 117), delivering carbon oxide (e.g., via carbon oxide flow controller 113), humidifying carbon oxide in a cathode feed stream (e.g., via humidifier 104), flow of anode water to and/or from the anode (e.g., via anode water flow controller 111), and anode water composition (e.g., via anode water source 105, pure water reservoir 121, and/or anode water additives component 123).

In the depicted embodiment, a voltage monitoring system 134 is employed to determine the voltage across an anode and cathode of an MEA cell or across any two electrodes of a cell stack, e.g., determining the voltage across all cells in a multi-cell stack. The voltage determined in this way can be used to control the cell voltage during a current pause, inform the duration of a pause, etc. In certain embodiments, voltage monitoring system 134 is configured to work in concert with power supply 133 to cause reduction cell 103 to remain within a specified voltage range. For example, power supply 133 may be configured to apply current and/or voltage to the electrodes of reduction cell 103 in a way that maintains the cell voltage within a specified range during a current pause. If, for example during a current pause, the cell's open circuit voltage deviates from a defined range (as determined by voltage monitoring system 134), power supply may be configured to apply current or voltage to the electrodes to maintain the cell voltage within the specified range.

An electrolytic carbon oxide reduction system such as that depicted in FIG. 1D may employ a control system that includes one or more controllers and one or more controllable components such as pumps, sensors, dispensers, valves, and power supplies. Examples of sensors include pressure sensors, temperature sensors, flow sensors, conductivity sensors, voltmeters, ammeters, electrolyte composition sensors including electrochemical instrumentation, chromatography systems, optical sensors such as absorbance measuring tools, and the like. Such sensors may be coupled to inlets and/or outlets of an MEA cell (e.g., in a flow field), in a reservoir for holding anode water, pure water, salt solution, etc., and/or other components of an electrolytic carbon oxide reduction system.

Among the various functions that may be controlled by one or more controllers are: applying current and/or voltage to a carbon oxide reduction cell, controlling backpressure on an outlet from a cathode on such cell, supplying purge gas to a cathode inlet, delivering carbon oxide to the cathode inlet, humidifying carbon oxide in a cathode feed stream, flowing anode water to and/or from the anode, and controller anode feed composition. Any one or more of these functions may have a dedicated controller for controlling its function alone. Any two or more of these functions may share a controller. In some embodiments, a hierarchy of controllers is employed, with at least one master controller providing instructions to two or more component controllers. For example, a system may comprise a master controller configured to provide high level control instructions to (i) a power supply to a carbon oxide reduction cell, (ii) a cathode feed stream flow controller, and (iii) an anode feed stream flow controller. For example, a programmable logic controller (PLC) may be used to control individual components of the system.

In certain embodiments, a control system is configured to apply current to a carbon oxide reduction cell comprising an MEA in accordance with a current schedule, which may have any of the characteristics described herein. For example, the current schedule may provide periodic pauses in the applied current. In some cases, the control system provides the current pauses with defined profiles such as ramps and/or step changes as described herein.

In certain embodiments, a control system is configured to control the flow rate of one or more feed streams (e.g., a cathode feed stream such as a carbon oxide flow and an anode feed stream) in concert with a current schedule. For example, the flow of carbon oxide or a purge gas may be turned on, turned off, or otherwise adjusted when current applied to an MEA cell is paused.

In certain embodiments, a control system may maintain salt concentration at defined levels and/or recover and recirculate anode water. In certain embodiments, the salt concentration is adjusted in concert with a schedule of applied current pauses to an MEA cell. Under control of the control system, the system may, for example, (a) recirculate anode water flowing out of an anode, (b) adjust the composition and/or flow rate of anode water into the anode, (c) move water from cathode outflow back to anode water, and/or (d) adjust the composition and/or flow rate of water recovered from the cathode stream, before returning to the anode. Note that the (d) may account for carbon oxide reduction products in recovered water from the cathode. However, in some implementations, this need not be considered as some reduction products may subsequently oxidize to harmless products at the anode.

A controller may include any number of processors and/or memory devices. The controller may contain control logic such software or firmware and/or may execute instructions provided from another source. A controller may be integrated with electronics for controlling operation the electrolytic cell before, during, and after reducing a carbon oxide. The controller may control various components or subparts of one or multiple electrolytic carbon oxide reduction systems. The controller, depending on the processing requirements and/or the type of system, may be programmed to control any of the processes disclosed herein, such as delivery of gases, temperature settings (e.g., heating and/or cooling), pressure settings, power settings (e.g., electrical voltage and/or current delivered to electrodes of an MEA cell), liquid flow rate settings, fluid delivery settings, and dosing of purified water and/or salt solution. These controlled processes may be connected to or interfaced with one or more systems that work in concert with the electrolytic carbon oxide reduction system.

In various embodiments, a controller comprises electronics having various integrated circuits, logic, memory, and/or software that receive instructions, issue instructions, control operations described herein. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a process on one or more components of an electrolytic carbon oxide reduction system. The operational parameters may, in some embodiments, be part of a recipe defined by process engineers to accomplish one or more processing steps during generation of a particular reduction product such as carbon monoxide, hydrocarbons, and/or other organic compounds.

The controller, in some implementations, may be a part of or coupled to a computer that is integrated with, coupled to the system, otherwise networked to the system, or a combination thereof. For example, the controller may utilize instructions stored remotely (e.g., in the "cloud") and/or execute remotely. The computer may enable remote access to the system to monitor current progress of electrolysis operations, examine a history of past electrolysis operations, examine trends or performance metrics from a plurality of electrolysis operations, to change parameters of current processing, to set processing steps to follow a current processing, or to start a new process. In some examples, a remote computer (e.g. a server) can provide process recipes to a system over a network, which may include a local network or the interne. The remote computer may include a user interface that enables entry or programming of parameters and/or settings, which are then communicated to the system from the remote computer. In some examples, the controller receives instructions in the form of data, which specify parameters for each of the processing steps to be performed during one or more operations.

The controller may be distributed, such as by comprising one or more discrete controllers that are networked together and working towards a common purpose, such as applying current to an MEA cell and other process controls described herein. An example of a distributed control system for such purposes includes one or more processors on a system for electrolytically reducing a carbon oxide and one or more processors located remotely (such as at the platform level or as part of a remote computer) that combine to control a process.

In certain embodiments, an electrolytic carbon oxide reduction system is configured and controlled to avoid precipitating salt within an MEA. Precipitated salt can block channels and/or have other impacts that degrade an MEA cell's performance. In some cases, a cell may become too dry, e.g., at the cathode side, because dry gaseous reactant removes too much water from the MEA, particularly on the cathode side. This issue, which may cause salt precipitation, may be addressed by controlling the water partial pressure in the gas inlet stream (e.g., by humidifying the gaseous carbon oxide source gas). In some cases, a salt concentration in anode water is sufficiently high that it promotes salt precipitation in the MEA. This issue may be addressed by flushing the MEA with pure water during a current pause.

MEA Design Embodiments
MEA Overview

In various embodiments, an MEA contains an anode layer, a cathode layer, electrolyte, and optionally one or more other layers. The layers may be solids and/or gels. The layers may include polymers such as ion-conducting polymers.

When in use, the cathode of an MEA promotes electrochemical reduction of $CO_x$ by combining three inputs: $CO_x$, ions (e.g., protons) that chemically react with $CO_x$, and electrons. The reduction reaction may produce CO, hydrocarbons, and/or oxygen and hydrogen containing organic compounds such as methanol, ethanol, and acetic acid. When in use, the anode of an MEA promotes an electrochemical oxidation reaction such as electrolysis of water to produce elemental oxygen and protons. The cathode and anode may each contain catalysts to facilitate their respective reactions.

The compositions and arrangements of layers in the MEA may promote high yield of a $CO_x$ reduction products. To this end, the MEA may facilitate any one or more of the following conditions: (a) minimal parasitic reduction reactions (non-$CO_x$ reduction reactions) at the cathode; (b) low loss of $CO_x$ reactants at anode or elsewhere in the MEA; (c) maintain physical integrity of the MEA during the reaction (e.g., prevent delamination of the MEA layers); (d) prevent $CO_x$ reduction product cross-over; (e) prevent oxidation production (e.g., $O_2$) cross-over; (f) maintain a suitable environment at the cathode for oxidation; (g) provide pathway for desired ions to travel between cathode and anode while blocking undesired ions; and (h) minimize voltage losses. As explained herein, the presence of salts or salt ions in the MEA can facilitate some of all of these conditions.

$CO_x$ Reduction Considerations

Polymer-based membrane assemblies such as MEAs have been used in various electrolytic systems such as water electrolyzers and in various galvanic systems such as fuel cells. However, $CO_x$ reduction presents problems not encountered, or encountered to a lesser extent, in water electrolyzers and fuel cells.

For example, for many applications, an MEA for $CO_x$ reduction requires a lifetime on the order of about 50,000 hours or longer (approximately five years of continuous operation), which is significantly longer than the expected lifespan of a fuel cell for automotive applications; e.g., on the order of 5,000 hours. And for various applications, an MEA for $CO_x$ reduction employs electrodes having a relatively large surface area by comparison to MEAs used for fuel cells in automotive applications. For example, MEAs for $CO_x$ reduction may employ electrodes having surface areas (without considering pores and other nonplanar features) of at least about 500 $cm^2$.

$CO_x$ reduction reactions may be implemented in operating environments that facilitate mass transport of particular reactant and product species, as well as to suppress parasitic reactions. Fuel cell and water electrolyzer MEAS often cannot produce such operating environments. For example, such MEAS may promote undesirable parasitic reactions such as gaseous hydrogen evolution at the cathode and/or gaseous $CO_2$ production at the anode.

In some systems, the rate of a $CO_x$ reduction reaction is limited by the availability of gaseous $CO_x$ reactant at the cathode. By contrast, the rate of water electrolysis is not significantly limited by the availability of reactant: liquid water tends to be easily accessible to the cathode and anode, and electrolyzers can operate close to the highest current density possible.

MEA Configurations

In certain embodiments, an MEA has a cathode layer, an anode layer, and a polymer electrolyte membrane (PEM) between the anode layer and the cathode layer. The polymer electrolyte membrane provides ionic communication between the anode layer and the cathode layer, while preventing electronic communication, which would produce a short circuit. The cathode layer includes a reduction catalyst and a first ion-conducting polymer. The cathode layer may also include an ion conductor and/or an electron conductor. The anode layer includes an oxidation catalyst and a second ion-conducting polymer. The anode layer may also include an ion conductor and/or an electron conductor. The PEM includes a third ion-conducting polymer.

In certain embodiments, the MEA has a cathode buffer layer between the cathode layer and the polymer electrolyte membrane. The cathode buffer includes a fourth ion-conducting polymer.

In certain embodiments, the MEA has an anode buffer layer between the anode layer and the polymer electrolyte membrane. The anode buffer includes a fifth ion-conducting polymer.

In connection with certain MEA designs, there are three available classes of ion-conducting polymers: anion-conductors, cation-conductors, and mixed cation-and-anion-conductors. In certain embodiments, at least two of the first, second, third, fourth, and fifth ion-conducting polymers are from different classes of ion-conducting polymers.

Conductivity and Selectivity of Ion-Conducting Polymers for MEA Layers

The term "ion-conducting polymer" is used herein to describe a polymer electrolyte having greater than about 1 mS/cm specific conductivity for anions and/or cations. The term "anion-conductor" describes an ion-conducting polymer that conducts anions primarily (although there will still be some small amount of cation conduction) and has a transference number for anions greater than about 0.85 at around 100 micron thickness. The terms "cation-conductor" and/or "cation-conducting polymer" describe an ion-conducting polymer that conducts cations primarily (e.g., there can still be an incidental amount of anion conduction) and has a transference number for cations greater than approximately 0.85 at around 100 micron thickness. For an ion-conducting polymer that is described as conducting both anions and cations (a "cation-and-anion-conductor"), neither the anions nor the cations has a transference number greater than approximately 0.85 or less than approximately 0.15 at around 100 micron thickness. To say a material conducts ions (anions and/or cations) is to say that the material is an ion-conducting material or ionomer. Examples of ion-conducting polymers of each class are provided in the below Table.

| Ion-Conducting Polymers | | | |
|---|---|---|---|
| Class | Description | Common Features | Examples |
| A. Anion-conducting | Greater than approximately 1 mS/cm specific conductivity for anions, which have a transference number greater than approximately 0.85 at around 100 micron thickness | Positively charged functional groups are covalently bound to the polymer backbone | aminated tetramethyl polyphenylene; poly(ethylene-co-tetrafluoroethylene)-based quaternary ammonium polymer; quaternized polysulfone |
| B. Conducts both anions and cations | Greater than approximately 1 mS/cm conductivity for ions (including both cations and anions), which have a transference number between approximately 0.15 and 0.85 at around 100 micron thickness | Salt is soluble in the polymer and the salt ions can move through the polymer material | polyethylene oxide; polyethylene glycol; poly(vinylidene fluoride); polyurethane |
| C. Cation-conducting | Greater than approximately 1 mS/cm specific conductivity for cations, which have a transference number greater than approximately 0.85 at around 100 micron thickness | Negatively charged functional groups are covalently bound to the polymer backbone | perfluorosulfonic acid polytetrafluoroethylene co-polymer; sulfonated poly(ether ether ketone); poly(styrene sulfonic acid- co-maleic acid) |

Some Class A ion-conducting polymers are known by tradenames such as 2259-60 (Pall RAI), AHA by Tokuyama Co, Fumasep® FAA- (fumatech GbbH), Sustanion®, Morgane ADP by Solvay, or Tosflex® SF-17 by Tosoh anion exchange membrane material. Further class A ion-conducting polymers include HNN5/HNN8 by Ionomr, FumaSep by Fumatech, TM1 by Orion, and PAP-TP by W7energy. Some Class C ion-conducting polymers are known by tradenames such as various formulations of Nafion® (DuPont™), GORE-SELECT® (Gore), Fumapem® (fumatech GmbH), and Aquivion® PFSA (Solvay).

Bipolar MEA for COx Reduction

In certain embodiments, the MEA includes a bipolar interface with an anion-conducting polymer on the cathode side of the MEA and an interfacing cation-conducting polymer on the anode side of the MEA. In some implementations, the cathode contains a first catalyst and an anion-conducting polymer. In certain embodiments, the anode contains a second catalyst and a cation-conducting polymer. In some implementations, a cathode buffer layer, located between the cathode and PEM, contains an anion-conducting polymer. In some embodiments, an anode buffer layer, located between the anode and PEM, contains a cation-conducting polymer.

During operation, an MEA with a bipolar interface moves ions through a polymer-electrolyte, moves electrons through metal and/or carbon in the cathode and anode layers, and moves liquids and gas through pores in the layers.

In embodiments employing an anion-conducting polymer in the cathode and/or in a cathode buffer layer, the MEA can decrease or block unwanted reactions that produce undesired products and decrease the overall efficiency of the cell. In embodiments employing a cation-conducting polymer in the anode and/or in an anode buffer layer can decrease or block unwanted reactions that reduce desired product production and reduce the overall efficiency of the cell.

For example, at levels of electrical potential used for cathodic reduction of $CO_2$, hydrogen ions may be reduced to hydrogen gas. This is a parasitic reaction; current that could be used to reduce $CO_2$ is used instead to reduce hydrogen ions. Hydrogen ions may be produced by various oxidation reactions performed at the anode in a $CO_2$ reduction reactor and may move across the MEA and reach the cathode where they can be reduced to produce hydrogen gas. The extent to which this parasitic reaction can proceed is a function of the concentration of hydrogen ions present at the cathode. Therefore, an MEA may employ an anion-conducting material in the cathode layer and/or in a cathode buffer layer. The anion-conducting material at least partially blocks hydrogen ions from reaching catalytic sites on the cathode. As a result, parasitic production of hydrogen gas generation is decreased and the rate of CO or other product production and the overall efficiency of the process are increased.

Another reaction that may be avoided is reaction of carbonate or bicarbonate ions at the anode to produce $CO_2$. Aqueous carbonate or bicarbonate ions may be produced from $CO_2$ at the cathode. If such ions reach the anode, they may react with hydrogen ions to produce and release gaseous $CO_2$. The result is net movement of $CO_2$ from the cathode to the anode, where it does not react and is lost with oxidation products. To prevent the carbonate and bicarbonate ion produced at the cathode from reaching the anode, the anode and/or an anode buffer layer may include a cation-conducting polymer, which at least partially blocks the transport of negative ions such as bicarbonate ions to the anode.

Thus, in some designs, a bipolar membrane structure raises the pH at the cathode to facilitate $CO_2$ reduction while a cation-conducting polymer such as a proton-exchange layer prevents the passage of significant amounts of $CO_2$ and $CO_2$ reduction products (e.g., bicarbonate) to the anode side of the cell.

Figure 2:
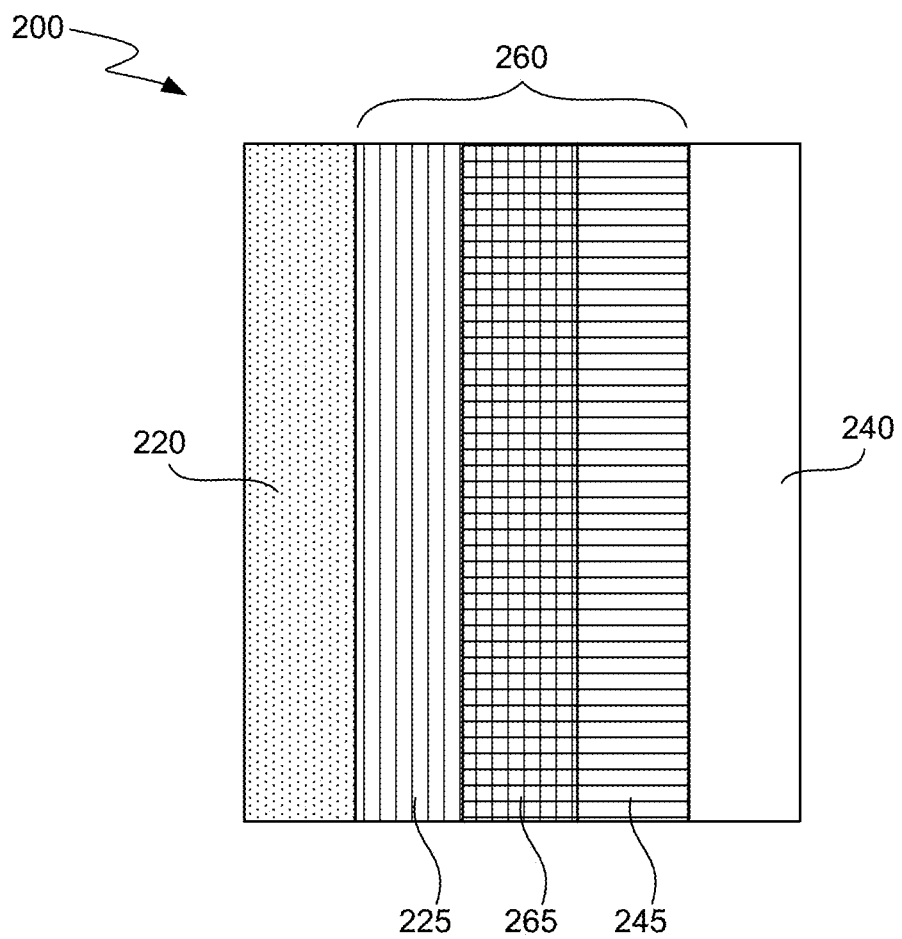
FIG. 2 is a schematic illustration of a membrane electrode assembly for use in $CO_x$ reduction according to various embodiments of the disclosure.

An example MEA 200 for use in $CO_x$ reduction is shown in FIG. 2. The MEA 200 has a cathode layer 220 and an anode layer 240 separated by an ion-conducting polymer layer 260 that provides a path for ions to travel between the cathode layer 220 and the anode layer 240. In certain embodiments, the cathode layer 220 includes an anion-conducting polymer and/or the anode layer 240 includes a cation-conducting polymer. In certain embodiments, the cathode layer and/or the anode layer of the MEA are porous. The pores may facilitate gas and/or fluid transport and may increase the amount of catalyst surface area that is available for reaction.

The ion-conducting layer 260 may include two or three sublayers: a polymer electrolyte membrane (PEM) 265, an optional cathode buffer layer 225, and/or an optional anode buffer layer 245. One or more layers in the ion-conducting layer may be porous. In certain embodiments, at least one layer is nonporous so that reactants and products of the cathode cannot pass via gas and/or liquid transport to the anode and vice versa. In certain embodiments, the PEM layer 265 is nonporous. Example characteristics of anode buffer layers and cathode buffer layers are provided elsewhere herein. In certain embodiments, the ion-conducting layer includes only a single layer or two sublayers.

Figure 3:
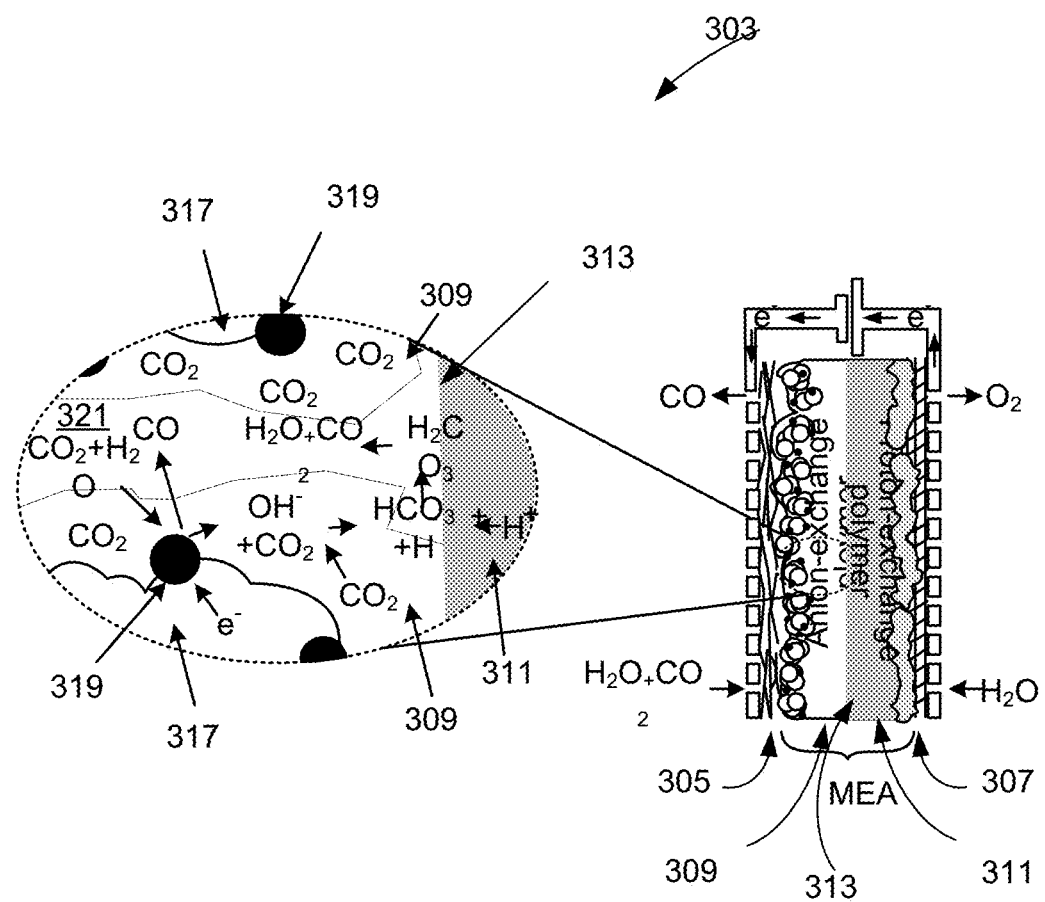
FIG. 3 is an illustration of a bipolar MEA in which bicarbonate and/or carbonate ions may combine with hydrogen ions between the cathode layer and the anode layer to form carbonic acid, which may decompose to form gaseous $CO_2$.

FIG. 3 shows $CO_2$ electrolyzer 303 configured to receive water and $CO_2$ (e.g., humidified or dry gaseous $CO_2$) as a reactant at a cathode 305 and expel CO as a product. Electrolyzer 303 is also configured to receive water as a reactant at an anode 307 and expel gaseous oxygen. Electrolyzer 303 includes bipolar layers having an anion-conducting polymer 309 adjacent to cathode 305 and a cation-conducting polymer 311 (illustrated as a proton-exchange membrane) adjacent to anode 307.

As illustrated in the magnification inset of a bipolar interface 313 in electrolyzer 303, the cathode 305 includes an anion exchange polymer (which in this example is the same anion-conducting polymer 309 that is in the bipolar layers) electronically conducting carbon support particles 317, and metal nanoparticles 319 supported on the support particles. $CO_2$ and water are transported via pores such as pore 321 and reach metal nanoparticles 319 where they react, in this case with hydroxide ions, to produce bicarbonate ions and reduction reaction products (not shown). $CO_2$ may also reach metal nanoparticles 319 by transport within anion exchange polymer 315.

Hydrogen ions are transported from anode 307, and through the cation-conducting polymer 311, until they reach bipolar interface 313, where they are hindered from further transport toward the cathode by anion exchange polymer 309. At interface 313, the hydrogen ions may react with bicarbonate or carbonate ions to produce carbonic acid ($H_2CO_3$), which may decompose to produce $CO_2$ and water. As explained herein, the resulting $CO_2$ may be provided in gas phase and should be provided with a route in the MEA back to the cathode 305 where it can be reduced. The cation-conducting polymer 311 hinders transport of anions such as bicarbonate ions to the anode where they could react with protons and release $CO_2$, which would be unavailable to participate in a reduction reaction at the cathode.

As illustrated, a cathode buffer layer having an anion-conducting polymer may work in concert with the cathode and its anion-conductive polymer to block transport of protons to the cathode. While MEAs employing ion conducting polymers of appropriate conductivity types in the cathode, the anode, cathode buffer layer, and if present, an anode buffer layer may hinder transport of cations to the cathode and anions to the anode, cations and anions may still come in contact in the MEA's interior regions, such as in the membrane layer.

As illustrated in FIG. 3, bicarbonate and/or carbonate ions combine with hydrogen ions between the cathode layer and the anode layer to form carbonic acid, which may decompose to form gaseous $CO_2$. It has been observed that MEAs sometime delaminate, possibly due to this production of gaseous $CO_2$, which does not have an easy egress path.

The delamination problem can be addressed by employing a cathode buffer layer having inert filler and associated pores. One possible explanation of its effectiveness is that the pores create paths for the gaseous carbon dioxide to escape back to the cathode where it can be reduced. In some embodiments, the cathode buffer layer is porous but at least one layer between the cathode layer and the anode layer is nonporous. This can prevent the passage of gases and/or bulk liquid between the cathode and anode layers while still preventing delamination. For example, the nonporous layer can prevent the direct passage of water from the anode to the cathode. The porosity of various layers in an MEA is described further at other locations herein.

Examples of Bipolar MEAs

As an example, an MEA includes a cathode layer including a reduction catalyst and a first anion-conducting polymer (e.g., Sustainion, FumaSep FAA-3, Tokuyama anion exchange polymer), an anode layer including an oxidation catalyst and a first cation-conducting polymer (e.g., PFSA polymer), a membrane layer including a second cation-conducting polymer and arranged between the cathode layer and the anode layer to conductively connect the cathode layer and the anode layer, and a cathode buffer layer including a second anion-conducting polymer (e.g., Sustainion, FumaSep FAA-3, Tokuyama anion exchange polymer) and arranged between the cathode layer and the membrane layer to conductively connect the cathode layer and the membrane layer. In this example, the cathode buffer layer can have a porosity between about 1 and 90 percent by volume, but can additionally or alternatively have any suitable porosity (including, e.g., no porosity). In other examples the cathode buffer layer can have any suitable porosity (e.g., between 0.01-95%, 0.1-95%, 0.01-75%, 1-95%, 1-90%, etc.).

Too much porosity can lower the ionic conductivity of the buffer layer. In some embodiments, the porosity is 20% or below, and in particular embodiments, between 0.1-20%, 1-10%, or 5-10%. Porosity in these ranges can be sufficient to allow movement of water and/or $CO_2$ without losing ionic conductivity. Porosity may be measured as described further below.

In a related example, the membrane electrode assembly can include an anode buffer layer that includes a third cation-conducting polymer, and is arranged between the membrane layer and the anode layer to conductively connect the membrane layer and the anode layer. The anode buffer layer preferably has a porosity between about 1 and 90 percent by volume, but can additionally or alternatively have any suitable porosity (including, e.g., no porosity). However, in other arrangements and examples, the anode buffer layer can have any suitable porosity (e.g., between 0.01-95%, 0.1-95%, 0.01-75%, 1-95%, 1-90%). As with the cathode buffer layer, in some embodiments, the porosity is 20% or below, e.g. 0.1-20%, 1-10%, or 5-10%

In an example, an anode buffer layer may be used in a MEA having a cathode catalyst layer with anion exchange polymer, a cathode buffer layer with anion-exchange polymer, a membrane with cation-exchange polymer, and an anode buffer layer with anion-exchange polymer. In such a structure, the anode buffer layer may be porous to facilitate water transport to the membrane/anode buffer layer interface. Water will be split at this interface to make protons that travel through the membrane and hydroxide that travels to the anode catalyst layer. One advantage of this structure is the potential use of low cost water oxidation catalysts (e.g., $NiFeO_x$) that are only stable in basic conditions.

In another specific example, the membrane electrode assembly includes a cathode layer including a reduction catalyst and a first anion-conducting polymer (e.g., Sustainion, FumaSep FAA-3, Tokuyama anion exchange polymer), an anode layer including an oxidation catalyst and a first cation-conducting polymer, a membrane layer including a second anion-conducting polymer (e.g., Sustainion, FumaSep FAA-3, Tokuyama anion exchange polymer) and arranged between the cathode layer and the anode layer to conductively connect the cathode layer and the anode layer, and an anode buffer layer including a second cation-conducting polymer and arranged between the anode layer and the membrane layer to conductively connect the anode layer and the membrane layer.

An MEA containing an anion-exchange polymer membrane and an anode buffer layer containing cation-exchange polymer may be used for CO reduction. In this case, water would form at the membrane/anode buffer layer interface. Pores in the anode buffer layer could facilitate water removal. One advantage of this structure would be the use of an acid stable (e.g., $IrO_x$) water oxidation catalyst.

In a related example, the membrane electrode assembly can include a cathode buffer layer that includes a third anion-conducting polymer, and is arranged between the cathode layer and the membrane layer to conductively connect the cathode layer and the membrane layer. The third anion-conducting polymer can be the same or different from the first and/or second anion-conducting polymer. The cathode buffer layer preferably has a porosity between about 1 and 90 percent by volume, but can additionally or alternatively have any suitable porosity (including, e.g., no porosity). However, in other arrangements and examples, the cathode buffer layer can have any suitable porosity (e.g., between 0.01-95%, 0.1-95%, 0.01-75%, 1-95%, 1-90%). In some embodiments, the porosity is 20% or below, and in particular embodiments, between 0.1-20%, 1-10%, or 5-10%.

In an example, a cathode catalyst layer composed of Au nanoparticles 4 nm in diameter supported on Vulcan XC72R carbon and mixed with TM1 (mTPN-1) anion exchange polymer electrolyte (from Orion). Layer is ~15 um thick, Au/(Au+C)=20 wt %, TM1 to catalyst mass ratio of 0.32, mass loading of 1.4-1.6 mg/cm2 (total Au+C), estimated porosity of 0.56. Anion-exchange polymer layer composed of TM1 and PTFE particles. PTFE is approximately 200 nm in diameter. TM1 molecular weight is 30 k-45 k. Thickness of the layer is ~15 um. PTFE may introduce porosity of about 8%. Proton-exchange membrane layer composed of perfluorosulfonic acid polymer (e.g., Nafion 117). Thickness is approximately 125 um. Membrane forms a continuous layer that prevents significant movement of gas ($CO_2$, CO, $H_2$) through the layer. Anode catalyst layer composed of Ir or $IrO_x$ nanoparticles (100-200 nm aggregates) that is 10 um thick.

Anion Exchange Membrane-Only MEA for CO, Reduction

In some embodiments, an MEA does not contain a cation-conducting polymer layer. In such embodiments, the electrolyte is not a cation-conducting polymer and the anode, if it includes an ion-conducting polymer, does not contain a cation-conducting polymer. Examples are provided herein.

An AEM-only MEA allows conduction of anions across the MEA. In embodiments in which none of the MEA layers has significant conductivity for cations, hydrogen ions have limited mobility in the MEA. In some implementations, an AEM-only membrane provides a high pH environment (e.g., at least about pH 7) and may facilitate $CO_2$ and/or CO reduction by suppressing the hydrogen evolution parasitic reaction at the cathode. As with other MEA designs, the AEM-only MEA allows ions, notably anions such as hydroxide ions, to move through polymer-electrolyte. The pH may be lower in some embodiments; a pH of 4 or greater may be high enough to suppress hydrogen evolution. The AEM-only MEA also permits electrons to move to and through metal and carbon in catalyst layers. In embodiments, having pores in the anode layer, the cathode layer, and/or the PEM, the AEM-only MEA permits liquids and gas to move through pores.

In certain embodiments, the AEM-only MEA comprises an anion-exchange polymer electrolyte membrane with an electrocatalyst layer on either side: a cathode and an anode. In some embodiments, one or both electrocatalyst layers also contain anion-exchange polymer-electrolyte.

In certain embodiments, an AEM-only MEA is formed by depositing cathode and anode electrocatalyst layers onto porous conductive supports such as gas diffusion layers to form gas diffusion electrodes (GDEs), and sandwiching an anion-exchange membrane between the gas diffusion electrodes.

In certain embodiments, an AEM-only MEA is used for $CO_2$ reduction. The use of an anion-exchange polymer electrolyte avoids low pH environment that disfavors $CO_2$ reduction. Further, water is transported away from the cathode catalyst layer when an AEM is used, thereby preventing water build up (flooding) which can block reactant gas transport in the cathode of the cell.

Water transport in the MEA occurs through a variety of mechanisms, including diffusion and electro-osmotic drag. In some embodiments, at current densities of the $CO_2$ electrolyzers described herein, electro-osmotic drag is the dominant mechanism. Water is dragged along with ions as they move through the polymer electrolyte. For a cation-exchange membrane such as Nafion membrane, the amount of water transport is well characterized and understood to rely on the pre-treatment/hydration of the membrane. Protons move from positive to negative potential (anode to cathode) with. each carrying 2-4 water molecules with it, depending on pretreatment. In anion-exchange polymers, the same type of effect occurs. Hydroxide, bicarbonate, or carbonate ions moving through the polymer electrolyte will 'drag' water molecules with them. In the anion-exchange MEAs, the ions travel from negative to positive voltage, so from cathode to anode, and they carry water molecules with them, moving water from the cathode to the anode in the process.

In certain embodiments, an AEM-only MEA is employed in CO reduction reactions. Unlike the $CO_2$ reduction reaction, CO reduction does not produce carbonate or bicarbonate anions that could transport to the anode and release valuable reactant.

Figure 4:
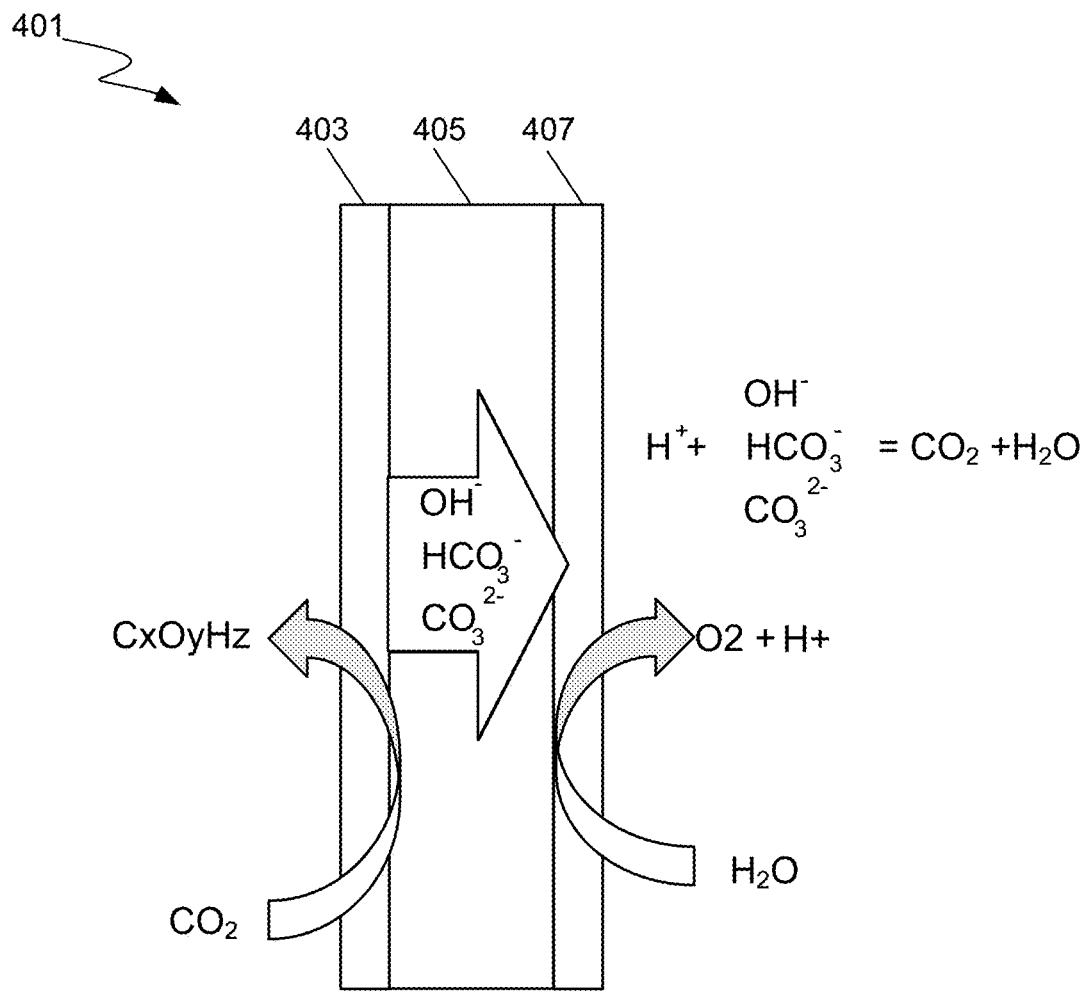
FIG. 4 is an illustration of an MEA in which $CO_2$ gas is provided to a cathode catalyst layer.

FIG. 4 illustrates an example construction of a $CO_2$ reduction MEA 401 having a cathode catalyst layer 403, an anode catalyst layer 405, and an anion-conducting PEM 407. In certain embodiments, cathode catalyst layer 403 includes metal catalyst particles (e.g., nanoparticles) that are unsupported or supported on a conductive substrate such as carbon particles. In some implementations, cathode catalyst layer 403 additionally includes an anion-conducting polymer. The metal catalyst particles may catalyze $CO_2$ reduction, particularly at pH greater than 7. In certain embodiments, anode catalyst layer 405 includes metal oxide catalyst particles (e.g., nanoparticles) that are unsupported or supported on a conductive substrate such as carbon particles. In some implementations, anode catalyst layer 403 additionally includes an anion-conducting polymer. Examples of metal oxide catalyst particles for anode catalyst layer 405 include iridium oxide, nickel oxide, nickel iron oxide, iridium ruthenium oxide, platinum oxide, and the like. Anion-conducting PEM 407 may comprise any of various anion-conducting polymers such as, for example, HNN5/HNN8 by Ionomr, FumaSep by Fumatech, TM1 by Orion, PAP-TP by W7energy, Sustainion by Dioxide Materials, and the like. These and other anion-conducting polymer that have an ion exchange capacity (IEC) ranging from 1.1 to 2.6, working pH ranges from 0-14, bearable solubility in some organic solvents, reasonable thermal stability and mechanical stability, good ionic conductivity/ASR and acceptable water uptake/swelling ratio may be used. The polymers may be chemically exchanged to certain anions instead of halogen anions prior to use.

As illustrated in FIG. 4, $CO_2$ such as $CO_2$ gas may be provided to cathode catalyst layer 403. In certain embodiments, the $CO_2$ may be provided via a gas diffusion electrode. At the cathode catalyst layer 403, the $CO_2$ reacts to produce reduction product indicated generically as $C_xO_yH_z$. Anions produced at the cathode catalyst layer 403 may include hydroxide, carbonate, and/or bicarbonate. These may diffuse, migrate, or otherwise move to the anode catalyst layer 405. At the anode catalyst layer 405, an oxidation reaction may occur such as oxidation of water to produce diatomic oxygen and hydrogen ions. In some applications, the hydrogen ions may react with hydroxide, carbonate, and/or bicarbonate to produce water, carbonic acid, and/or $CO_2$. Fewer interfaces give lower resistance. In some embodiments, a highly basic environment is maintained for C2 and C3 hydrocarbon synthesis.

Figure 5:
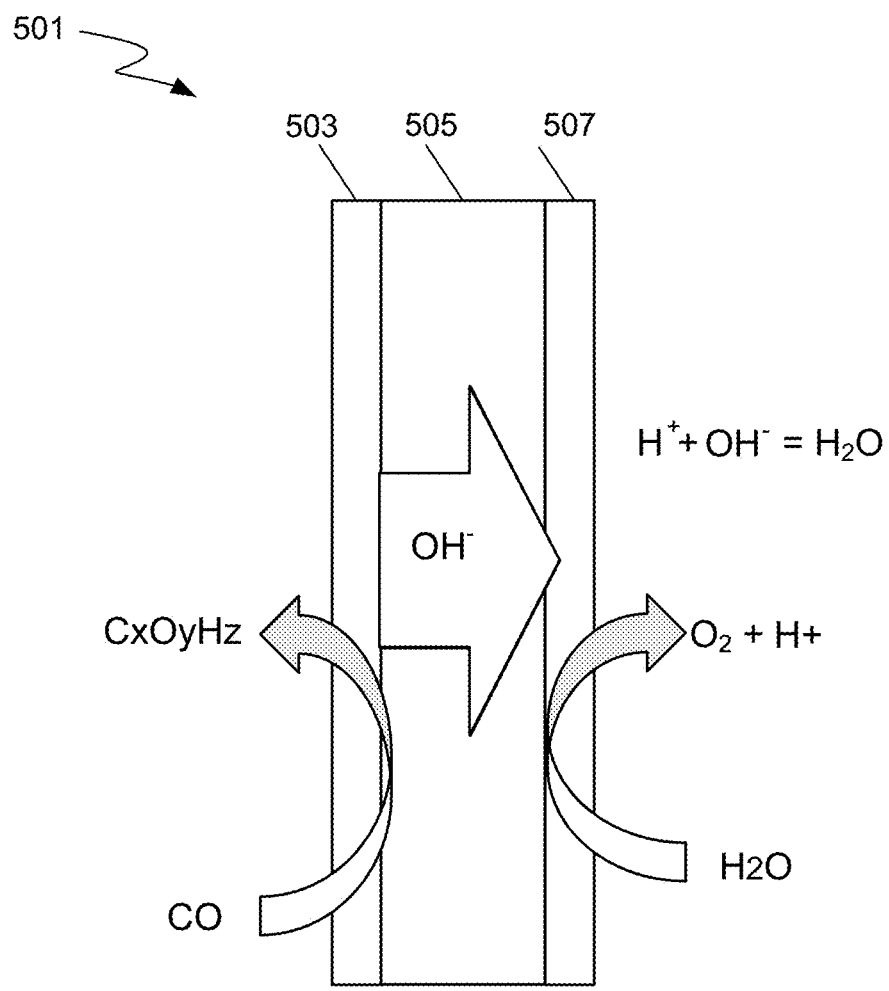
FIG. 5 is an illustration of an MEA having a cathode catalyst layer, an anode catalyst layer, and an anion-conducting PEM configured to promote a CO reduction reaction.

FIG. 5 illustrates an example construction of a CO reduction MEA 501 having a cathode catalyst layer 503, an anode catalyst layer 505, and an anion-conducting PEM 507.

Overall, the constructions of MEA 501 may be similar to that of MEA 401 in FIG. 4. However, the cathode catalyst may be chosen to promote a CO reduction reaction, which means that different reduction catalysts would be used in CO and $CO_2$ reduction embodiments.

In some embodiments, an AEM-only MEA may be advantageous for CO reduction. The water uptake number of the AEM material can be selected to help regulate moisture at the catalyst interface, thereby improving CO availability to the catalyst. AEM-only membranes can be favorable for CO reduction due to this reason. Bipolar membranes can be more favorable for $CO_2$ reduction due to better resistance to $CO_2$ dissolving and crossover in basic anolyte media.

In various embodiments, cathode catalyst layer 503 includes metal catalyst particles (e.g., nanoparticles) that are unsupported or supported on a conductive substrate such as carbon particles. In some implementations, cathode catalyst layer 503 additionally includes an anion-conducting polymer. In certain embodiments, anode catalyst layer 505 includes metal oxide catalyst particles (e.g., nanoparticles) that are unsupported or supported on a conductive substrate such as carbon particles. In some implementations, anode catalyst layer 503 additionally includes an anion-conducting polymer. Examples of metal oxide catalyst particles for anode catalyst layer 505 may include those identified for the anode catalyst layer 405 of FIG. 4. Anion-conducting PEM 507 may comprise any of various anion-conducting polymer such as, for example, those identified for the PEM 407 of FIG. 4.

As illustrated in FIG. 5, CO gas may be provided to cathode catalyst layer 503. In certain embodiments, the CO may be provided via a gas diffusion electrode. At the cathode catalyst layer 503, the CO reacts to produce reduction product indicated generically as $C_xO_yH_z$.

Anions produced at the cathode catalyst layer 503 may include hydroxide ions. These may diffuse, migrate, or otherwise move to the anode catalyst layer 505. At the anode catalyst layer 505, an oxidation reaction may occur such as oxidation of water to produce diatomic oxygen and hydrogen ions. In some applications, the hydrogen ions may react with hydroxide ions to produce water.

While the general configuration of the MEA 501 is similar to that of MEA 401, there are certain differences in the MEAS. First, MEAS may be wetter for CO reduction, helping the catalyst surface to have more —H. Also, for $CO_2$ reduction, a significant amount of $CO_2$ may be dissolved and then transferred to the anode for an AEM-only MEA such as shown in FIG. 4. For CO reduction, there is less likely to be significant CO gas crossover. In this case, the reaction environment could be very basic. MEA materials, including the catalyst, may be selected to have good stability in high pH environment. In some embodiments, a thinner membrane may be used for CO reduction than for $CO_2$ reduction.

Example of AEM-Only MEA

1. Copper metal (USRN 40 nm thick Cu, ~0.05 mg/cm$^2$) was deposited onto a porous carbon sheet (Sigracet 39BC gas diffusion layer) via electron beam deposition. Ir metal nanoparticles were deposited onto a porous titanium sheet at a loading of 3 mg/cm$^2$ via drop casting. An anion-exchange membrane from Ionomr (25-50 μm 80 mS/cm$^2$ OH— conductivity, 2-3 mS/cm$^2$ $HCO_3^-$ conductivity, 33-37% water uptake) was sandwiched between the porous carbon and titanium sheets with the electrocatalyst layers facing the membrane.

2. Sigma Aldrich 80 nm spherical Cu nanoparticles, mixed with FAA-3 anion exchange solid polymer electrolyte from Fumatech, FAA-3 to catalyst mass ratio of 0.10, setup as described above.

US Patent Application Publication No. US 2017/0321334, published Nov. 9, 2017 and US Patent Application Publication No. 20190226103, published Jul. 25, 2019, which describe various features and examples of MEAS, are incorporated herein by reference in their entireties. All publications referred to herein are incorporated by reference in their entireties as if fully set forth herein.

Cathode Catalyst Layer—General Structure

As indicated above, the cathode of the MEA, which is also referred to as the cathode layer or cathode catalyst layer, facilitates $CO_x$ conversion. It is a porous layer containing catalysts for $CO_x$ reduction reactions.

In some embodiments, the cathode catalyst layer contains a blend of reduction catalyst particles, electronically-conductive support particles that provide support for the reduction catalyst particles, and a cathode ion-conducting polymer. In some embodiments, the reduction catalyst particles are blended with the cathode ion-conducting polymer without a support.

Examples of materials that can be used for the reduction catalyst particles include, but are not limited to transition metals such as V, Cr, Mn, Fe, Co, Ni, Cu, Zr, Nb, Mo, Au, Ru, Rh, Pd, Ag, Cd, Hf, Ta, W, Re, Ir, Pt, and Hg, and combinations thereof, and/or any other suitable materials. Other catalyst materials can include alkali metals, alkaline earth metals, lanthanides, actinides, and post transition metals, such as Sn, Si, Ga, Pb, Al, Tl, Sb, Te, Bi, Sm, Tb, Ce, Nd and In or combinations thereof, and/or any other suitable catalyst materials. The choice of catalyst depends on the particular reaction performed at the cathode of the CRR.

Catalysts can be in the form of nanoparticles that range in size from approximately 1 to 100 nm or particles that range in size from approximately 0.2 to 10 nm or particles in the size range of approximately 1-1000 nm or any other suitable range. In addition to nanoparticles and larger particles, films and nanostructured surfaces may be used.

If used, the electronically-conductive support particles in the cathode can be carbon particles in various forms. Other possible conductive support particles include boron-doped diamond or fluorine-doped tin oxide. In one arrangement, the conductive support particles are Vulcan carbon. The conductive support particles can be nanoparticles. The size range of the conductive support particles is between approximately 20 nm and 1000 nm or any other suitable range. It is especially useful if the conductive support particles are compatible with the chemicals that are present in the cathode when the CRR is operating, are reductively stable, and have a high hydrogen production overpotential so that they do not participate in any electrochemical reactions.

For composite catalysts such as Au/C, example metal nanoparticle sizes may range from about 2 nm-20 nm and the carbon size may be from about 20-200 nm as supporting materials. For pure metal catalyst such as Ag or Cu, the particles have a board range from 2 nm to 500 nm in term of crystal grain size. The agglomeration could be even larger to micrometer range.

Figure 6:
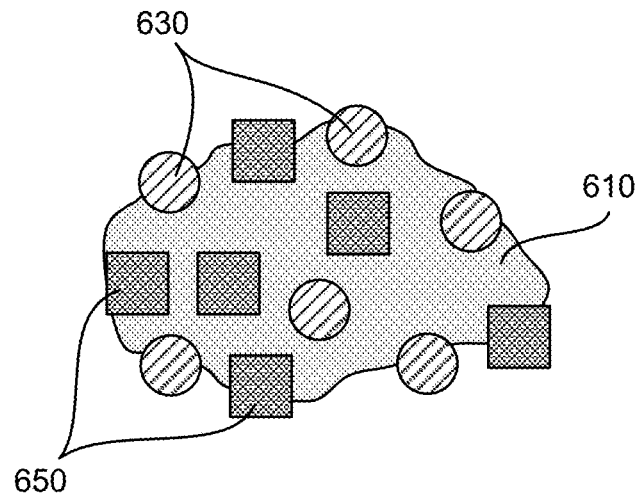
FIG. 6 is a schematic drawing showing an example morphology of cathode particles having catalysts supported on a catalyst support particle.

In general, such conductive support particles are larger than the reduction catalyst particles, and each conductive support particle can support many reduction catalyst particles. FIG. 6 is a schematic drawing that shows a possible morphology for two different kinds of catalysts supported on a catalyst support particle 610, such as a carbon particle. Catalyst particles 630 of a first type and second catalyst particles 650 of a second type are attached to the catalyst support particle 610. In various arrangements, there is only one type of catalyst particle or there are more than two types of catalyst particles attached to the catalyst support particle 610.

Using two types of catalysts may be useful in certain embodiments. For example, one catalyst may be good at one reaction (e.g., $CO_2 \rightarrow CO$) and the second good at another reaction (e.g., $CO \rightarrow CH_4$). Overall, the catalyst layer would perform the transformation of $CO_2$ to $CH_4$, but different steps in the reaction would take place on different catalysts.

The electronically-conductive support may also be in forms other than particles, including tubes (e.g., carbon nanotubes) and sheets (e.g., graphene). Structures having high surface area to volume are useful to provide sites for catalyst particles to attach.

In addition to reduction catalyst particles and electronically-conductive support particles, the cathode catalyst layer may include an ion conducting polymer. There are tradeoffs in choosing the amount of cathode ion-conducting polymer in the cathode. It can be important to include enough cathode ion-conducting polymer to provide sufficient ionic conductivity. But it is also important for the cathode to be porous so that reactants and products can move through it easily and to maximize the amount of catalyst surface area that is available for reaction. In various arrangements, the cathode ion-conducting polymer makes up somewhere in the range between 30 and 70 wt %, between 20 and 80 wt %, or between 10 and 90 wt %, of the material in the cathode layer, or any other suitable range. The wt % of ion-conducting polymer in the cathode is selected to result in the cathode layer porosity and ion-conductivity that gives the highest current density for $CO_x$ reduction. In some embodiments, it may be between 20 and 60 wt. % or between 20 and 50 wt. %. Example thicknesses of the cathode catalyst layer range from about 80 nm-300 μm.

In addition to the reduction catalyst particles, cathode ion conducting polymer, and if present, the electronically-conductive support, the cathode catalyst layer may include other additives such as PTFE.

In addition to polymer:catalyst mass ratios, the catalyst layer may be characterized by mass loading (mg/cm$^2$), and porosity. Porosity may be determined by various manners. In one method, the loading of each component (e.g., catalyst, support, and polymer) is multiplied by its respective density. These are added together to determine the thickness the components take up in the material. This is then divided by the total known thickness to obtain the percentage of the layer that is filled in by the material. The resulting percentage is then subtracted from 1 to obtain the percentage of the layer assumed to be filled with air, which is the porosity. Methods such as mercury porosimetry or image processing on TEM images may be used as well.

Examples of cathode catalyst layers for CO, methane, and ethylene/ethanol productions are given below.

CO production: Au nanoparticles 4 nm in diameter supported on Vulcan XC72R carbon and mixed with TM1 anion exchange polymer electrolyte from Orion. Layer is about 15 μm thick, Au/(Au+C)=30%, TM1 to catalyst mass ratio of 0.32, mass loading of 1.4-1.6 mg/cm$^2$, estimated porosity of 0.47

Methane production: Cu nanoparticles of 20-30 nm size supported on Vulcan XC72R carbon, mixed with FAA-3 anion exchange solid polymer electrolyte from Fumatech. FAA-3 to catalyst mass ratio of 0.18. Estimated Cu nanoparticle loading of ~7.1 µg/cm², within a wider range of 1-100 µg/cm²

Ethylene/ethanol production: Cu nanoparticles of 25-80 nm size, mixed with FAA-3 anion exchange solid polymer electrolyte from Fumatech. FAA-3 to catalyst mass ratio of 0.10. Deposited either on Sigracet 39BC GDE for pure AEM or on MEA electrode assembly. Estimated Cu nanoparticle loading of 270 µg/cm².

The functions, materials, and structures of the components of the cathode catalyst layer are described further below.

Water Management (Cathode Catalyst Layer)

The cathode catalyst layer may facilitate movement of water to prevent it from being trapped in the cathode catalyst layer. Trapped water can hinder access of $CO_x$ to the catalyst and/or hinder movement of reaction product out of the cathode catalyst layer.

Water management challenges are in many respects unique to CRRs. For example, compared to a PEM fuel cell's oxygen electrode, a CRR uses a much lower gas flow rate. Vapor phase water removal is determined by the volumetric gas flow, thus much less vapor phase water removal is carried out in a CRR. A CRR may also operate at higher pressure (e.g., 100 psi-450 psi) than a fuel cell; at higher pressure the same molar flow results in lower volumetric flow and lower vapor phase water removal. As a result, liquid water in MEA of a CRR is present to be removed. For some MEAs, the ability to remove vapor phase water is further limited by temperature limits not present in fuel cells. For example, $CO_2$ to CO reduction may be performed at about 50° C. and ethylene and methane production may be performed at 20° C.-25° C. This is compared to typical operating temperatures of 80° C. to 120° C. for fuel cells. As a result, there is more liquid phase water to remove.

Properties that affect ability of the cathode catalyst layer to remove water include porosity; pore size; distribution of pore sizes; hydrophobicity; the relative amounts of ion conducting polymer, metal catalyst particles, and electronically-conductive support; the thickness of the layer; the distribution of the catalyst throughout the layer; and the distribution of the ion conducting polymer through the layer and around the catalyst.

A porous layer allows an egress path for water. In some embodiments, the cathode catalyst layer has a pore size distribution that includes pores having sizes of 1 nm-100 nm and pores having sizes of at least 1 micron. This size distribution can aid in water removal. The porous structures could be formed by one or more of: pores within the carbon supporting materials; stacking pores between stacked spherical carbon nanoparticles; secondary stacking pores between agglomerated carbon spheres (micrometer scale); or inert filler (e.g., PTFE) introduced porous with the interface between the PTFE and carbon also creating irregular pores ranging from hundreds of nm to micrometers.

The cathode catalyst layer may have a thickness that contributes to water management. Using a thicker layer allows the catalyst and thus the reaction to be distributed in a larger volume. This spreads out the water distribution and makes it easier to manage.

Ion-conducting polymers having non-polar, hydrophobic backbones may be used in the cathode catalyst layer. In some embodiments, the cathode catalyst layer may include a hydrophobic polymer such as PTFE in addition to the ion-conducting polymer. In some embodiments, the ion-conducting polymer may be a component of a co-polymer that also includes a hydrophobic polymer.

Gas Transport (Cathode Catalyst Layer)

The cathode catalyst layer may be structured for gas transport. Specifically, $CO_x$ is transported to the catalyst and gas phase reaction products (e.g., CO, ethylene, methane, etc.) is transported out of the catalyst layer.

Certain challenges associated with gas transport are unique to CRRs. Gas is transported both in and out of the cathode catalyst layer—$CO_x$ in and products such as CO, ethylene, and methane out. In a PEM fuel cell, gas ($O_2$ or $H_2$) is transported in but nothing or product water comes out. And in a PEM water electrolyzer, water is the reactant with $O_2$ and $H_2$ gas products.

Operating conditions including pressures, temperature, and flow rate through the reactor affect the gas transport. Properties of the cathode catalyst layer that affect gas transport include porosity; pore size and distribution; layer thickness; and ionomer distribution.

In some embodiments, the ionomer-catalyst contact is minimized. For example, in embodiments that use a carbon support, the ionomer may form a continuous network along the surface of the carbon with minimal contact with the catalyst. The ionomer, support, and catalyst may be designed such that the ionomer has a higher affinity for the support surface than the catalyst surface. This can facilitate gas transport to and from the catalyst without being blocked by the ionomer, while allowing the ionomer to conduct ions to and from the catalyst.

Ionomer (Cathode Catalyst Layer)

The ionomer may have several functions including holding particles of the catalyst layer together and allowing movement of ions through the cathode catalyst layer. In some cases, the interaction of the ionomer and the catalyst surface may create an environment favorable for $CO_x$ reduction, increasing selectivity to a desired product and/or decreasing the voltage required for the reaction. Importantly, the ionomer is an ion-conducting polymer to allow for the movement of ions through the cathode catalyst layer. Hydroxide, bicarbonate, and carbonate ions, for example, are moved away from the catalyst surface where the $CO_x$ reduction occurs. In the description below, the ionomer in the cathode catalyst layer can be referred to as a first ion-conducting polymer.

The first ion-conducting polymer can comprise at least one ion-conducting polymer that is an anion-conductor. This can be advantageous because it raises the pH compared to a proton conductor.

In some embodiments, the first ion-conducting polymer can comprise one or more covalently-bound, positively-charged functional groups configured to transport mobile negatively-charged ions. The first ion-conducting polymer can be selected from the group consisting of aminated tetramethyl polyphenylene; poly(ethylene-co-tetrafluoroethylene)-based quaternary ammonium polymer; quaternized polysulfone), blends thereof, and/or any other suitable ion-conducting polymers. The first ion-conducting polymer can be configured to solubilize salts of bicarbonate or hydroxide.

In some embodiments, the first ion-conducting polymer can comprise at least one ion-conducting polymer that is a cation-and-anion-conductor. The first ion-conducting polymer can be selected from the group consisting of polyethers that can transport cations and anions and polyesters that can transport cations and anions. The first ion-conducting polymer can be selected from the group consisting of polyethylene oxide, polyethylene glycol, polyvinylidene fluoride, and polyurethane.

A cation-and-anion conductor will raise pH (compared to a pure cation conductor.) Further, in some embodiments, it may be advantageous to use a cation-and-anion conductor to promote acid base recombination in a larger volume instead of at a 2D interface of anion-conducting polymer and cation conducting polymer. This can spread out water and $CO_2$ formation, heat generation, and potentially lower the resistance of the membrane by decreasing the barrier to the acid-base reaction. All of these may be advantageous in helping avoid the buildup of products, heat, and lowering resistive losses in the MEA leading to a lower cell voltage.

A typical anion-conducting polymer has a polymer backbone with covalently bound positively charged functional groups appended. These may include positively charged nitrogen groups in some embodiments. In some embodiments, the polymer backbone is non-polar, as described above. The polymer may be any appropriate molecular weight, e.g., 25,000 g/mol-150,000 g/mol, though it will be understood that polymers outside this range may be used.

Particular challenges for ion-conducting polymers in CRR's include that $CO_2$ can dissolve or solubilize polymer electrolytes, making them less mechanically stable, prone to swelling, and allowing the polymer to move more freely. This makes the entire catalyst layer and polymer-electrolyte membrane less mechanically stable. In some embodiments, polymers that are not as susceptible to $CO_2$ plasticization are used. Also, unlike for water electrolyzers and fuel cells, conducting carbonate and bicarbonate ions is a key parameter for $CO_2$ reduction.

The introduction of polar functional groups, such as hydroxyl and carboxyl groups which can form hydrogen bonds, leads to pseudo-crosslinked network formation. Cross-linkers like ethylene glycol and aluminum acetylacetonate can be added to reinforce the anion exchange polymer layer and suppress polymer $CO_2$ plasticization. Additives like polydimethylsiloxane copolymer can also help mitigate $CO_2$ plasticization.

According to various embodiments, the ion-conducting polymer may have a bicarbonate ionic conductivity of at least 12 mS/cm, is chemically and mechanically stable at temperatures 80° C. and lower, and soluble in organic solvents used during fabrication such as methanol, ethanol, and isoproponal. The ion-conducting polymer is stable (chemically and has stable solubility) in the presence of the $CO_x$ reduction products. The ion-conducting polymer may also be characterized by its ion exchange capacity, the total of active sites or functional groups responsible for ion exchange, which may range from 2.1 mmol/g-2.6 mmol/g in some embodiments.

Examples of anion-conducting polymers are given above in above table as Class A ion-conducting polymers. A particular example of an anion-conducting polymer is Orion mTPN1, which has m-triphenyl fluori-alkylene as backbone and trimethylamonium (TMA+) as cation group. The chemical structure is shown below.

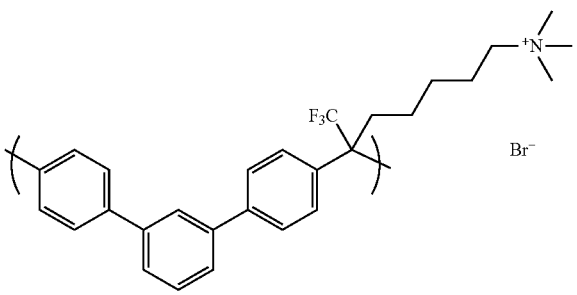

Additional examples include anion exchange membranes produced by Fumatech and Ionomr. Fumatech FAA-3 ionomers come in Br— form. Anion exchange polymer/membrane based on polybenzimidazole produced by Ionomr comes in I— form as AF-1-HNN8-50-X.

The as-received polymer may be prepared by exchanging the anion (e.g., I⁻, Br⁻, etc.) with bicarbonate.

Also, as indicated above, in certain embodiments the ionomer may be a cation-and-ion-conducting polymer. Examples are given in the above table as Class B ion-conducting polymers.

Metal Catalyst (Cathode Catalyst Layer)

The metal catalyst catalyzes the $CO_x$ reduction reaction(s). The metal catalyst is typically nanoparticles, but larger particles, films, and nanostructured surfaces may be used in some embodiments. The specific morphology of the nanoparticles may expose and stabilize active sites that have greater activity.

The metal catalyst is often composed of pure metals (e.g., Cu, Au, Ag), but specific alloys or other bimetallic systems may have high activity and be used for certain reactions. The choice of catalyst may be guided by the desired reaction. For example, for CO production, Au may be used; for methane and ethylene production, Cu may be used. Other metals including Ag, alloys, and bimetallic systems may be used. $CO_2$ reduction has a high overpotential compared to other well-known electrochemical reactions such as hydrogen evolution and oxygen evolution on known catalysts. Small amounts of contaminants can poison catalysts for $CO_2$ conversion. And as indicated above, metal catalysts such as Cu, Au, and Ag are less developed than catalysts such as platinum used in hydrogen fuel cells.

Metal catalyst properties that affect the cathode catalyst layer performance include size, size distribution, uniformity of coverage on the support particles, shape, loading (characterized as weight of metal/weight of metal+weight of carbon or as mass of particles per geometric area of catalyst layer), surface area (actual metal catalyst surface area per volume of catalyst layer), purity, and the presence of poisoning surface ligands from synthesis.

Nanoparticles may be synthesized by any appropriate method, such as for example, described in Phan et al., "Role of Capping Agent in Wet Synthesis of Nanoparticles," J. Phys. Chem. A 2018, 121, 17, 3213-3219; Bakshi "How Surfactants Control Crystal Growth of Nanomaterials," Cryst. Growth Des. 2016, 16, 2, 1104-1133; and Morsy "Role of Surfactants in Nanotechnology and Their Applications," Int. J. Curr. Microbiol. App. Sci. 2014, 3, 5, 237-260, which are incorporated by reference herein.

In some embodiments, metal nanoparticles are provided without the presence of poisoning surface ligands. This may be achieved by using the ionomer as a ligand to direct the synthesis of nanocrystal catalysts. The surface of the metal nanocatalysts are directly connected with ionically conductive ionomer. This avoids having to treat the catalyst surface to allow ionomer contact with the metal and improves the contact.

The metal catalyst may be disposed on a carbon support in some embodiments. For CO production, examples include Premetek 20 wt % Au supported on Vulcan XC-72R carbon with 4-6 nm Au particle size and 30% Au/C supported on Vulcan XC-72R with 5-7 nm Au particle size. For methane, examples include Premetek 20 wt % Cu supported on Vulcan XC-72R carbon with 20-30 nm Cu particle size. In some embodiments, the metal catalyst may be unsupported. For ethylene production, examples of unsupported metal catalysts include SigmaAldrich unsupported Cu 80 nm particle size and ebeam or sputter deposited thin Cu layer of 10 nm to 100 nm.

Support (Cathode Catalyst Layer)

The support of the cathode catalyst layer may have various functions. It may stabilize metal nanoparticles to prevent them from agglomerating and distributed the catalytic sites throughout the catalyst layer volume to spread out loss of reactants and formation of products. It may also form an electronically form an electrically conductive pathway to metal nanoparticles. Carbon particles, for example, pack together such that contacting carbon particles provide the electrically conductive pathway. Void space between the particles forms a porous network that gas and liquids can travel through.

In some embodiments, carbon supports developed for fuel cells can be used. Many different types have been developed; these are typically 50 nm-500 nm in size, and can be obtained in different shapes (spheres, nanotubes, sheets (e.g., graphene)), porosities, surface area per volume, electrical conductivity, functional groups (N-doped, 0-doped, etc).

The support may be hydrophobic and have affinity to the metal nanoparticle.

Examples of carbon blacks that can be used include:

Vulcan XC-72R- Density of 256 mg/cm2, 30-50 nm

Ketjen Black-Hollow structure, Density of 100-120 mg/cm2, 30-50 nm

Printex Carbon, 20-30 nm

Anode Catalyst Layer

The anode of the MEA, which is also referred to as the anode layer or anode catalyst layer, facilitates oxidation reactions. It is a porous layer containing catalysts for oxidation reactions. Examples of reactions are:

$2H_2O \rightarrow 4H^+ + 4e^- + O_2$ (in acidic environment of proton exchange polymer electrolyte—bipolar membrane); or $4OH^- \rightarrow 4e^- + O_2 + 2H_2O$ (in basic environment of anion exchange polymer electrolyte)

The oxidation of other materials, such as hydrocarbons to make $CO_2$ or chloride ions to make chlorine gas, may also be performed.

In some embodiments, with reference to FIG. 2, the anode 240 contains a blend of oxidation catalyst and an anode ion-conducting polymer. There are a variety of oxidation reactions that can occur at the anode depending on the reactant that is fed to the anode and the anode catalyst(s). In one arrangement, the oxidation catalyst is selected from the group consisting of metals and oxides of Ir, Pt, Ni, Ru, Pd, Au, and alloys thereof, IrRu, PtIr, Ni, NiFe, stainless steel, and combinations thereof. The oxidation catalyst can further contain conductive support particles selected from the group consisting of carbon, boron-doped diamond, and titanium.

The oxidation catalyst can be in the form of a structured mesh or can be in the form of particles. If the oxidation catalyst is in the form of particles, the particles can be supported by electronically-conductive support particles. The conductive support particles can be nanoparticles. It is especially useful if the conductive support particles are compatible with the chemicals that are present in the anode 240 when the CRR is operating and are oxidatively stable so that they do not participate in any electrochemical reactions. It is especially useful if the conductive support particles are chosen with the voltage and the reactants at the anode in mind. In some arrangements, the conductive support particles are titanium, which is well-suited for high voltages. In other arrangements, the conductive support particles are carbon, which can be most useful at low voltages. In general, such conductive support particles are larger than the oxidation catalyst particles, and each conductive support particle can support many oxidation catalyst particles. An example of such an arrangement is shown in FIG. 3 and is discussed above with respect to the cathode catalyst layer. In one arrangement, the oxidation catalyst is iridium ruthenium oxide. Examples of other materials that can be used for the oxidation catalyst include, but are not limited to, those listed above. It should be understood that many of these metal catalysts can be in the form of oxides, especially under reaction conditions.

In some embodiments, the MEA has an anode layer comprising oxidation catalyst and a second ion-conducting polymer. The second ion-conducting polymer can comprise one or more polymers that contain covalently-bound, negatively-charged functional groups configured to transport mobile positively-charged ions. The second ion-conducting polymer can be selected from the group consisting of ethanesulfonyl fluoride, 2-[1-[difluoro-[(trifluoroethenyl) oxy]methyl]-1,2,2,2-tetrafluoroethoxy]-1,1,2,2,-tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof. Examples of cation-conducting polymers include e.g., Nafion 115, Nafion 117, and/or Nafion 211.

There are tradeoffs in choosing the amount of ion-conducting polymer in the anode. It is important to include enough anode ion-conducting polymer to provide sufficient ionic conductivity. But it is also important for the anode to be porous so that reactants and products can move through it easily, and to maximize the amount of catalyst surface area that is available for reaction. In various arrangements, the ion-conducting polymer in the anode makes up approximately 50 wt % of the layer or between approximately 5 and 20 wt %, 10 and 90 wt %, between 20 and 80 wt %, between 25 and 70 wt %, or any suitable range. It is especially useful if the anode 240 can tolerate high voltages, such as voltages above about 1.2 V vs. a reversible hydrogen electrode. It is especially useful if the anode 240 is porous in order to maximize the amount of catalyst surface area available for reaction and to facilitate gas and liquid transport.

In one example of a metal catalyst, Ir or IrOx particles (100-200 nm) and Nafion ionomer form a porous layer approximately 10 μm thick. Metal catalyst loading is approximately 0.5-3 $g/cm^2$.

In some embodiments, NiFeOx is used for basic reactions.

PEM

The MEAs include a polymer electrolyte membrane (PEM) disposed between and conductively coupled to the anode catalyst layer and the cathode catalyst layer. Referring to FIG. 2, the polymer electrolyte membrane 265 has high ionic conductivity (greater than about 1 mS/cm), and is mechanically stable. Mechanical stability can be evidenced in a variety of ways such as through high tensile strength, modulus of elasticity, elongation to break, and tear resistance. Many commercially-available membranes can be used for the polymer electrolyte membrane 265. Examples include, but are not limited to, various Nafion® formulations, GORE-SELECT, FumaPEM® (PFSA) (FuMA-Tech GmbH), and Aquivion (PFSA) (Solvay).

In one arrangement, the PEM comprises at least one ion-conducting polymer that is a cation-conductor. The third ion-conducting polymer can comprise one or more covalently-bound, negatively-charged functional groups configured to transport mobile positively-charged ions. The third ion-conducting polymer can be selected from the group consisting of ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoroethylene, tetrafluoroethyleneperfluoro-3,6-dioxa-4-methyl-7-octenesulfonic acid copolymer, other perfluorosulfonic acid polymers and blends thereof.

Cathode Buffer Layer

Referring to FIG. 2, it may be noted that when the polymer electrolyte membrane 265 is a cation conductor and is conducting protons, it contains a high concentration of protons during operation of the CRR, while the cathode 220 operates best when a low concentration of protons is present. It can be useful to include a cathode buffer layer 225 between the polymer electrolyte membrane 265 and the cathode 220 to provide a region of transition from a high concentration of protons to a low concentration of protons. In one arrangement, the cathode buffer layer 225 is an ion-conducting polymer with many of the same properties as the ion-conducting polymer in the cathode 220. The cathode buffer layer 225 provides a region for the proton concentration to transition from the polymer electrolyte membrane 265, which has a high concentration of protons to the cathode 220, which has a low proton concentration. Within the cathode buffer layer 225, protons from the polymer electrolyte membrane 265 encounter anions from the cathode 220, and they neutralize one another. The cathode buffer layer 225 helps ensure that a deleterious number of protons from the polymer electrolyte membrane 265 does not reach the cathode 220 and raise the proton concentration. If the proton concentration of the cathode 220 is too high, $CO_x$ reduction does not occur. High proton concentration is considered to be in the range of approximately 10 to 0.1 molar and low concentration is considered to be less than approximately 0.01 molar.

The cathode buffer layer 225 can include a single polymer or multiple polymers. If the cathode buffer layer 225 includes multiple polymers, the multiple polymers can be mixed together or can be arranged in separate, adjacent layers. Examples of materials that can be used for the cathode buffer layer 225 include, but are not limited to, FumaSep FAA-3, Tokuyama anion exchange membrane material, and polyether-based polymers, such as polyethylene oxide (PEO), and blends thereof. Further examples are given above in the discussion of the cathode catalyst layer.

The thickness of the cathode buffer layer is chosen to be sufficient that $CO_x$ reduction activity is high due to the proton concentration being low. This sufficiency can be different for different cathode buffer layer materials. In general, the thickness of the cathode buffer layer is between approximately 200 nm and 100 µm, between 300 nm and 75 µm, between 500 nm and 50 µm, or any suitable range.

In some embodiments, the cathode buffer layer is less than 50 µm, for example between 1-25 µm such between 1-5 µm, 5-15 µm, or 10-25 µm. By using a cathode buffer layer in this range of thicknesses, the proton concentration in the cathode can be reduced while maintaining the overall conductivity of the cell. In some embodiments, an ultra-thin layer (100 nm-1 µm and in some embodiments, sub-micron) may be used. And as discussed above, in some embodiments, the MEA does not have a cathode buffer layer. In some such embodiments, anion-conducting polymer in the cathode catalyst layer is sufficient. The thickness of the cathode buffer layer may be characterized relative to that of the PEM.

Water and $CO_2$ formed at the interface of a cathode buffer layer and a PEM can delaminate the MEA where the polymer layers connect. The delamination problem can be addressed by employing a cathode buffer layer having inert filler particles and associated pores. One possible explanation of its effectiveness is that the pores create paths for the gaseous carbon dioxide to escape back to the cathode where it can be reduced.

Materials that are suitable as inert filler particles include, but are not limited to, $TiO_2$, silica, PTFE, zirconia, and alumina. In various arrangements, the size of the inert filler particles is between 5 nm and 500 µm, between 10 nm and 100 µm, or any suitable size range. The particles may be generally spherical.

If PTFE (or other filler) volume is too high, it will dilute the polymer electrolyte to the point where ionic conductivity is low. Too much polymer electrolyte volume will dilute the PTFE to the point where it does not help with porosity. In many embodiments a mass ratio of polymer electrolyte/PTFE is 0.25 to 2, and more particularly, 0.5 to 1. A volume ratio polymer electrolyte/PTFE (or, more generally, polymer electrolyte/inert filler) may be 0.25 to 3, 0.5 to 2, 0.75 to 1.5, or 1.0 to 1.5.

In other arrangements, porosity is achieved by using particular processing methods when the layers are formed. One example of such a processing method is laser ablation, where nano to micro-sized channels are formed in the layers. Another example is mechanically puncturing a layer to form channels through it.

In one arrangement, the cathode buffer layer has a porosity between 0.01% and 95% (e.g., approximately between, by weight, by volume, by mass, etc.). However, in other arrangements, the cathode buffer layer can have any suitable porosity (e.g., between 0.01-95%, 0.1-95%, 0.01-75%, 1-95%, 1-90%). In some embodiments, the porosity is 50% or less, e.g., 0.1-50%, 5-50%, 20-50%, 5-40%, 10-40%, 20-40%, or 25%-40%. In some embodiments, the porosity is 20% or below, e.g. 0.1-20%, 1-10%, or 5-10%.

Porosity may be measured as described above with respect to the catalyst layer, including using mass loadings and thicknesses of the components, by methods such as mercury porosimetry, x-ray diffraction (SAXS or WAXS), and image processing on TEM images to calculate filled space vs. empty space. Porosity is measured when the MEA is completely dry as the materials swell to varying degrees when exposed to water during operation.

Porosity in layers of the MEA, including the cathode buffer layer, is described further below.

Anode Buffer Layer

In some CRR reactions, bicarbonate is produced at the cathode 220. It can be useful if there is a polymer that blocks bicarbonate transport somewhere between the cathode 220 and the anode 240, to prevent migration of bicarbonate away from the cathode. It can be that bicarbonate takes some $CO_2$ with it as it migrates, which decreases the amount of $CO_2$ available for reaction at the cathode. In one arrangement, the polymer electrolyte membrane 265 includes a polymer that blocks bicarbonate transport. Examples of such polymers include, but are not limited to, Nafion® formulations, GORE-SELECT, FumaPEM® (PFSA) (FuMA-Tech GmbH), and Aquivion (PFSA) (Solvay). In another arrangement, there is an anode buffer layer 245 between the polymer electrolyte membrane 265 and the anode 240, which blocks transport of bicarbonate. If the polymer electrolyte membrane is an anion-conductor, or does not block bicarbonate transport, then an additional anode buffer layer to prevent bicarbonate transport can be useful. Materials that can be used to block bicarbonate transport include, but are not limited to Nafion® formulations, GORE-SELECT, FumaPEM® (PFSA) (FuMA-Tech GmbH), and Aquivion (PFSA) (Solvay). Of course, including a bicarbonate blocking feature in the ion-exchange layer 260 is not particularly desirable if there is no bicarbonate in the CRR.

In another embodiment of the invention, the anode buffer layer 245 provides a region for proton concentration to transition between the polymer electrolyte membrane 265 to the anode 240. The concentration of protons in the polymer electrolyte membrane 265 depends both on its composition and the ion it is conducting. For example, a Nafion polymer electrolyte membrane 265 conducting protons has a high proton concentration. A FumaSep FAA-3 polymer electrolyte membrane 265 conducting hydroxide has a low proton concentration. For example, if the desired proton concentration at the anode 240 is more than 3 orders of magnitude different from the polymer electrolyte membrane 265, then an anode buffer layer 245 can be useful to effect the transition from the proton concentration of the polymer electrolyte membrane 265 to the desired proton concentration of the anode. The anode buffer layer 245 can include a single polymer or multiple polymers. If the anode buffer layer 245 includes multiple polymers, the multiple polymers can be mixed together or can be arranged in separate, adjacent layers. Materials that can be useful in providing a region for the pH transition include, but are not limited to, Nafion, FumaSep FAA-3, Sustainion®, Tokuyama anion exchange polymer, and polyether-based polymers, such as polyethylene oxide (PEO), blends thereof, and/or any other suitable materials. High proton concentration is considered to be in the range of approximately 10 to 0.1 molar and low concentration is considered to be less than approximately 0.01 molar. Ion-conducting polymers can be placed in different classes based on the type(s) of ions they conduct. This has been discussed in more detail above. There are three classes of ion-conducting polymers described in Table 4 above. In one embodiment of the invention, at least one of the ion-conducting polymers in the cathode 220, anode 240, polymer electrolyte membrane 265, cathode buffer layer 225, and anode buffer layer 245 is from a class that is different from at least one of the others.

Layer Porosity

It can be useful if some or all of the following layers are porous: the cathode 220, the cathode buffer layer 225, the anode 240 and the anode buffer layer 245. In some arrangements, porosity is achieved by combining inert filler particles with the polymers in these layers. Materials that are suitable as inert filler particles include, but are not limited to, $TiO_2$, silica, PTFE, zirconia, and alumina. In various arrangements, the size of the inert filler particles is between 5 nm and 500 μm, between 10 nm and 100 μm, or any suitable size range. In other arrangements, porosity is achieved by using particular processing methods when the layers are formed. One example of such a processing method is laser ablation, where nano to micro-sized channels are formed in the layers. Laser ablation can additionally or alternatively achieve porosity in a layer by subsurface ablation. Subsurface ablation can form voids within a layer, upon focusing the beam at a point within the layer, and thereby vaporizing the layer material in the vicinity of the point. This process can be repeated to form voids throughout the layer, and thereby achieving porosity in the layer. The volume of a void is preferably determined by the laser power (e.g., higher laser power corresponds to a greater void volume), but can additionally or alternatively be determined by the focal size of the beam, or any other suitable laser parameter. Another example is mechanically puncturing a layer to form channels through the layer. The porosity can have any suitable distribution in the layer (e.g., uniform, an increasing porosity gradient through the layer, a random porosity gradient, a decreasing porosity gradient through the layer, a periodic porosity, etc.).

The porosities (e.g., of the cathode buffer layer, of the anode buffer layer, of the membrane layer, of the cathode layer, of the anode layer, of other suitable layers, etc.) of the examples described above and other examples and variations preferably have a uniform distribution, but can additionally or alternatively have any suitable distribution (e.g., a randomized distribution, an increasing gradient of pore size through or across the layer, a decreasing gradient of pore size through or across the layer, etc.). The porosity can be formed by any suitable mechanism, such as inert filler particles (e.g., diamond particles, boron-doped diamond particles, polyvinylidene difluoride/PVDF particles, polytetrafluoroethylene/PTFE particles, etc.) and any other suitable mechanism for forming substantially non-reactive regions within a polymer layer. The inert filler particles can have any suitable size, such as a minimum of about 10 nanometers and a maximum of about 200 nanometers, and/or any other suitable dimension or distribution of dimensions.

As discussed above, the cathode buffer layer preferably has a porosity between about 1 and 90 percent by volume, but can additionally or alternatively have any suitable porosity (including, e.g., no porosity). However, in other arrangements and examples, the cathode buffer layer can have any suitable porosity (e.g., between 0.01-95%, 0.1-95%, 0.01-75%, 1-95%, 1-90%, etc.). in some embodiments, the porosity is 20% or below, e.g. 0.1-20%, 1-10%, or 5-10%.

In some embodiments, the cathode buffer layer is porous but at least one layer between the cathode layer and the anode layer is nonporous. This can prevent the passage of gases and/or bulk liquid between the cathode and anode layers while still preventing delamination. For example, the nonporous layer can prevent the direct passage of water from the anode to the cathode.

MEA Fabrication

MEAs for $CO_x$ reduction may be fabricated using a variety of techniques. In various embodiments, MEAs fabrication employs multiple steps. Small differences in the parameters of the fabrication process can make a large difference in performance.

In certain embodiments, MEA fabrication employs a polymer-electrolyte membrane (e.g., a Nafion PEM) layer and depositing or otherwise forming an anion-exchange polymer electrolyte layer and cathode catalyst layer on the cathode and depositing or otherwise forming an anode catalyst layer on the anode. An alternate route is to fabricate the catalyst layers on to porous gas diffusion layers (e.g., carbon for the cathode or titanium for the anode) and sandwich the membrane (which may include the anion-exchange layer) between catalyst containing porous layers. In certain embodiments, catalyst layers are fabricated by making an ink of the solid catalyst and support particles and polymer electrolyte dispersed in a solvent. The ink may be applied by a variety of methods to the polymer electrolyte membrane or GDL. The solvent subsequently evaporates leaving behind a porous solid catalyst layer.

Imaging methods may be used to characterize the thickness and uniformity. The thickness should be consistent and controllable, and the uniformity smooth and as defect free as possible.

Various techniques may be employed to form the individual layers of the MEA. Generally, these techniques form the layer on a substrate such as a PEM layer or GDL as mentioned herein. Examples of such techniques include ultrasonic spray deposition, doctor blade application, gravure, screen printing, and decal transfer Catalyst inks using anion-exchange polymers are not well studied (particularly for certain polymers) and do not have the same solution structure as typical Nafion-based inks used in fuel cells and electrolyzers. The formulation and steps needed for form a well dispersed and stable catalyst ink were not known. It is believed that Nafion forms micell-like structures that allow relatively easy suspension in aqueous media. Other ion-conducting polymers and particularly some anion-conducting polymers do not form such structures and therefore are more difficult to provide in suspensions.

In certain embodiments, a catalyst layer ink is prepared by mixing metal or metal supported on carbon catalyst with ion-conducting polymer (e.g., an anion-conducting polymer) and dispersing in solvent (alcohol, etc.) by sonicating.

As indicated, certain fabrication techniques utilize doctor blade application, screen printing, decal transfer, electrospinning, etc. Roll-to-roll techniques such as gravure or microgravure may be used for high throughput processing.

MEA Post Treatments

After the MEA is fabricated, additional treatments may be used to increase performance. Examples the types of performance improvement include lifetime and voltage. In some embodiments, a post treatment introduces salt or certain salt ions into an MEA. In some embodiments, a post treatment produces an MEA that has structural modifications resulting from the treatments including better adhesion between layers.

Hot pressing: heating the MEA under pressure to bond the layers together. Hot pressing will help 'melt' layers together to prevent delamination.
  Time: about 2 min to 10 min (MEA only); 1.5 min-2 min (MEA+gas distribution layer (GDL)); the "MEA+GDL" may be pressed at least twice to form a stable assembly
  Temperature: about 100° C. to 150° C.;
  Pressure: between about 300 psi and 600 psi (for 3×3 inch ½ MEAs), but the MEA can tolerate about 2500 psi without GDL;
  Hydration: soaking the MEA in water or aqueous solutions to wet the polymer-electrolytes prior to cell assembly. In some embodiments, the aqueous solution is a salt solution as described herein.

Boil Nafion or other polymer electrolyte MEA. This permanently changes the macrostructure of the polymer electrolyte and increases the amount of water in the polymer matrix. This increases ionic conductivity, but also increases water transport number.

Heat to dry. This can decrease water content and can reduce the amount of water transported through the polymer electrolyte during operation.

Stabilized Interface between MEA Layers

Water and $CO_2$ formed at the interface of an anion-conducting layer (e.g., a cathode buffer layer) and a cation-conducting membrane (e.g., a PEM) can cause the two layers to separate or delaminate where the polymer layers connect. The reaction at the bipolar interface is depicted in FIGS. 3 and 7.

In addition, it is desirable for the $CO_2$ to return to the cathode of the cell where it can be reduced instead of lost to the anode, so a pathway (e.g., pores) in an anion-exchange layer (e.g., a cathode buffer layer and/or cathode layer) provides both a way to remove water and $CO_2$ from the interface to prevent delamination and return $CO_2$ to the cathode where it can react.

Figure 7:
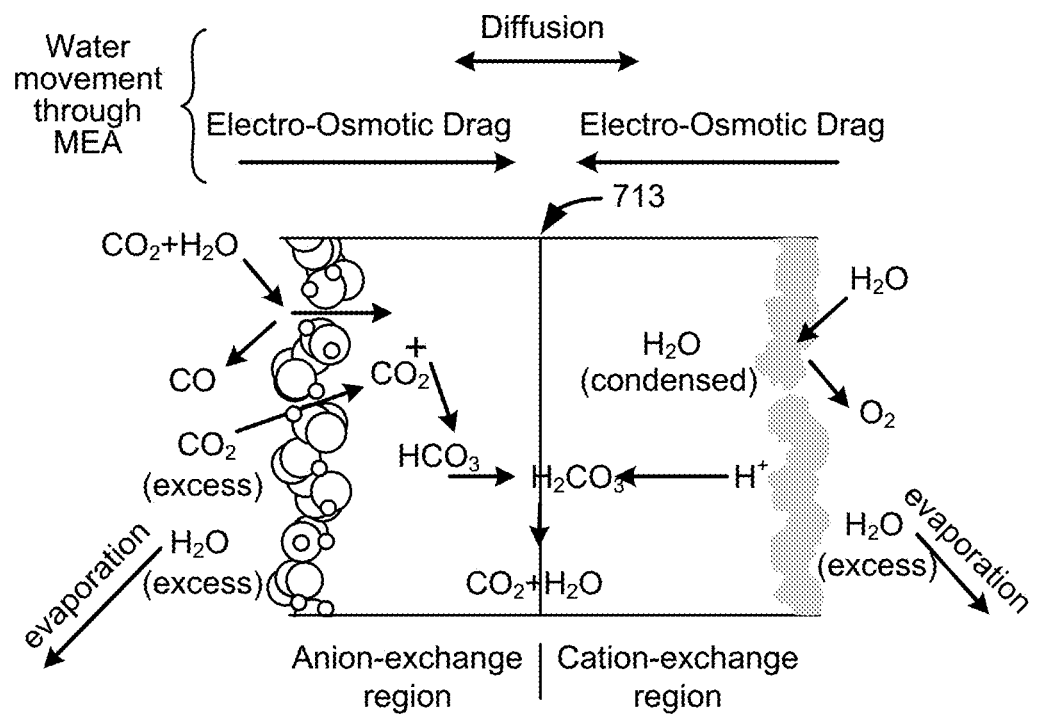
FIG. 7 is an illustration of an MEA similar to that shown FIG. 3, but additionally shows information relevant to mass transport and generation of $CO_2$ and water at a bipolar interface.

The structure depicted in FIG. 7 is similar to that depicted in FIG. 3, but FIG. 7 includes additional information relevant to mass transport and generation of $CO_2$ and water at a bipolar interface. For example, it shows hydroxide and $CO_2$ reacting on the cathode side to produce bicarbonate ions, which move toward the bipolar interface 713. On the anode side, hydrogen ions produced by water oxidation move toward bipolar interface 713, where they react with the bicarbonate ions to produce water and $CO_2$, both of which should be allowed to escape without damaging the bipolar layers.

Also depicted in FIG. 7 are water transport paths including (a) electroosmotic drag with anions from the cathode to interface 713, (b) electroosmotic drag with cations from the anode to interface 713, and (c) diffusion. Water evaporates at the anode and cathode.

Various MEA designs contain features that resist delamination and optionally provide a pathway for the reaction products to leave the interface area. In some embodiments, the bipolar interface is flat. But in some designs, the interface is provided with a composition gradient and/or interlocking structures. These are described further below with reference to FIGS. 10a, 10b, 10c, and 10d, which illustrate bipolar interfaces of MEA designs configured to resist delamination.

In some embodiments, the interface includes a gradient. A gradient may be formed, for example, by using two nozzles during spray deposition and adding anion-exchange polymer with the relative amounts of the polymers varied during deposition of the cation-exchange layer. Similarly, cation-exchange polymer may be added during deposition of the anion-exchange layer. Referring for example to FIG. 7, a gradient may extend through substantially all or a portion of the anion-exchange region and cation-exchange region, such that the anion-exchange region has predominantly anion-exchange polymer adjacent to the cathode with the relative amount of cation-exchange polymer increasing moving from the cathode toward the interface 713. Similarly, the cathode-exchange region has a predominantly cation-exchange polymer adjacent the anode cathode with the relative amount of anion-exchange polymer increasing moving from the anode toward the interface 713. In some embodiments, there are a pure anion-exchange and pure cation-exchange regions with a gradient between the two.

In some embodiments, the layers of the bipolar membrane are melted together. This may be accomplished by choosing an appropriate solvent. For example, Nafion is at least slightly soluble in a water/ethanol mixture. By using that mixture (or another solvent in which the cation-conducting polymer is soluble) as a solvent for the anion-conducting polymer can result in Nafion or other cation-conducting polymer at least slightly dissolvent and melting into the interface. In some embodiments, this results in a thin gradient, e.g., one that extends 0.5-10% into the anion-conducting polymer layer thickness.

In some embodiments, the interface includes a mixture of the polymers. FIG. 8A illustrates a bipolar interface 813 in which a cation-conducting polymer 821 and an anion-conducting polymer 819 are mixed. In the example of FIG. 8A, a portion of an anion-conducting polymer layer 809 and a portion of a cation-conducting polymer layer 811 are shown. The anion-conducting polymer layer 809 may be a pure anion-conducting polymer and the cation-conducting polymer layer 811 may be pure cation exchange polymer. The cation-conducting polymer 821 may be the same or different cation-conducting polymer as in the cation-conducting polymer layer 811. The anion-conducting polymer 819 may be the same or different anion-conducting polymer as in the anion-conducting polymer layer 809.

In some embodiments, the interface includes a third material that physically reinforces the interface. For example, FIG. 8B shows an example of a material 830 that straddles interface 813. That is, the material 830 partially resides in an anion-conducting polymer layer 809 and a cation-conducting polymer layer 811. Because of this, material 830 may bind the two layers in a manner that resists delamination. In one example, the material 830 is a porous inert material, such as porous PTFE. Such an interface may be fabricated, for example, by casting or otherwise applying the cation-conducting polymer and the anion-conducting polymer on opposite sides of a PTFE or similar porous film, followed by hot pressing.

FIG. 8C illustrates a bipolar interface 813 having protrusions 840 of the cation-conducting polymer extending from the cation-conducting polymer layer 811 into the anion-conducting polymer layer 809. These protrusions may mechanically strengthen interface 813 so that it does not delaminate when $CO_2$ and water are produced at the interface. In some embodiments, protrusions extend from anion-conducting polymer layer 809 into cation-conducting polymer layer 811. In certain embodiments, protrusions extend both directions. Example dimensions are 10 µm-1 mm in the in-plane dimension, though smaller dimensions (e.g., 500 nm-1 µm) are possible. The out-of-plane dimension may be for example, 10-75% or 10-50% of the total thickness of the polymer layer into which it extends. The protrusions may be fabricated for example by any appropriate technique such as lithographic techniques or by spraying the polymer into a patterned mesh that is then removed. Surface roughening techniques may also be used to create protrusions. In some embodiments, protrusions may be formed from a different material, e.g., metal to help interlock the polymer layers and mechanically strengthen the interface.

FIG. 8D illustrates a bipolar interface 813 having a third material 850 disposed between or mixed one or more of the cation-conducting polymer layer 811 into the anion-conducting polymer layer 809. In some embodiments, for example, the third material 850 can be an additive as discussed further below. In some embodiments, the third material 850 can be a blend of anion-conducting and cation-conducting ionomers at the interface. For example, it can be a mixture of Nafion 5 wt % ionomer and Orion 2 wt % mTPN1. In some embodiments, the third material may include ion acceptors and donors, either mixed together or provided as distinct layers.

In some embodiments, the interface includes additives to facilitate acid-base reactions and prevent delamination. In some embodiments, the additives may facilitate spreading out the acid base recombination a larger volume instead of just at a 2D interface of the anion conducting polymer and cation conducting polymer. This spreads out water and $CO_2$ formation, heat generation, and may lower the resistance of the membrane by decreasing the barrier to the acid-base reaction. These effects can be advantageous in helping avoid build-up of products, heat, and lowering resistive losses in the MEA leading to a lower cell voltage. Further, it helps avoid degrading materials at the interface due to heat and gas production.

Examples of additives that facilitate acid-base reactions include molecules that are both proton and anion acceptors, such as hydroxide containing ionic liquids with 1-butyl-3-methylimidazolium hydroxide being a specific example. Other ionic liquids may also be used. In some embodiments, an ionomer different from that of the anion-conductive polymer layer and the cation-conductive polymer layer may be used. For example, a relatively high conductivity anion-exchange material such as Sustainion may be used. Such anion-exchange material may not be selective enough to use as a cathode buffer layer, but can be used at the interface.

Additional examples of materials that may be present at the interface include block copolymers having different charged groups (e.g., both cation and anion stationary charge groups), cation-and-anion conducting polymers, resin material, ion donors such as oxides including graphene oxide, catalysts for acid/base recombination, catalysts that react $H_2$ and $O_2$ diffusing from the anode and cathode, water splitting catalysts, $CO_2$ absorbing material, and $H_2$ absorbing material.

In some embodiments, a cross-linker may be added to covalently cross-link the two polymers of the bipolar membrane. Examples of cross-linking groups include xylene, which may be provided on an ionomer. Other cross-linking groups may be used. A cross-linker may be provided, for example, on the cation-conductive polymer, with the anion-conductive polymer spray-deposited on top, followed by heating to induce the cross-linking reaction and introduce cross-linking across the interface.

In some embodiments, the anion-conducting polymer and the cation-conducting polymer of the bipolar membrane have the same backbone, with different stationary charge groups. As an example, Orion ionomers may be used with different stationary charge groups. The ionomers are more compatible and less apt to delaminate.

In the examples above, the interface 813 may be a three-dimensional volume having thickness that is between 1% and 90% of the overall thickness of the bipolar membrane, or between 5% and 90%, or between 10% and 80%, or between 20% and 70%, or between 30% and 60% of the overall thickness of the bipolar membrane. In some embodiments, it less than half the overall thickness, including between 1% and 45%, 5% and 45%, 5% and 40%, or 5% and 30%.

Hot pressing may be used in fabricating any of the bipolar interface designs described above.

Relative Sizes of MEA Layers

In certain embodiments, a polymer electrolyte membrane and an adjoining cathode buffer layer or other anion-conducting polymer layer may have relative thickness that facilitate the fabrication and/or operating performance of an MEA.

Figure 9:
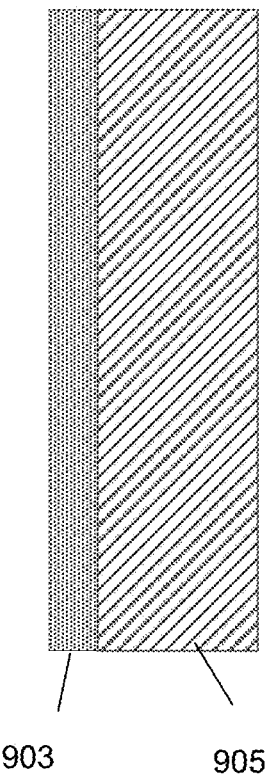
FIG. 9 is an illustration of a partial MEA that includes an anion-conducting polymer layer, which may be a cathode buffer layer, and a polymer electrolyte membrane, which may be cation-conducting polymer layer.

FIG. 9 depicts an example of a partial MEA that includes an anion-conducting polymer layer (AEM) 903, which may be a cathode buffer layer, and a polymer electrolyte membrane (PEM) 905, which may be cation-conducting polymer layer (e.g., a proton exchange polymer layer) or an anion-conducting polymer layer. In this example, the PEM 905 is relatively thicker than the anion-conducting polymer layer 903, which may be a cathode buffer layer, and a polymer electrolyte membrane (PEM) 905, which may be cation-conducting polymer layer (e.g., a proton exchange polymer layer) or an anion-conducting polymer layer. In this example, the PEM 905 is relatively thicker than the anion-conducting polymer layer 903. For example, the PEM 905 may be 120 micrometers compared with about 10-20 micrometers thick for the AEM 903.

In some cases, anion-conducting polymers such as those used in anion-conducting polymer layer 903 are substantially less conductive than cation-conducting polymers such as those used in PEM 905. Therefore, to provide the benefits of a cathode buffer layer (e.g., anion-conducting polymer layer 903) without substantially increasing the overall resistance of the MEA, a relatively thin cathode buffer is used. However, when a cathode buffer layer becomes too thin, it becomes difficult to handle during fabrication of the MEA and in other contexts. Therefore, in certain embodiments, a thin cathode buffer layer is fabricated on top of a relatively thicker PEM layer such as a cation-conducting polymer layer. The anion-conducting polymer layer may be fabricated on the PEM layer using, for example, any of the fabrication techniques described elsewhere herein.

In various embodiments, the polymer electrolyte membrane layer is between about 20 and 200 micrometers thick. In some embodiments, the polymer electrolyte membrane layer is between about 60 and 120 micrometers thick. In some embodiments, a thin polymer electrolyte membrane layer is used, being between about 20 and 60 micrometers thick. In some embodiments, a relatively thick polymer electrolyte layer is used, between about 120 and 200 micrometers thick.

In some embodiments, a thinner cathode buffer layer is used with a thinner polymer electrolyte membrane. This can facilitate movement of the $CO_2$ formed at the interface back to cathode, rather than to the anode. In some embodiments, a thicker cathode buffer layer is used with a thicker polymer electrolyte membrane. This can result in reducing cell voltage in some embodiments.

Factors that can influence the thickness of a cathode buffer layer include the ion selectivity of the anion-conducting polymer, the porosity of the anion-conducting polymer, the conformality of the anion-conducting polymer coating the polymer electrolyte membrane.

Many anion-conducting polymers are in the range of 95% selective for anions, with about 5% of the current being cations. Higher selectivity anion-conducting polymers, with greater than 99% selectivity for anions can allow for a reduction in a significant reduction in thickness while providing a sufficient buffer.

Mechanical strength of an anion-conducting layer can also influence its thickness, with stronger layers enabling thinner layers. Reducing porosity of an anion-conducting polymer may reduce the thickness of the anion-conducting layer.

In some implementations, a cathode buffer layer or other anion-conducting polymer layer that abuts the polymer electrolyte membrane is between about 10 and 20 micrometers thick. Using a >99% selective polymer can allow the cathode buffer layer to be reduced to between 2 and 10 microns in some embodiments.

In some cases, the ratio of thicknesses of the polymer electrolyte membrane and the adjoining anion-conducting polymer layer is between about 3:1-90:1 with the ratios at the higher end used with highly selective anion-conducting polymer layers. In some embodiments, the ratio is about 2:1-13:1, about 3:1-13.1, or about 7:1-13.1.

In certain embodiments, a relatively thinner PEM improves some aspects of the MEA's performance. Referring to FIG. 9, for example, polymer electrolyte membrane 905 may have a thickness of about 50 micrometers, while the anion-conducting layer may have a thickness between about 10 and 20 micrometers. A thin PEM favors movement of water generated at the AEM/PEM interface to move toward the anode. The pressure of gas on the cathode side of the cell can be about 80-450 psi, which causes the water at the interface to move to the anode. However, in some instances, a thick PEM can cause the majority of water to move through the AEM to the cathode, which leads to flooding. By using a thin PEM, flooding can be avoided.

$CO_x$ Reduction Reactor (CRR)

Figure 10:
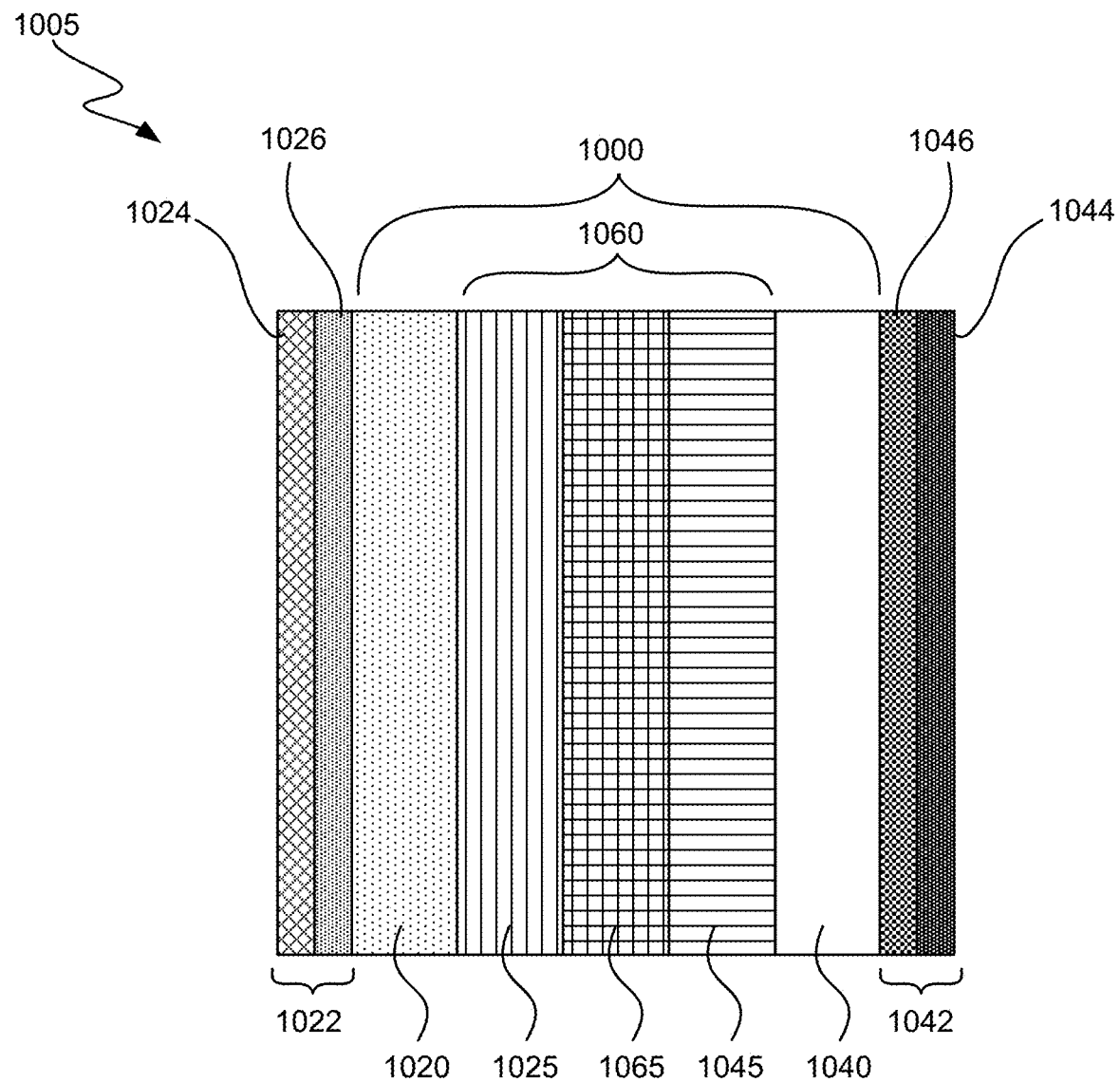
FIG. 10 is a schematic drawing that shows the major components of a $CO_x$ reduction reactor (CRR) according to various embodiments of the disclosure.

FIG. 10 is a schematic drawing that shows the major components of a $CO_x$ reduction reactor (CRR) 1005, according to an embodiment of the disclosure. The CRR 1005 has a membrane electrode assembly 1000 such as any of those described elsewhere herein. The membrane electrode assembly 1000 has a cathode 1020 and an anode 1040, separated by an ion-exchange layer 1060. The ion-exchange layer 1060 may include sublayers. The depicted embodiment has three sublayers: a cathode buffer layer 1025, a polymer electrolyte membrane 1065, and an optional anode buffer layer 1045. In addition, the CRR 1005 has a cathode support structure 1022 adjacent to the cathode 1020 and an anode support structure 1042 adjacent to the anode 1040.

The cathode support structure 1022 has a cathode polar plate 1024, made of, for example, graphite, to which a voltage can be applied. There can be flow field channels, such as serpentine channels, cut into the inside surfaces of the cathode polar plate 1024. There is also a cathode gas diffusion layer 1026 adjacent to the inside surface of the cathode polar plate 1024. In some arrangements, there is more than one cathode gas diffusion layer (not shown). The cathode gas diffusion layer 1026 facilitates the flow of gas into and out of the membrane electrode assembly 1000. An example of a cathode gas diffusion layer 1026 is a carbon paper that has a carbon microporous layer.

The anode support structure 1042 has an anode polar plate 1044, usually made of metal, to which a voltage can be applied. There can be flow field channels, such as serpentine channels, cut into the inside surfaces of the anode polar plate 1044. There is also an anode gas diffusion layer 1046 adjacent to the inside surface of the anode polar plate 1044. In some arrangements, there is more than one anode gas diffusion layer (not shown). The anode gas diffusion layer 1046 facilitates the flow of gas into and out of the membrane electrode assembly 1000. An example of an anode gas diffusion layer 1046 is a titanium mesh or titanium felt. In some arrangements, the gas diffusion layers 1026, 1046 are microporous.

There are also inlets and outlets (not shown) associated with the support structures 1022, 1042, which allow flow of reactants and products, respectively, to the membrane electrode assembly 1000. There are also various gaskets (not shown) that prevent leakage of reactants and products from the cell.

In one embodiment, a direct current (DC) voltage is applied to the membrane electrode assembly 1000 through the cathode polar plate 1024 and the anode polar plate 1042. Water is supplied to the anode 1040 and is oxidized over an oxidation catalyst to form molecular oxygen ($O_2$), releasing protons (H+) and electrons (e−). The protons migrate through the ion-exchange layer 1060 toward the cathode 1020. The electrons flow through an external circuit (not shown). In one embodiment, the reaction is described as follows:

$$2H_2O \rightarrow 4H^+ + 4e^- \alpha O_2$$

In other embodiments, other reactants can be supplied to the anode 1040 and other reactions can occur.

While the depicted embodiment shows an ion-exchange layer having three sublayers, certain embodiments employ ion-exchange layers having only a single layer (e.g., a cation conducting polymer layer or an anion conducting polymer layer). Other embodiments have only two sublayers.

Figure 11:
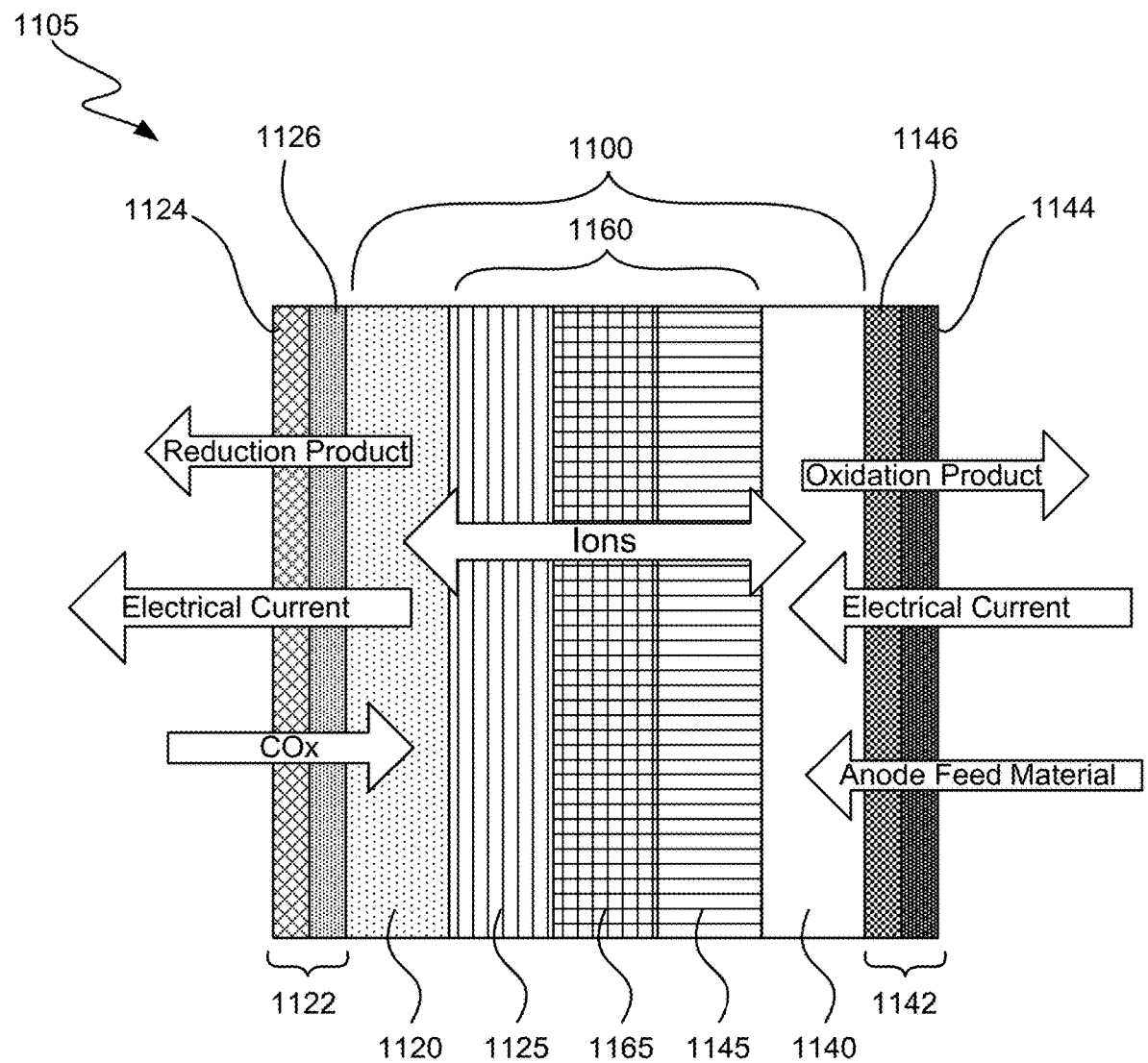
FIG. 11 is a schematic drawing that shows the major components of a CRR with arrows showing the flow of molecules, ions, and electrons according to various embodiments of the disclosure.

The flow of reactants, products, ions, and electrons through a CRR 1105 reactor is indicated in FIG. 11, according to an embodiment. The CRR 1105 has a membrane electrode assembly 1100 such as any of the MEAS described elsewhere herein. The membrane electrode assembly 1100 has a cathode 1120 and an anode 1140, separated by an ion-exchange layer 1160. In certain embodiments, the ion-exchange layer 1160 has three sublayers: a cathode buffer layer 1125, a polymer electrolyte membrane 1165, and an optional anode buffer layer 1145. In addition, the CRR 1105 has a cathode support structure 1122 adjacent to the cathode 1120 and an anode support structure 1142 adjacent to the anode 1140.

The cathode support structure 1122 has a cathode polar plate 1124, which may be made of graphite, to which a voltage can be applied. There can be flow field channels, such as serpentine channels, cut into the inside surfaces of the cathode polar plate 1124. There is also a cathode gas diffusion layer 1126 adjacent to the inside surface of the cathode polar plate 1124. In some arrangements, there is more than one cathode gas diffusion layer (not shown). The cathode gas diffusion layer 1126 facilitates the flow of gas into and out of the membrane electrode assembly 1100. An example of a cathode gas diffusion layer 1126 is a carbon paper that has a carbon microporous layer.

The anode support structure 1142 has an anode polar plate 1144, which may be made of metal, to which a voltage can be applied. There can be flow field channels, such as serpentine channels, cut into the inside surfaces of the anode polar plate 1144. There is also an anode gas diffusion layer 1146 adjacent to the inside surface of the anode polar plate 1144. In some arrangements, there is more than one anode gas diffusion layer (not shown). The anode gas diffusion layer 1146 facilitates the flow of gas into and out of the membrane electrode assembly 1100. An example of an anode gas diffusion layer 1146 is a titanium mesh or titanium felt. In some arrangements, the gas diffusion layers 1126, 1146 are microporous.

There can also be inlets and outlets associated with the support structures 1122, 1142, which allow flow of reactants and products, respectively, to the membrane electrode assembly 1100. There can also be various gaskets that prevent leakage of reactants and products from the cell.

$CO_x$ can be supplied to the cathode 1120 and reduced over $CO_x$ reduction catalysts in the presence of protons and electrons. The $CO_x$ can be supplied to the cathode 1120 at pressures between 0 psig and 1000 psig or any other suitable range. The $CO_x$ can be supplied to the cathode 1120 in concentrations below 100% or any other suitable percentage along with a mixture of other gases. In some arrangements, the concentration of $CO_x$ can be as low as approximately 0.5%, as low as 5%, or as low as 20% or any other suitable percentage.

In one embodiment, between approximately 10% and 100% of unreacted $CO_x$ is collected at an outlet adjacent to the cathode 1120, separated from reduction reaction products, and then recycled back to an inlet adjacent to the cathode 1120. In one embodiment, the oxidation products at the anode 1140 are compressed to pressures between 0 psig and 1500 psig.

In one embodiment, multiple CRRs (such as the one shown in FIG. 10) are arranged in an electrochemical stack and are operated together. The CRRs that make up the individual electrochemical cells of the stack can be connected electrically in series or in parallel. Reactants are supplied to individual CRRs and reaction products are then collected.

Figure 12:
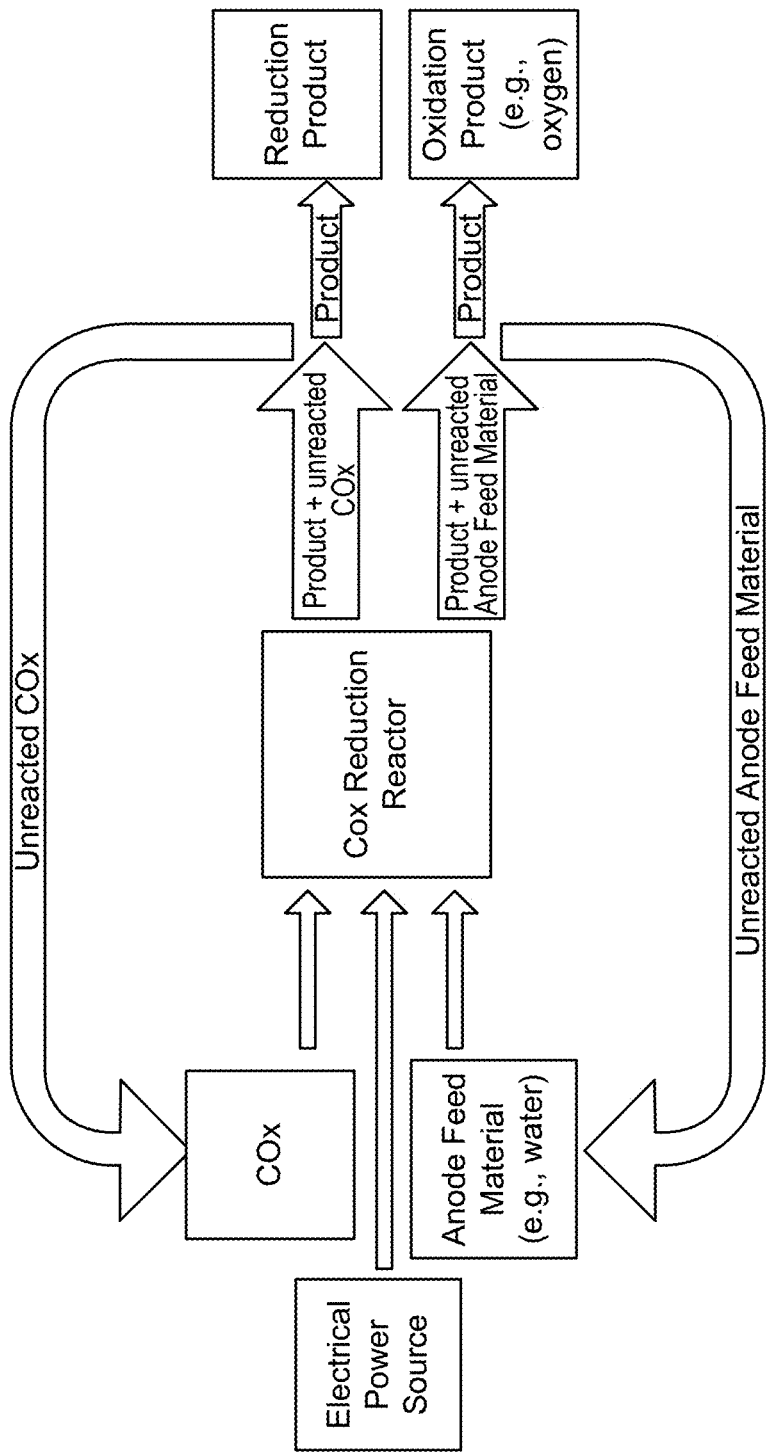
FIG. 12 is a schematic drawing that shows the major inputs and outputs of the CRR reactor according to various embodiments of the disclosure.

In accordance with some embodiments, inputs and outputs to the reactor are shown in FIG. 12. $CO_x$ anode feed material, and electricity are fed to the reactor. $CO_x$ reduction product and any unreacted $CO_x$ leave the reactor. Unreacted $CO_x$ can be separated from the reduction product and recycled back to the input side of the reactor. Anode oxidation product and any unreacted anode feed material leave the reactor in a separate stream. Unreacted anode feed material can be recycled back to the input side of the reactor.

Various catalysts in the cathode of a CRR cause different products or mixtures of products to form from $CO_x$ reduction reactions. Examples of possible $CO_x$ reduction reactions at the cathode are described as follows:

$$CO_2 + 2H^+ + 2e^- \rightarrow CO + H_2O$$

$$2CO_2 + 12H^+ + 12e^- \rightarrow CH_2CH_2 + 4H_2O$$

$$2CO_2 + 12H^+ + 12e^- \rightarrow CH_3CH_2OH + 3H_2O$$

$$CO_2 + 8H^+ + 8e^- \rightarrow CH_4 + 2H_2O$$

$$2CO + 8H^+ + 8e^- \rightarrow CH_2CH_2 + 2H_2O$$

$$2CO + 8H^+ + 8e^- \rightarrow CH_3CH_2OH + H_2O$$

$$CO + 6H^+ + 8e^- \rightarrow CH_4 + H_2O$$

In some embodiment, a method of operating a $CO_x$ reduction reactor, as described in the embodiments above, involves applying a DC voltage to the cathode polar plate and the anode polar plate, supplying oxidation reactants to the anode and allowing oxidation reactions to occur, supplying reduction reactants to the cathode and allowing reduction reactions to occur, collecting oxidation reaction products from the anode; and collecting reduction reaction products from the cathode. Current or voltage may be controlled to cycle according to a schedule as described above.

In one arrangement, the DC voltage is greater than about −1.2V. In various arrangements, the oxidation reactants can be any of hydrogen, methane, ammonia, water, or combinations thereof, and/or any other suitable oxidation reactants. In one arrangement, the oxidation reactant is water. In various arrangements, the reduction reactants can be any of carbon dioxide, carbon monoxide, and combinations thereof, and/or any other suitable reduction reactants. In one arrangement, the reduction reactant is carbon dioxide.

Examples

Faraday efficiency, which is also sometimes referred to as Faradaic yield, coulombic efficiency or current efficiency, is the efficiency with which charge is transferred in a system facilitating an electrochemical reaction. The use of Faraday's constant in Faradaic efficiency correlates charge with moles of matter and electrons. Faradaic losses are experienced when electrons or ions participate in unwanted side reactions. These losses appear as heat and/or chemical byproducts. The below examples include plots of Faradaic yield for various products.

Improved Selectivity for Methane

Figure 13:
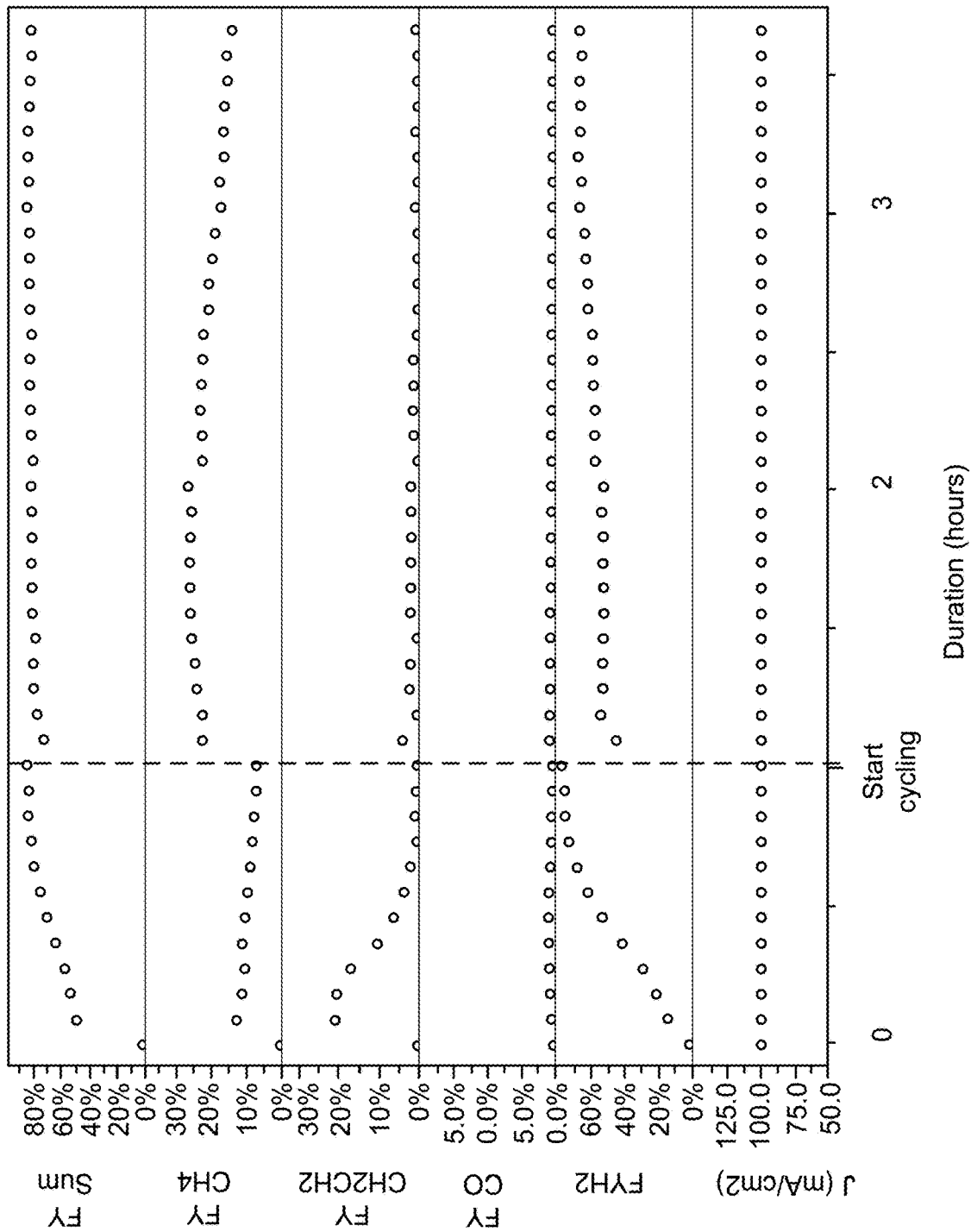
FIG. 13 is a plot showing applied current density (J) and Faradaic yield (FY) for $H_2$, CO, $CH_2CH_2$, $CH_4$ obtained from operation of a MEA including current cycling.

An MEA with a copper cathode catalyst was setup with 100 mA/cm2 applied on a 5 cm2 MEA with selectivity for methane. After around one hour of operation a cycling with the setup of 1 minute current-off (i.e., a current pause) for every 4.5 minutes current applied was applied. FIG. 13 is a plot showing applied current density (J) and Faradaic yield (FY) for $H_2$, CO, $CH_2CH_2$, $CH_4$, and the sum. Each dot on the plot is 5.5 mins apart, so the current pause is not shown. However, as indicated on the plot, the current cycling begins at 1 hour.

In the first hour, after break-in, the methane selectivity declined from 13% to 7%. After the applied current cycling was started, the methane selectivity rose to 23%. Hydrogen selectivity declined, and selectivity for ethylene and carbon monoxide remained at low levels.

Possible mechanisms for the improvement (and the other observed improvements described in this disclosure) include 1) allowing for hydrogen removal from the surface of catalyst thus improving $CO_2$ access 2) allowing for water removal from the local environment of the catalyst 3) desorption of other reaction byproducts or impurities from the catalyst surface, and 4) changes in membrane/double layer resistance/conductivity.

Improved Selectivity for Methane with Simulated Biogas Feed

Figure 14:
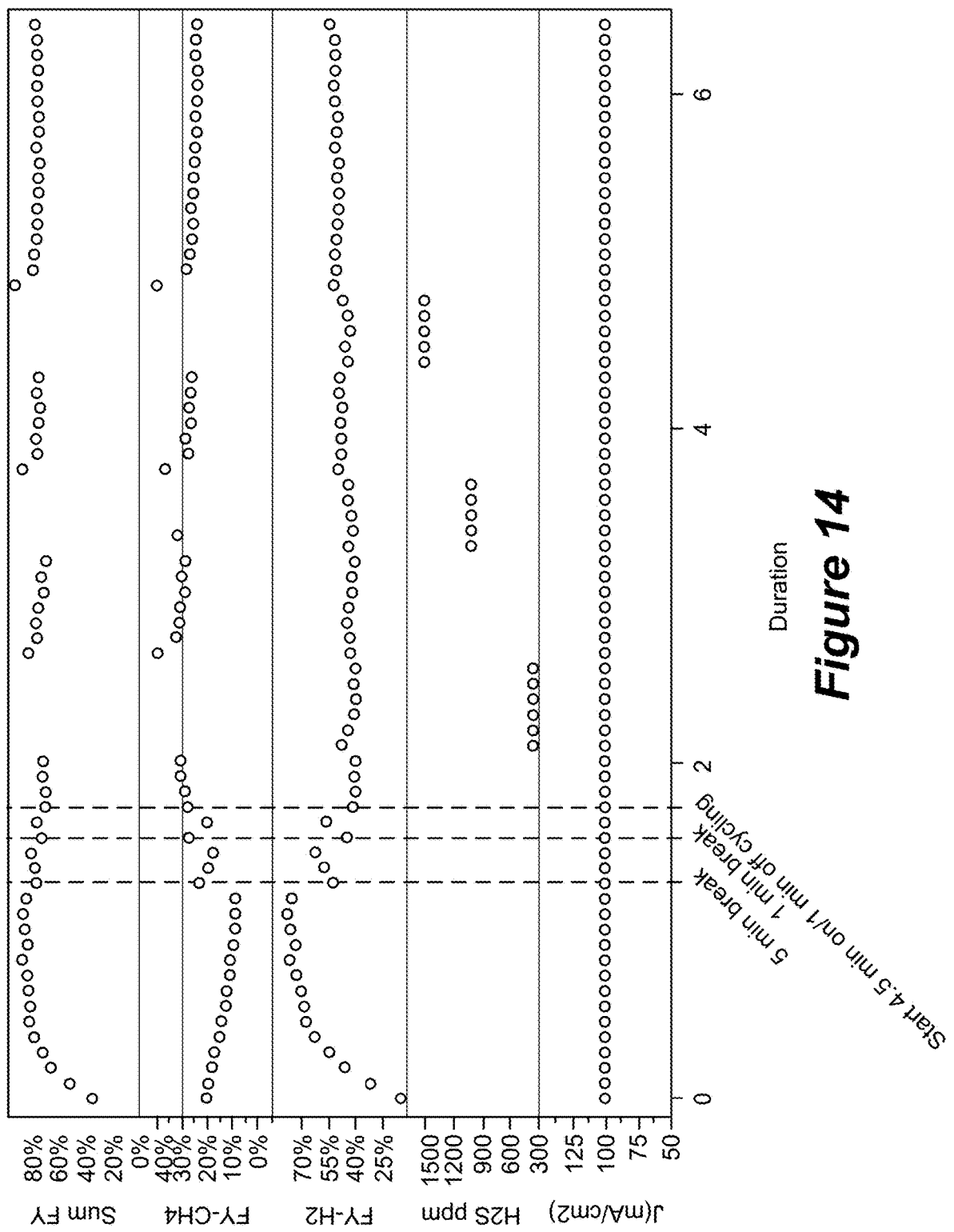
FIG. 14 is a plot showing applied current density (J) and Faradaic yield (FY) for $H_2$ and $CH_4$ obtained from operation of a MEA with a simulated biogas feed including current cycling.

A MEA with a copper cathode catalyst for testing simulated biogas with $H_2S$ injections of up to 1500 ppm was initially started at 100 mA/cm² constant current applied. FIG. 14 is a plot showing Faradaic yield (FY) for $H_2$ and $CH_4$. The $H_2S$ injections are also shown. The initial yield (before any current pause) for methane declined from 20% to 10%. When the current applied was paused for 5 minutes and then continued, the performance of the MEA improved significantly, but continued to decline. When the test was then paused again for 1 minute and restarted the MEA regained performance but continued to decline. After instituting a regular 1 minute pause for every 4.5 minutes of current applied, the MEA maintained a steady selectivity for methane of 30%, and was able to withstand exposures of up to 1500 ppm $H_2S$ without significant signs of poisoning.

Improved Selectivity for Methane During Break-In

Figure 15:
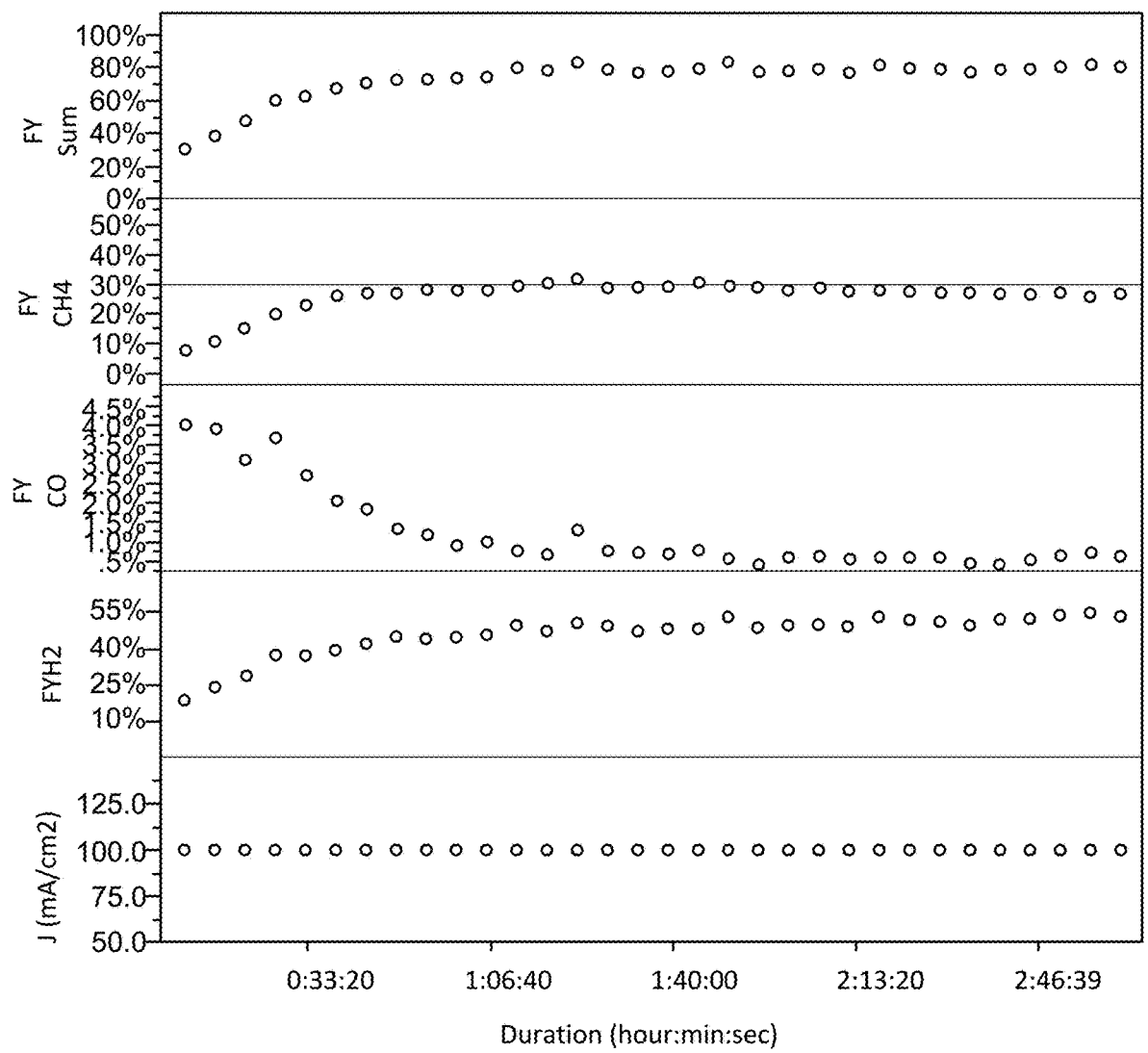
FIG. 15 is a plot showing a break-in period for a MEA with a copper cathode catalyst. Applied current density (J) and Faradaic yields for $H_2$, CO, and $CH_4$ are shown.

FIG. 15 is a plot showing a break-in period for a MEA with a copper cathode catalyst. Applied current density, and Faradaic yields for $H_2$, CO, and $CH_4$ are shown. The applied current was paused 1 minute for every 4.5 minutes applied for the entire duration of operation. As with the plot of FIG. 13, the dots are 5.5 minutes apart, so the pause is not seen on the plot. FIG. 15 shows that there is a significant break-in period. It also shows that with the current cycling, the slope of the FY $CH_4$ curve is positive, in contrast to the FY $CH_4$ curves in FIGS. 13 and 14, which decline in the period prior to current cycling.

Improved Selectivity for CO

Figure 16:
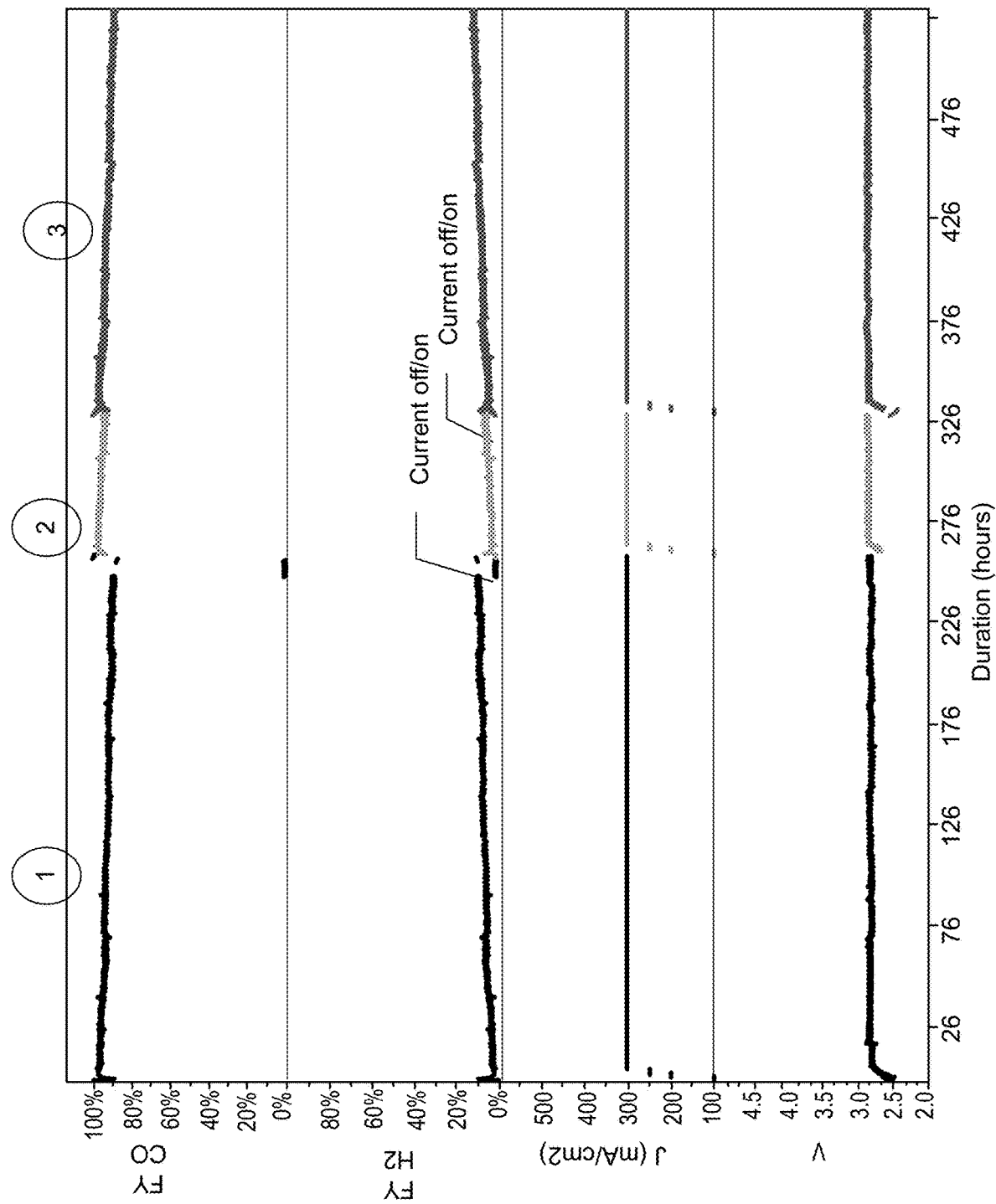
FIG. 16 is a plot showing voltage (V), applied current density (J) and Faradaic yields for $H_2$ and CO for a MEA configured to produce CO. Three cycles are shown including break-in and two current on/off events.

An MEA with a gold cathode catalyst for producing CO was shut down for more than 4 days after two durations of 50-300 hours each. As shown in FIG. 16, when the cell restarted Faradaic yield for CO increased, while Faradaic yield for $H_2$ decreased compared to the values at the time the cell was shut off for the previous cycle. In particular, Faradaic yield for CO increase about 10% at the beginning of cycle 2 compared to the end of cycle 1, and about 5% at the beginning of cycle 3 compared to the end of cycle 2.

Figure 17:
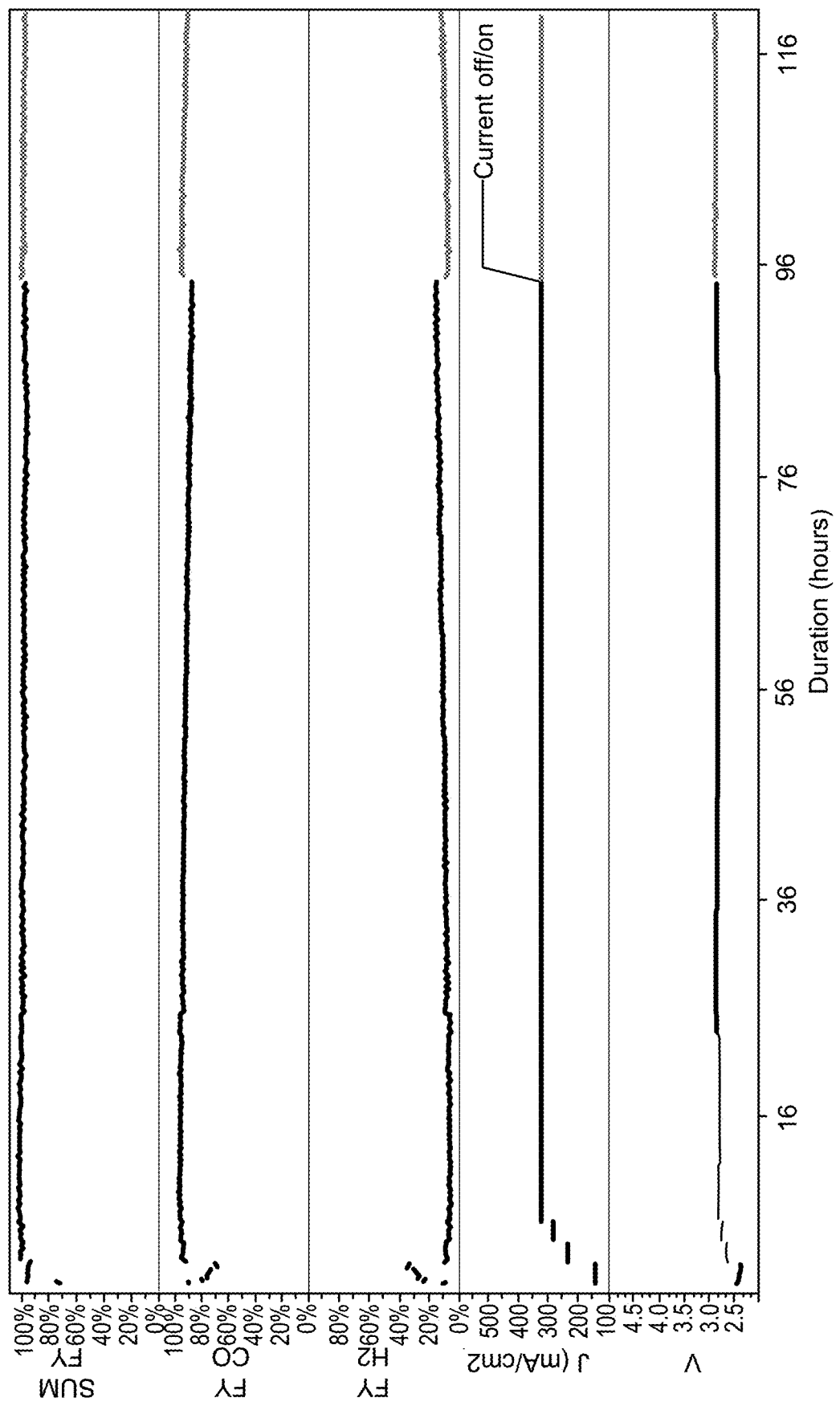
FIG. 17 is a plot showing voltage (V), applied current density (J) and Faradaic yields for $H_2$ and CO for a MEA configured to produce CO. Current was paused at 95 minutes.

FIG. 17 shows cell performance for long-term test of a single MEA, with off/on current pause indicated. As shown in FIG. 17 at 95 hours, pausing cell operation for 15 minutes improved cell performance. The FY CO increased 8% from 86% to 94% while FY $H_2$ was halved from 13% to 6%.

Figure 18:
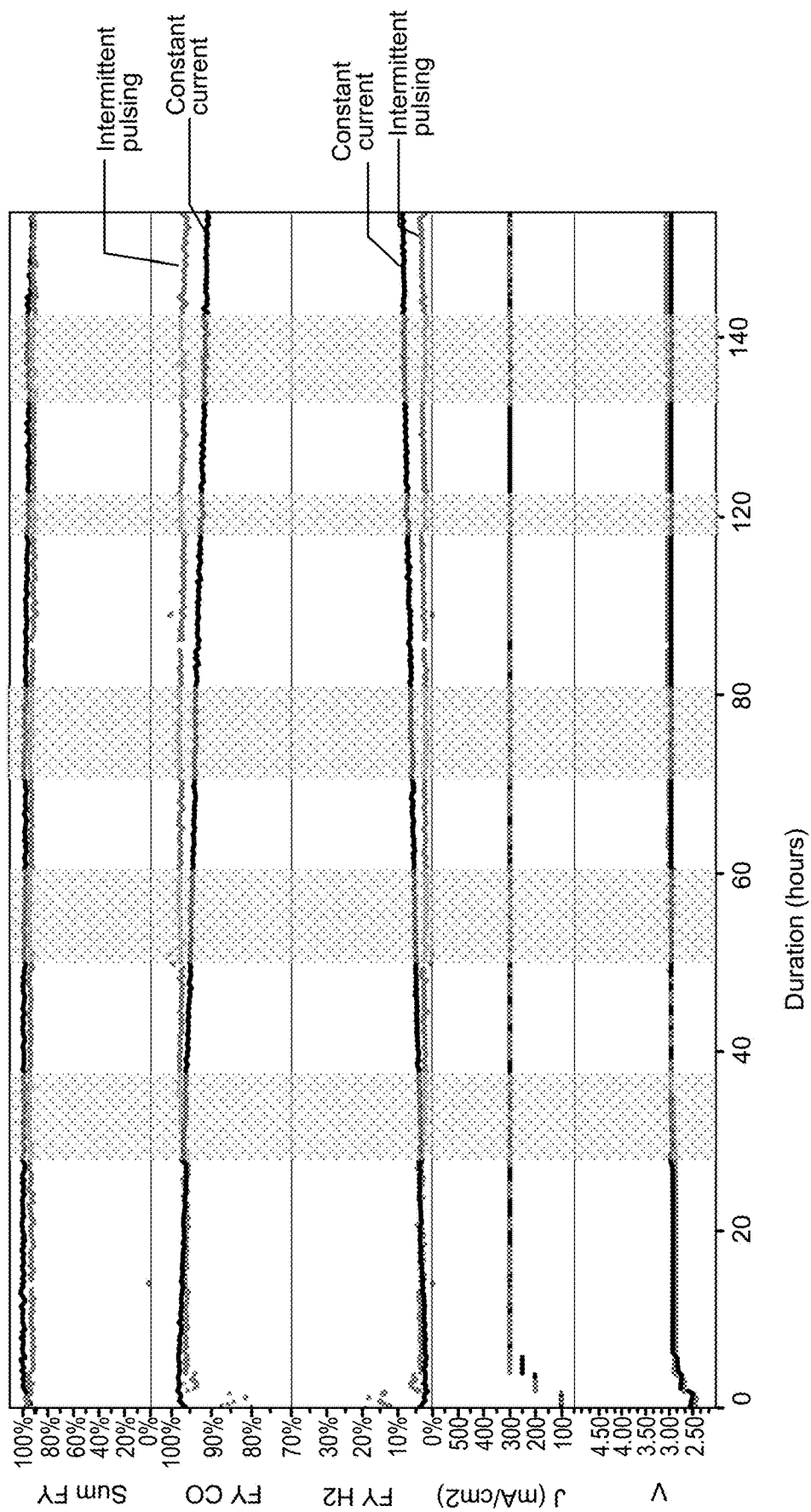
FIG. 18 is a plot comparing cell performance of two MEAs configured to produce CO; one operated with no pauses in current and the other with intermittent pulsing.

FIG. 18 shows cell performance of two MEAs, one continuously operated with no pauses in current and other operated with intermittent pulsing of current where the cell was operated for 55 minutes, and then turned off for 5 minutes. This on/off cycling was repeated during the pulsing periods, indicated by the dotted bands on the figure. Between these pulsing periods, the current was run continuously. Referring to FIG. 18, the different curves for FY CO and FY $H_2$ are labeled. Intermittent pulsing resulting in better CO selectivity. The plot illustrates the improvement in reactor stability when intermittent pulsing is applied during operation. For the cell with intermittent pulsing, the decay of selectivity (dFY_CO/dt) between 30 and 134 hours was −0.0070%/hr versus −0.055%/hr for the cell with continuous current.

These examples show that pausing cell operation for short and extended periods of time improves cell performance by increasing selectivity for CO.

Improved Selectivity for CO—MEA stack

Figure 19:
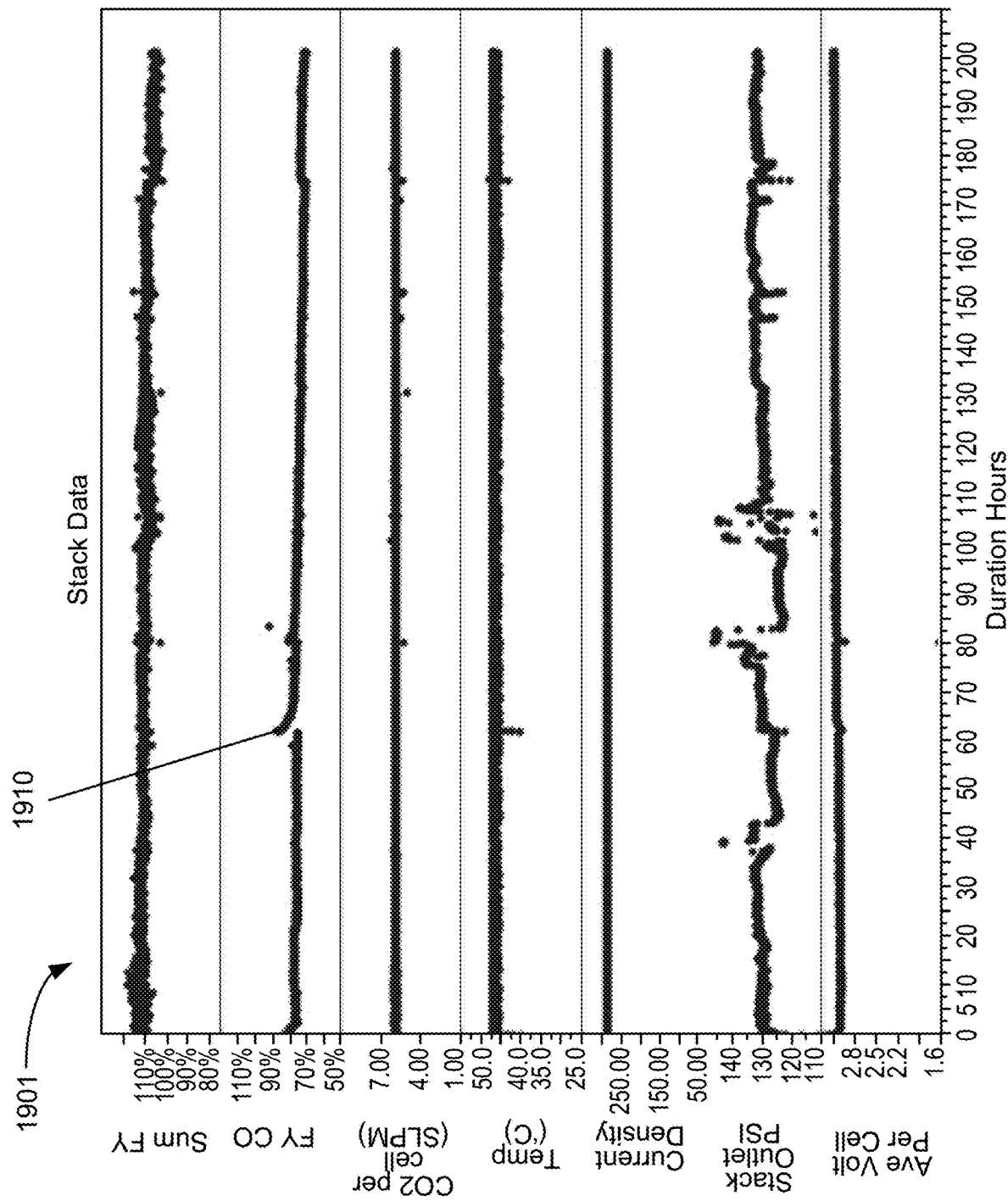
FIG. 19 shows two plots with performance data for MEA stacks configured to produce CO and each operated with a current pause.

The above examples use single MEAs; however, the improvement in selectivity is observed with MEA stacks. FIG. 19 shows performance data for two stacks: at 1901, data for operation of a MEA stack with a current pause of about 32 hours at around 63 hours in duration. The 32 hour break is not shown in the plot; however at 1910, the resulting increase in FY_CO is observed. At 1902, data for operation with a current pause of about 13 hours at 1912 is shown. An improvement in selectivity as demonstrated by increased FY CO at 1914 was observed. The increase was about 20%.

Break In—Current Ramp

FIG. 20 shows results of two identical MEAs for producing CO tested using different ramp programs to reach the operating current density of 500 mA/cm². The filled dots correspond to a cell operated for 1 hour at each intermediate current density (100 mA/cm², 200 mA/cm², 300 mA/cm², 400 mA/cm²) and the unfilled dots correspond to a cell operated for 30 minutes at each intermediate current density. (In some instances the unfilled dots obscure the filled dots on the plot and vice versa). FIG. 20 shows that for the cell operated with the slower ramp speed (filled dots), the Faradaic yield of CO was higher than for the cell operated for a shorter period of time at each current density. The results indicate that slower current ramp can facilitate hydration leading to higher performance.

Figure 21:
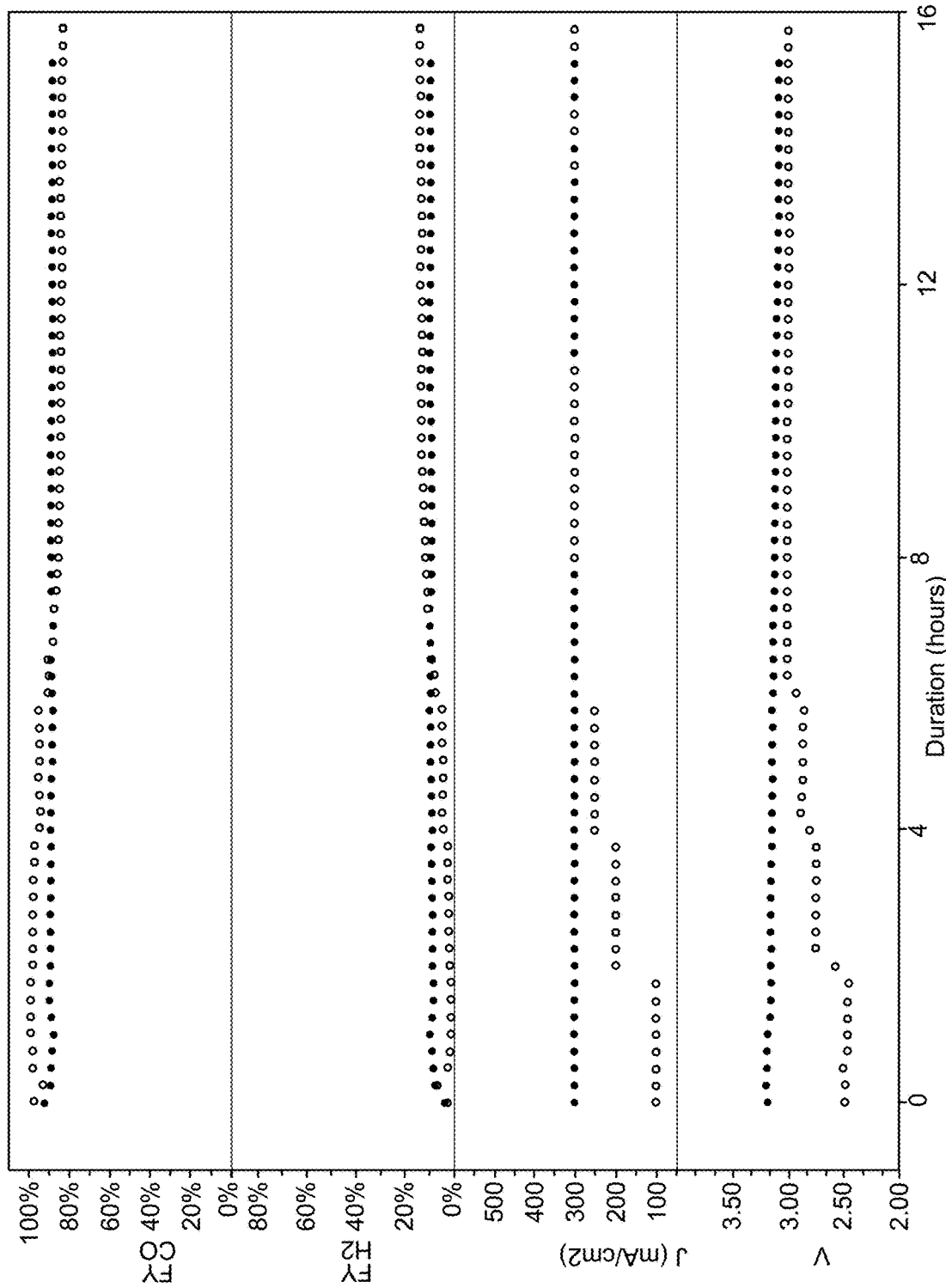
FIG. 21 is a plot comparing performance of an MEA operated in a cell with no ramp to the operating current with a cell with a current of ramp.

FIG. 21 shows performance of two MEAs at high $CO_2$ utilization. One MEA (filled dots) was operated in a cell with no current ramp, starting directly at 300 mA/cm². The other MEA (unfilled dots) was operated in a cell with a current ramp of 100, 200, 250 mA/cm² for 2, 2, 2 hours respectively until sitting at 300 mA/cm². As shown in FIG. 21, using a current ramp to 300 mA/cm2 improves the voltage by about 100 mV.

Effect of Ramp Programs

Operating a cell at different ramping up or ramping down programs results in different decay rates of selectivity and voltage. Specifically, during a test MEA for producing CO that was operated at 300 mA/cm2, ramping the current density down to 0 within 30 mins and holding at 0 for 15 mins before an immediate restart at 300 mA/cm2 yielded better decay in Faradaic yields than a test in which current was stopped immediately and held at 0 for 15 mins before a slow ramp up of the current density from 0 to 300 mA/cm2 within 30 mins.

Current Pause Duration

Figure 22:
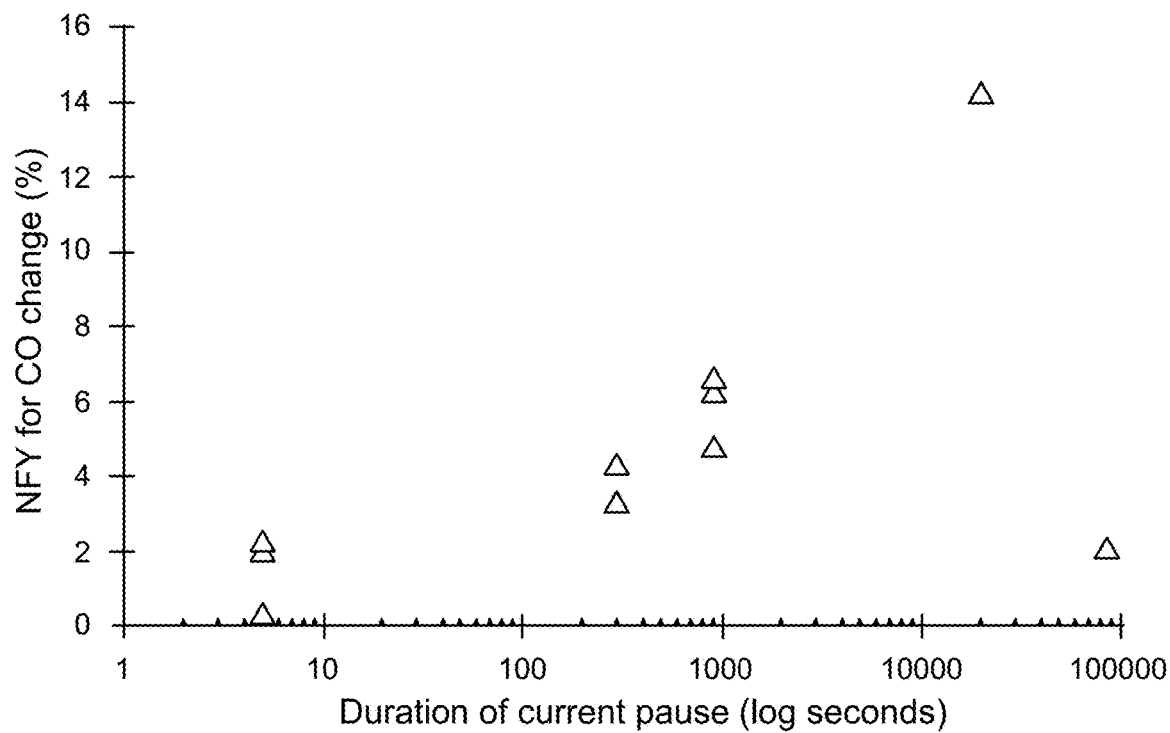
FIG. 22 shows change in Faradaic yield for CO (from before to after a current pause) versus the duration of the current pause.
Figure 23:
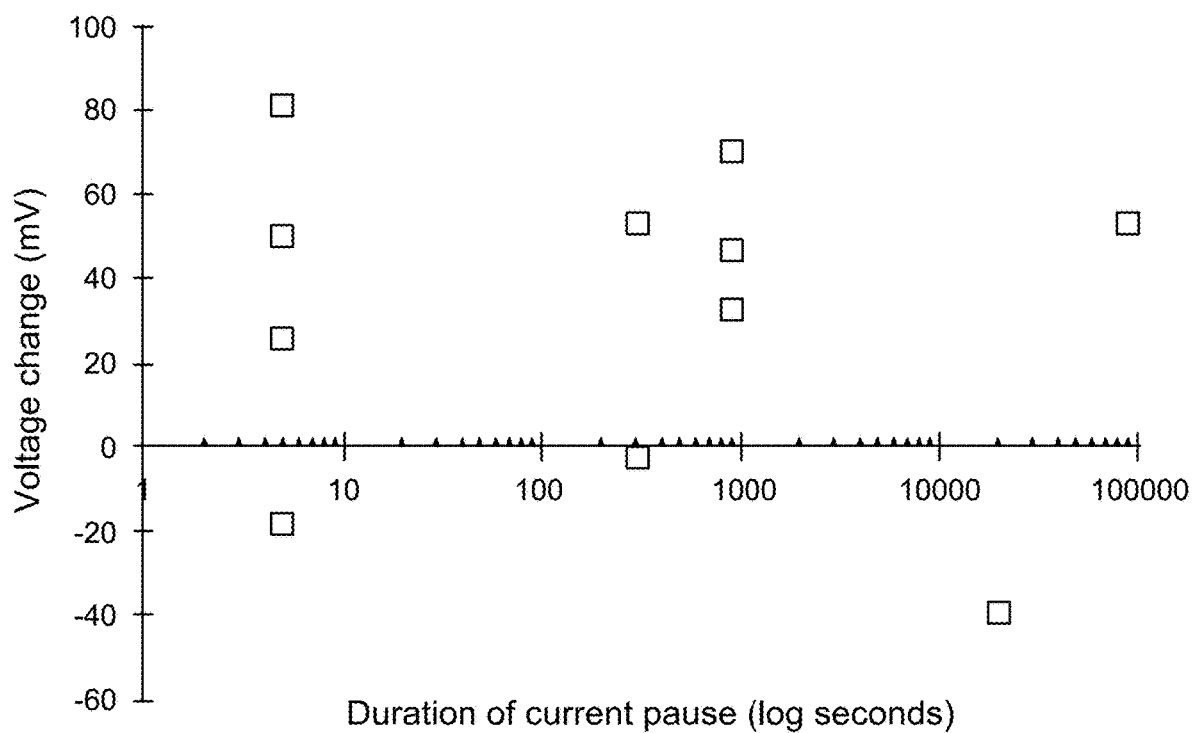
FIG. 23 shows the change in voltage (from before to after a current pause) versus the duration of the current pause.

FIG. 22 shows change in Faradaic yield for CO (from before to after a current pause) versus the duration of the current pause, and FIG. 23 shows the change in voltage (from before to after the current pause) versus the duration of the current pause. As shown in FIG. 22, the duration of the current pause during a long-term test affects the change of CO Faradaic yields, while the effect of the duration of the current pause on the voltage change is not observed (FIG. 23).

Open Circuit Voltage vs Cell Shorting

Two MEAS producing CO were operated with intermittent pulsing of current, where the cell was operated for 45 minutes, and then turned off for 15 minutes. This cycle was repeated for 14 hours. For one MEA, the cell was shorted to 0 V during current pause. For the other MEA, the cell was left at "open circuit voltage" (OCV) during the current pause, which is around 1-1.2 The voltage stability was higher for the cell left at OCV (1-1.2V) compared to the cell operated at 0 V during the current pause. For the cell operating at 0 V during the current pause, the voltage decay was 0.6 mV/hr. For the cell at OCV, the voltage is improved at a rate of 3.7 mV/hr. The CO selectivity also improved over time for both tests, at a rate of around 0.07%/hr.

Other Embodiments

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

What is claimed is:

1. A method of operating a membrane electrode assembly (MEA) for $CO_x$ reduction, the MEA comprising a cathode, an anode, and a membrane between the cathode and the anode, and the method comprising:
    inletting a gas comprising $CO_x$ to the cathode of the MEA and applying a current to the MEA at a first current density, to thereby reduce $CO_x$ and produce a $CO_x$ reduction product; and
    during operation to produce the $CO_x$ reduction product for a downstream process, automatically pausing applied current according to a current pause schedule.

2. The method of claim 1, wherein automatically pausing the applied current comprises reducing the applied current to a non-zero level.

3. The method of claim 1, wherein the current pause schedule comprises current-on periods at the first current density separated by current pause periods, wherein the applied current during at least a portion of a current pause period is zero or at a second current density lower than the first current density.

4. The method of claim 3, wherein the duration of a current-on period is between 10 hours and 1000 hours.

5. The method of claim 4, wherein the duration of a current pause period is between 5 minutes and 10 hours.

6. The method of claim 3, wherein the duration of a current-on period between 1 hour and 10 hours.

7. The method of claim 6, wherein the duration of a current pause period is between 500 microseconds and 20 minutes.

8. The method of claim 3, wherein the duration of a current-on period between 3 minutes and 1 hour.

9. The method of claim 8, wherein the duration of a current pause period is between 500 microsecond and 10 minutes.

10. The method of claim 3, wherein the total current-on period duration is at least three times longer than the total current pause period duration.

11. The method of claim 3, wherein the current pause period durations are constant and the current-on period durations are constant.

12. The method of claim 1, wherein one or both of the current pause period duration and the current-on period duration vary.

13. The method of claim 1, wherein automatically pausing the applied current comprises a single step from the first current density.

14. The method of claim 1, wherein automatically pausing the applied current comprises multiple steps from the first current density.

15. The method of claim 1, wherein automatically pausing the applied current comprises a continuous ramp from the first current density.

16. The method of claim 1, wherein automatically pausing the applied current comprises returning to the first current density using a single step.

17. The method of claim 1, wherein automatically pausing the applied current comprises returning to the first current density using multiple steps.

18. The method of claim 1, wherein automatically pausing the applied current comprises returning to the first current density using a continuous ramp.

19. The method of claim 1, wherein automatically pausing the applied current comprises reducing the applied current to zero.

20. The method of claim 19, wherein reducing the applied current to zero comprises shorting the MEA.

21. The method of claim 19, wherein the MEA has an open circuit potential when the applied current is zero.

22. The method of claim 1, further comprising stopping flow of the gas while pausing current.

23. The method of claim 1, further comprising maintaining a flow of the gas comprising $CO_x$ to the cathode while pausing current.

24. The method of claim 1, further comprising maintaining a flow of the gas comprising $CO_x$ to the cathode at the same flow rate while pausing current.

25. The method of claim 1, further comprising inletting anode feed material to the anode of the MEA.

26. The method of claim 25, further comprising stopping flow of the anode feed material while pausing current.

27. The method of claim 25, further comprising maintaining a flow of the anode feed material to the anode while pausing current.

28. The method of claim 25, further comprising maintaining a flow of the anode feed material to the anode at the same flow rate while pausing current.

29. The method of claim 1, further comprising, prior to producing a $CO_x$ reduction product for a downstream process, performing a break-in procedure comprising applying current in a multi-step or continuous ramp to the first current density.

30. The method of claim 29, further comprising, prior to the break-in procedure, performing a hydration operation in which no current is applied and wherein a cathode gas and an anode feed material are inlet to the cathode and anode, respectively, of the MEA.

31. The method of claim 30, further comprising ramping a MEA temperature to operating temperature during the hydration operation.

32. A method of operating an electrochemical cell comprising a membrane electrode assembly (MEA) for $CO_x$ reduction, the MEA comprising a cathode, an anode, and a membrane between the cathode and the anode, and the method comprising:
    inletting a gas comprising $CO_x$ to the cathode of the MEA and applying a cell voltage to the MEA to thereby reduce $CO_x$ and produce a $CO_x$ reduction product; and during operation of the cell to produce the $CO_x$ reduction product, cycling the cell voltage.

33. The method of claim 32, wherein cycling the cell voltage comprises reducing the cell voltage to zero.

34. The method of claim 32, wherein cycling the cell voltage comprises reducing the cell voltage to a non-zero level.

35. The method of claim 32, wherein the $CO_x$ reduction product is produced for a downstream process.

36. A system comprising:
a $CO_x$ reduction reactor comprising an electrochemical cell, the electrochemical cell comprising a membrane electrode assembly (MEA) comprising a (i) cathode comprising a $CO_x$ reduction catalyst that promotes reduction of a carbon oxide, (ii) an anode comprising a catalyst that promotes oxidation, and (iii) a polymer electrolyte membrane (PEM) layer disposed between the cathode and the anode; and
an electrical power source controller configured to control voltage applied to the electrochemical cell, wherein the electrical power source controller is configured to, during operation of the $CO_x$ reduction reactor, cycle the voltage applied to the cell.

37. The system of claim 36, further comprising a cathode subsystem configured to interact with the cathode and comprising a carbon oxide flow controller configured to control flow of a carbon oxide feed stream to the cathode of the $CO_x$ reduction reactor.

38. The system of claim 37, wherein the electrical power source controller acts in concert with the carbon oxide flow controller.

39. The system of claim 36, further comprising an anode subsystem configured to interact with an anode of the $CO_x$ reduction reactor and comprising an anode water flow controller configured to control flow an anode feed stream to an anode of the $CO_x$ reduction reactor.

40. The system of claim 39, wherein the electrical power source controller acts in concert with the anode water flow controller.

41. The system of claim 36, further comprising a back-pressure controller configured to maintain pressure at the cathode side of the MEA.

42. The system of claim 37, wherein the cathode subsystem is configured to controllably recycle unreacted carbon oxide.

43. The system of claim 36, further comprising an anode water recirculation loop.

44. The system of claim 36, wherein cycling voltage applied to the cell comprises reducing the voltage to zero.

45. The system of claim 36, wherein cycling the voltage applied to the cell comprises reducing the voltage to a non-zero level.

46. The system of claim 36, wherein the electrical power source controller is configured to, during operation of the $CO_x$ reduction reactor, cycle the voltage applied to the cell according to a schedule.

47. A method of operating a membrane electrode assembly (MEA) for $CO_x$ reduction, the MEA comprising a cathode, an anode, and a membrane between the cathode and the anode, the method comprising:
inletting a gas comprising $CO_x$ to the cathode of the MEA and applying a current to the MEA at a first current density, to thereby reduce $CO_x$ and produce a $CO_x$ reduction product; and
during operation to produce the $CO_x$ reduction product for a downstream process, cycling the applied current.

48. The method of claim 47, wherein cycling the applied current comprises reducing the current to zero.

49. The method of claim 47, wherein cycling the applied current comprises reducing the current to a non-zero level.

50. A method of operating a membrane electrode assembly (MEA) for $CO_x$ reduction, the MEA comprising a cathode, an anode, and a membrane between the anode and the cathode, the method comprising:
inletting a gas comprising $CO_x$ to the cathode of the MEA and applying a current to the MEA at a first current density, to thereby reduce $CO_x$ and produce a $CO_x$ reduction product; and
during operation to produce the $CO_x$ reduction product for a downstream process, automatically varying applied current according to a schedule.

51. The method of claim 50, wherein automatically varying applied current according to a schedule comprises reducing applied current to zero.

52. The method of claim 50, wherein automatically varying applied current according to a schedule comprises reducing applied current to a non-zero level.

* * * * *